(12) United States Patent
Clark, Jr. et al.

(10) Patent No.: US 8,725,747 B2
(45) Date of Patent: May 13, 2014

(54) FILTERING OF CUSTOM ATTRIBUTES OF COMPUTER OBJECTS FOR DISPLAY

(75) Inventors: John Clark, Jr., Pepperell, MA (US); Shailesh Kumar, Littleton, MA (US); Chuck Spencer, North Billerica, MA (US); Peter Toukhanian, Troy, MI (US)

(73) Assignee: Oracle International Corporation, Redwood Shores, CA (US)

( * ) Notice: Subject to any disclaimer, the term of this patent is extended or adjusted under 35 U.S.C. 154(b) by 28 days.

(21) Appl. No.: 12/912,969

(22) Filed: Oct. 27, 2010

(65) Prior Publication Data

US 2012/0109984 A1 May 3, 2012

(51) Int. Cl.
*G06F 17/30* (2006.01)

(52) U.S. Cl.
USPC .................................. 707/754; 705/9; 705/35

(58) Field of Classification Search
USPC ......................................... 707/754; 705/9, 35
See application file for complete search history.

(56) References Cited

U.S. PATENT DOCUMENTS

| | | | |
|---|---|---|---|
| 6,012,044 A | 1/2000 | Maggioncalda et al. | |
| 7,113,915 B1 | 9/2006 | Montemayor et al. | |
| 8,069,435 B1 | 11/2011 | Lai | |
| 8,171,397 B2 | 5/2012 | Chikirivao et al. | |
| 8,209,660 B2 | 6/2012 | Sundararajan et al. | |
| 8,255,326 B2 | 8/2012 | Compiano | |
| 8,417,715 B1 * | 4/2013 | Bruckhaus et al. | 707/758 |
| 2005/0165631 A1 * | 7/2005 | Horvitz | 705/7 |
| 2006/0004651 A1 * | 1/2006 | Corr et al. | 705/38 |
| 2007/0050228 A1 | 3/2007 | Beshears | |
| 2007/0055596 A1 * | 3/2007 | Yankovich et al. | 705/35 |
| 2007/0094064 A1 | 4/2007 | Yankovich et al. | |
| 2007/0185754 A1 | 8/2007 | Schmidt | |
| 2008/0082956 A1 | 4/2008 | Gura et al. | |
| 2008/0238664 A1 | 10/2008 | Uchida | |
| 2008/0281795 A1 * | 11/2008 | Musier et al. | 707/3 |
| 2009/0018889 A1 | 1/2009 | Petersen et al. | |
| 2010/0088137 A1 | 4/2010 | Weiss et al. | |
| 2010/0299176 A1 * | 11/2010 | Mangipudi et al. | 705/9 |

OTHER PUBLICATIONS

Rajesh Bhatia, et al., U.S. Appl. No. 12/912,835, filed Oct. 27, 2010.
John Clark, Jr., et al., U.S. Appl. No. 12/912,953, filed Oct. 27, 2010.

(Continued)

*Primary Examiner* — Cindy Nguyen
(74) *Attorney, Agent, or Firm* — Miles & Stockbridge P.C.

(57) ABSTRACT

A computer-readable medium, computer-implemented method, and system are provided for filtering of custom attributes. A custom attribute is an attribute of an object defined by a user. Once a user has defined one or more custom attributes, the user can filter a set of objects based on a criteria that includes a value for one or more custom attributes. The filtering can be dynamic so that when the set of objects is modified (such as creating a new object, deleting an existing object, or modifying an existing object), the filter is automatically updated. Furthermore, a filtering criteria can be based on the set of objects present in the system, so that any filter that is defined returns at least one object. In addition, once a filter is applied, any additional filter applied to the original filter can have a filtering criteria based on the subset of objects returned by the original filter.

20 Claims, 47 Drawing Sheets

(56) References Cited

OTHER PUBLICATIONS

Trintech, "Features of Unity Financial Close Workflow and Process Management Software", pp. 1-3; http://www.trintech.com/financial-grc-solutions/financial-close-management-software/financial-close-features/.

Blackline Systems, "Task Management", pp. 1-3; http://www.blackline.com/solutions/task-management.

SAP, "Best-Practice Financial Accounting with mySAP ERP Financials", pp. 1-16; http://www.sap.com/usa/solutions/business-suite/erp/financials/pdf/BWP ERP Financials Best Practice Accounting.pdf.

Pinnacle, Titan Technology Partners, "EPM MAESTRO", pp. 1-6; http://www.pgww.com/Solutions/BPMUtilities.asp.

Oracle, "Oracle Integrated Operational Planning", pp. 1-5; http://www.oracle.com/us/products/middleware/bus-int/064353.pdf.

3R.TIM, "Anteros.pk", pp. 1-2; http://mobihydra.com/Index,aspx?M=products&P=anteros&L=EN.

* cited by examiner

Manage Integration Types

| Name | Application | Execution Type |
|---|---|---|
| Accounts Payable | EBS | End User |
| Allocate | HFM | Automated |
| Approve Journals | HFM | End User |
| Calculate | HFM | Automated |
| Calculate Contribution | HFM | Automated |
| Consolidate | HFM | Automated |
| Create Journals | HFM | End User |
| Data Grids | HFM | End User |
| Extended Analytics | HFM | Automated |
| Extended Analytics To File | HFM | Automated |
| Extract Data | HFM | End User |
| Extract Data | HFM | Automated |
| Extract ICT | HFM | End User |
| Extract Journals | HFM | End User |
| Extract Journals | HFM | Automated |
| Intercompany Match By Account Report | HFM | End User |

Fig. 14

Create Schedule from Template [Corporate Quarterly Close]

Schedule parameters | Predecessor task links | Set Parameters

Override Task Parameters

| Task Type | Parameter | Current Value | New Value |
|---|---|---|---|
| HFM Consolidate | Year | 2009 | |
| IHFM Consolidate | Period | January | February |
| Reconcile AR | Pacific Quarterly | Reconcile AR | |
| Reconcile AR | Asia Quarterly | Reconcile AR | |

3400 — Schedule parameters
3410 — Predecessor task links
3420 — Set Parameters
3430 — New Value column Create Schedule | Cancel

Fig. 34

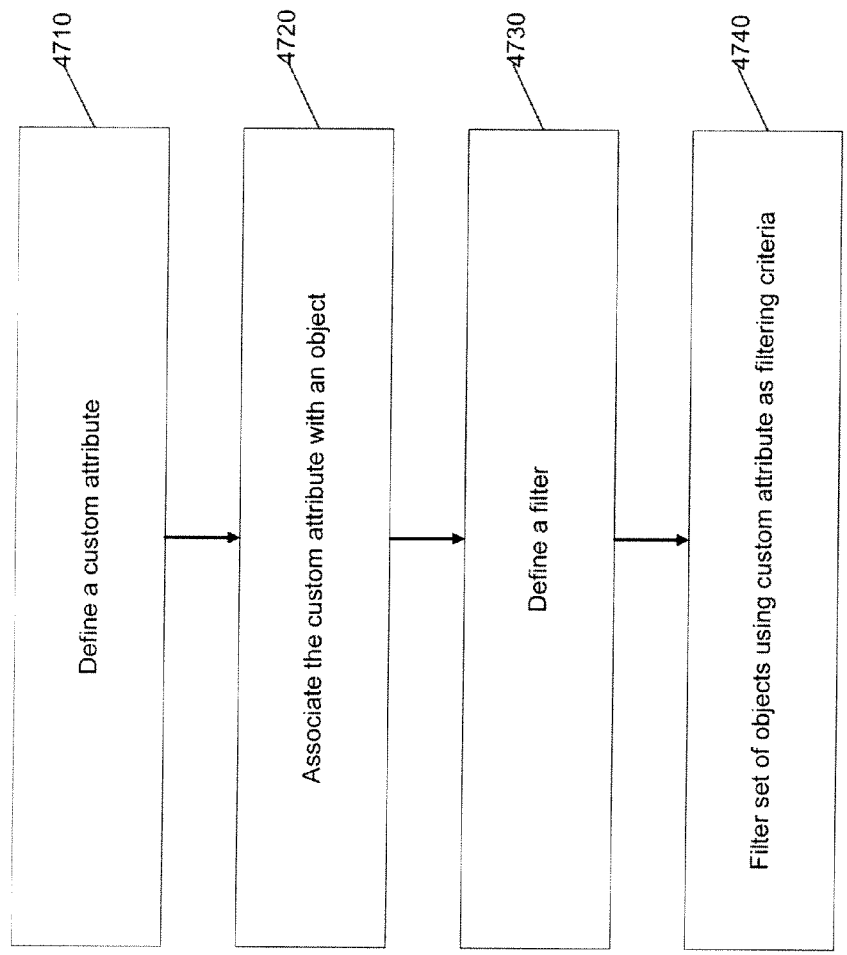

FILTERING OF CUSTOM ATTRIBUTES OF COMPUTER OBJECTS FOR DISPLAY

FIELD

One embodiment is directed generally to a computer system, and in particular to a financial computer system configured to run business processes.

BACKGROUND

Companies can have business processes, where each business process requires that a set of tasks be completed before the business process can be deemed to be completed. An example of a business process is a financial close process, which is a process to complete an accounting reporting cycle of a company. The financial close process can include one or more tasks that need to be performed in order to complete the accounting reporting cycle. Such tasks can include ledger and sub-ledger close, data loading and mapping, financial consolidation, reconciliation, tax/treasury, and internal/external reporting tasks.

A computer system can be configured to manage one or more business processes, such as a financial close process, for a company. However, there are many challenges in configuring a computer system to manage business processes. One challenge is the wide diversity of business processes. For example, in the context of a financial close process, a financial close can mean different things to different employees of a company. To a divisional controller, a financial close may mean closing out the sub-ledgers and general ledger at month end or quarter end and submitting the results to a corporate branch of the company. To a headquarters accountant, the financial close may mean collecting the details from the respective divisions of the company, making final adjustments, and performing the corporate financial consolidation and reporting. To a Chief Financial Officer and other financial executives, the financial close may mean finalizing results, announcing earnings, and creating 10Q/10K's and other regulatory filings for the SEC and other stakeholders. Thus, it is desirable to a company that the computer system configured to manage such diverse business processes, and the diverse tasks associated with a business process, provide a flexible and robust mechanism for creating, grouping, and managing tasks of one or more business processes.

Furthermore, a computer system configured to manage one or more business processes may need to interact with one or more external computer systems. For example, a computer system configured to manage a financial close process may need to interact with external computer systems, such as enterprise resource planning (ERP) systems and financial consolidation systems. An ERP system is a computer system configured to manage internal and external resources such as tangible assets, financial resources, materials and human resources. A financial consolidation system is a computer system configured to streamline the internal financial reporting of a company. However, the ERP and financial consolidation systems may be independent systems that are separate from the computer system configured to manage the financial close process. The independent nature of the systems may make integration and coordination of the systems difficult.

One approach for overcoming these difficulties is to use several ad-hoc and disconnected tools to interconnect the ERP systems and financial consolidation systems with the computer system configured to manage the financial close process, in order to complete associated tasks, such as creating external-facing financial statements. One problem with this approach is that there is no visibility into the activities necessary to create the financial statements. Activities performed outside the ERP systems or financial consolidation systems often do not have a system of record. Thus, the tasks performed are difficult to audit, and, as a result, a risk is associated with the goal of achieving accurate financial statements.

SUMMARY

A computer-readable medium having instructions stored thereon that, when executed by a processor, cause the processor to filter objects based on a custom attribute. The instructions include defining a custom attribute, where the custom attribute is an attribute defined by a user of a system, and includes a name, a value, and a value type. The instructions further include associating the custom attribute with the object in the system. The instructions further include defining a filter, where the filter defines a subset of objects based on a filtering criteria when applied to a set of objects in the system, and displays the subset of objects using a user interface of the system. The instructions further include filtering the set of objects using the filter, where the custom attribute is used as the filtering criteria.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 14 illustrates an example of a user interface of a financial close management system according to an embodiment of the invention.

FIG. 34 illustrates an example of a user interface of a financial close management system configured to set values of task parameters of a schedule according to an embodiment of the invention.

FIG. 47 illustrates a flow diagram of the functionality of a financial close management module according to another embodiment of the invention.

DETAILED DESCRIPTION

Financial Close Management Framework

Figure 1:
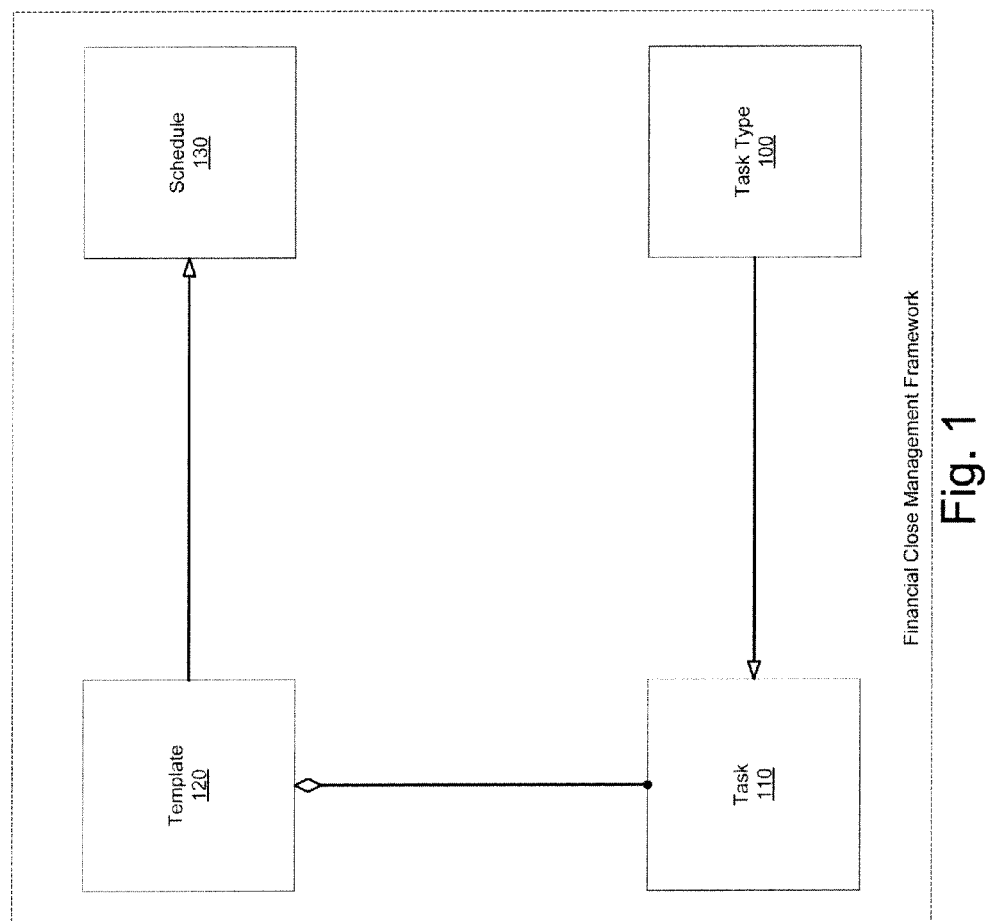
FIG. 1 illustrates a framework of a financial close management system according to an embodiment of the invention.

One embodiment of the invention is directed towards to a financial close management system. According to the embodiment, a financial close management system can help define, execute, and report on the interdependent processes of a financial close period. The financial close management system can provide centralized monitoring of all financial close processes tasks, and can provide a visible, automated, repeatable system of record for running financial close processes.

According to an embodiment of the invention, the financial close management system can provide the following functionality: defining financial close tasks for a financial close process; defining a schedule of financial close tasks to ensure the correct flow of tasks; automating the management of the financial close process to track the status of financial close tasks; providing notification and alerts relating to the financial close process; integrating the financial close tasks with products tasks; generating end user notifications; monitoring an overall status of a financial close process from a central dashboard; acting on errors or delays with financial close tasks; and analyzing the effectiveness of the financial close process.

In accordance with an embodiment, the financial close management system can visualize all the tasks required to complete a specific process. More specifically, the financial close management system can show all the tasks within a specific process, and also show their expected sequencing and interrelationships. In an example where the specific process is a company's financial close process, the financial close management system can summarize all the required tasks needed to complete an accounting reporting cycle.

According to an embodiment, the financial close management system includes an extensible workflow engine and an integration framework that, in part, allows the financial close management system to monitor and orchestrate tasks into all applications necessary for the completion of a specific process. The extensible workflow engine and integration framework can utilize a process manager that uses an orchestration language, such as Business Process Execution Language (BPEL), to create business processes. The extensible workflow engine and integration framework can also utilize web services and a service-oriented architecture (SOA).

An orchestration language, such as BPEL, is a language for specifying business process behavior based on web services. Using an orchestration language, a business process can be modeled by a computer system. Models for business processes generally involve sequences of peer-to-peer message exchanges, both request-response and one-way, within stateful, long-running interactions involving two or more parties. An orchestration language provides a formal description of the message exchange protocols used by business processes in their interactions. In other words, an orchestration language defines a model and grammar for describing the behavior of a business process based on interactions between the process and its partner processes. The interaction with each partner process can occur through web service interfaces, and the structure of the relationship at the interface level can be encapsulated. Thus, an orchestration process, such as a BPEL process, can define how multiple service interactions with partner processes are coordinated to achieve a business goal.

A web service is a software application designed to support interoperable machine-to-machine interaction over a network. A web service can have an interface described in a machine-processable format. A computer system can interact with a web service by sending messages over a sequential, stream-oriented protocol such as Hypertext Transfer Protocol (HTTP). Examples of web services are Big Web services and RESTful web services. Big Web services are web services that follow a Simple Object Access Protocol (SOAP) standard and use Extensible Markup Language (XML) messages. RESTful web services are services that utilize a Representational State Transfer (REST) style of software architecture, where clients are separate from servers by a uniform interface. A SOA is a flexible set of design principles used during the phases of systems development and integration. A deployed SOA-based architecture will provide a loosely-integrated suite of services that can be used within multiple business domains.

A user is a user of the financial close management system that has the capabilities of viewing a schedule, owning a task, viewing a dashboard, modifying statuses, and creating and managing filters. A power user is a user of the financial close management system that has all the capabilities of a user, and has the additional capabilities of creating and importing tasks, and creating and managing templates and schedules. An administrator is a user of the financial close management system that has all the capabilities of a power user, and has the additional capabilities of having full access to all tasks, templates, and schedules, defining years and periods, creating and managing task types, and creating and managing custom attributes.

FIG. 1 illustrates a framework of a financial close management system according to an embodiment of the invention. The framework can include four core objects: task type 100, task 110, template 120, and schedule 130. Task type 100 defines a type of task that can be performed by the financial close management system. Task type 100 can include an integration type associated with task type 100. Specifics of an integration type are defined in the "Integration" section below. Based on the associated integration type, task type 100 can define a value for one or more parameters associated with task type 100. As described in the "Integration" section in more detail below, a parameter represents a value that is sent to a external service provider when a task invokes a web service of an external application.

Task type 100 can also define one or more attributes. An attribute is a value associated with an object, such as task type 100, task 110, template 120, or schedule 130. Task type 100 can also define a value for each defined attribute of task type 100. Thus, according to an embodiment of the invention, task type 100 can define attribute values and parameter values that can be inherited by any task that is created from task type 100.

Task 110 is a core unit of action, and is a component of a financial close process. In other words, a financial close process can include one or more tasks. Task 110 can be implemented as an orchestration process, such as a BPEL process, which can be a sub-process of a larger orchestration process that corresponds to the financial close process. Task 110 can be inserted into either a template or a schedule. Task 110 inherits from task type 100. In other words, task 110 is based on task type 100, and can include all attributes and parameters (and any defined value for each inherited attribute and parameter) defined by task type 100. Task 110 can also define a value for each parameter where task type 100 has not already defined a value. A parameter value defined by task 110 is only associated with task 110 rather than task type 100. Also, task 110 can define one or more attributes, in addition to any attributes inherited from task type 100. In addition, task 110 can also define a value for each defined attribute of task type 100. Thus, based on the definitions inherited from task type 100, and based on its own definitions, task 110 can define one or more parameters and attributes, and define a value for each parameter and attribute.

Template 120 is a repeatable set of tasks, such as task 110. Template 120 has a one-to-many relationship with task 110. Tasks within template 120 are organized in an ordinal hierarchy. For example, in an embodiment, tasks within template 120 can be organized by offset days. An offset day is not a calendar date, but a numeric identifier used to order the tasks that make up template 120. According to the embodiment, one or more tasks of template 120 can be assigned an offset day of 0. Furthermore, all tasks that precede the one or more tasks assigned an offset day of 0 can be assigned offset days that are negative numbers, and all tasks that succeed the one or more tasks assigned an offset day of 0 can be assigned offset days that are positive numbers. More than one task can be assigned to an offset day. For example, five tasks can be assigned to offset day −1, three tasks can be assigned to offset day 0, and twelve tasks can be assigned to offset day 5. Template 120 can be used as a basis to create one or more schedules. In addition, template 120 can define one or more attributes, and can define a value for each defined attribute.

Schedule 130 is an expression of template 120. In other words, schedule 130 inherits from template 120, including all the tasks of template 120, and assigns each task to a particular point in time on a calendar (such as date). The order of tasks in template 120 is maintained in schedule 130, and template 120 can be expressed in more than one schedule. For example, a first schedule can be created from template 120 where a first task of the first schedule starts on January 1 of a calendar year, and a second schedule can be created from template 120 where a first task of the second schedule starts on April 1 of the calendar year. Both schedules include the same tasks as template 120, but the first schedule begins before the second schedule. In an alternate embodiment, a schedule can be created manually, rather than inheriting from a template.

Figure 2:
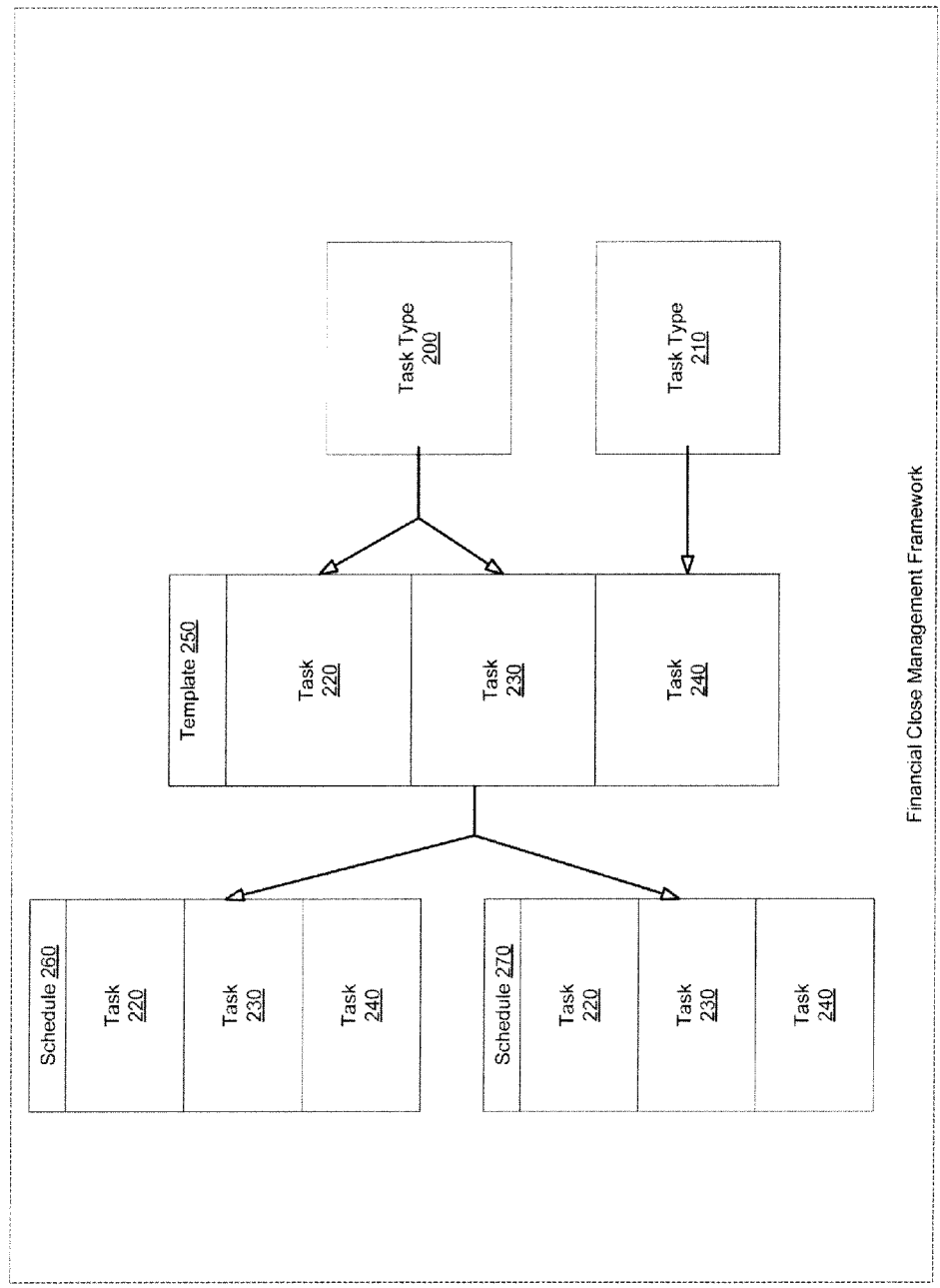
FIG. 2 illustrates an example implementation of a financial close management framework according to an embodiment of the invention.

FIG. 2 illustrates an example implementation of a financial close management framework according to an embodiment of the invention. One of ordinary skill in the art would readily appreciate that this is an example implementation described for clarification purposes, and that other implementations of the financial close management framework according to alternate embodiments also fall within the scope of the invention. For example, an implementation of a financial close management framework can include any number of task types, tasks, schedules, and templates, and still fall within the scope of the invention.

According to the illustrated embodiment, two task types, task types 200 and 210, can be defined for a financial close management framework. As previously described, task types 200 and 210 can each define a specific type of task. Two tasks, tasks 220 and 230, can also be defined for the financial close management framework within a template, template 250. While in the illustrated embodiment, the two tasks are defined within a template, in an alternate embodiment, tasks can be defined for the financial close management framework within a schedule, rather than a template. Tasks 220 and 230 each inherit from task type 200. A third task, task 240, can also be defined for the financial close management framework within template 250. Rather than inheriting from task type 200, task 240 inherits from task type 210. As one of ordinary skill in the art would appreciate, any number of tasks and task types can be defined for the financial close management framework, with any number of tasks inheriting from a given task type. Furthermore, any number of tasks can be defined within a schedule or within a template.

According to the embodiment, a template, template 250, can be defined for the financial close management framework. As previously described, a template is a set of tasks. In the illustrated embodiment, template 250 can include tasks 220, 230, and 240. As one of ordinary skill in the art would appreciate, any number of templates can be defined for the financial close management framework, and a template can include any number of tasks.

As previously described, a template can be expressed in one or more schedules. According to the illustrated embodiment, template 250 can be expressed in two schedules, schedules 260 and 270. Schedules 260 and 270 are each an expression of template 250. Thus, schedules 260 and 270 each inherit tasks 220, 230, and 240 from template 250, and schedules 260 and 270 each assign tasks 220, 230, and 240 to a particular point in time on a calendar (such as date). For example, for schedule 260, task 220 can be assigned to run on January 1 of a calendar year, task 230 can be assigned to run on February 1 of the calendar year, and task 240 can be assigned to run on March 1 of the calendar year. In contrast, for schedule 270, task 220 can be assigned to run on April 1 of the calendar year, task 230 can be assigned to run on May 1 of the calendar year, and task 240 can be assigned to run on June 1 of the calendar year. As one of ordinary skill in the art would appreciate, any number of schedules can be defined for the financial close management framework, and a template can be expressed in any number of schedules.

Figure 3:
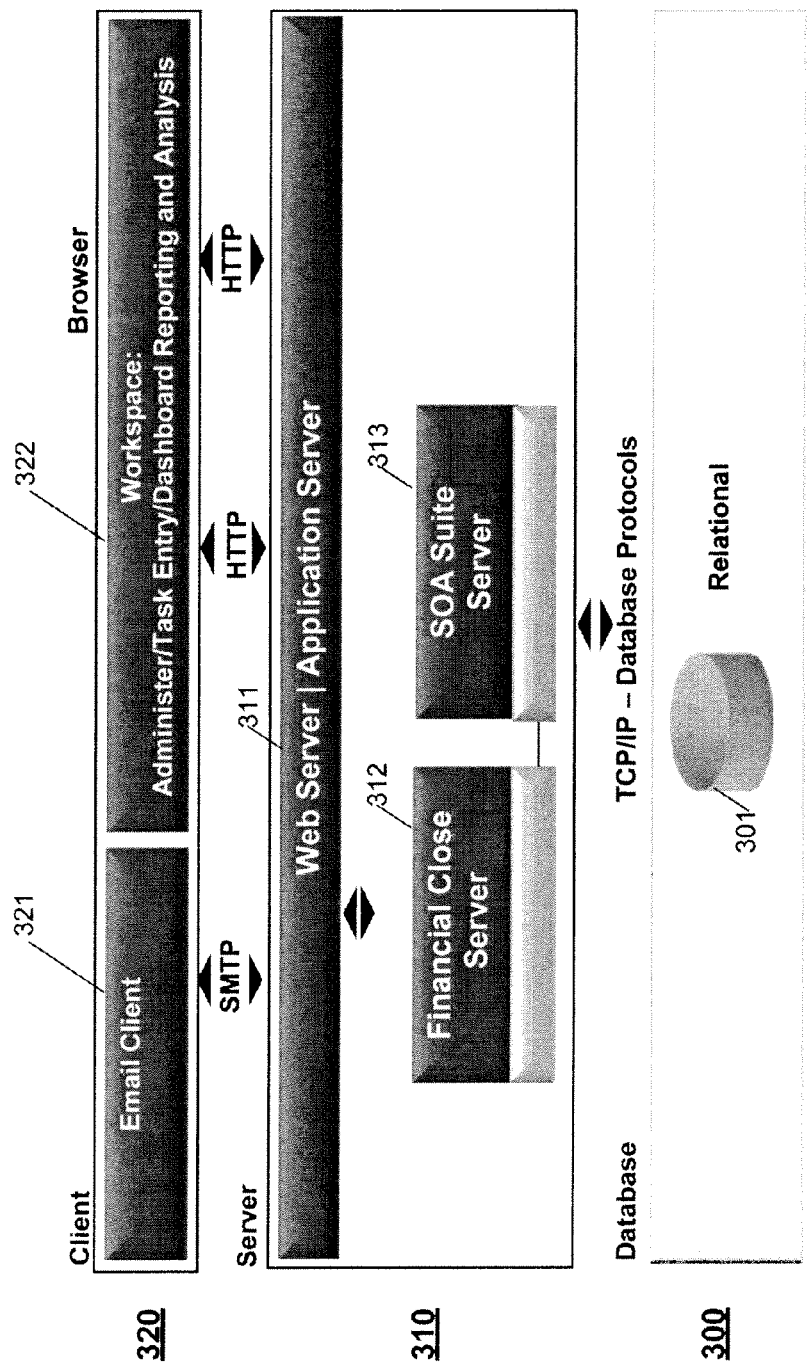
FIG. 3 illustrates a block diagram of a financial close management system that may implement an embodiment of the invention.

FIG. 3 illustrates a block diagram of a financial close management system that may implement an embodiment of the invention. According to the embodiment, the financial close management system has three layers, a database layer 300, a server layer 310, and a client layer 320. Database layer 300 includes database 301, according to the embodiment. Database 301 can store data for the financial close management system in an integrated collection of logically-related records or files. In the illustrated embodiment, database 301 is a relational database. However, one of ordinary skill in the art would appreciate that database 301 can be any type of database known by one of ordinary skill in the art. Furthermore, one of ordinary skill in the art would appreciate that, while in the illustrated embodiment, the financial close management system includes a single database, the financial close management system can include any number of databases and still be within the scope of the invention.

According to the illustrated embodiment, server layer 310 includes web server/application server 311. Web server/application server 311 is a combination of a web server and an application server. A web server is a computer program that can deliver content, such as a web page, using a Hypertext Transfer Protocol (HTTP) over a network, such as the Internet. An application server is a computer program that can execute procedures, such as programs, routines, and scripts that can support one or more applications. In one embodiment of the invention, the web server and application server of web server/application server 311 each operate on a separate machine. In an alternate embodiment, the web server and application server of web server/application server 311 operate on the same machine.

In the embodiment, web server/application server 311 includes financial close management server 312 and SOA suite server 313. Financial close management server 312 can provide functionality for managing a financial close process, as will be described in more detail below. SOA suite server 313 can provide a suite of services, where a service comprises an unassociated, loosely-coupled, unit of functionality, and where one or more services can be orchestrated into a non-hierarchical arrangement in order to construct a software application, such as a business process. SOA suite server 313 can also communicate with database 301 over a set of database protocols, such as Open Database Connectivity (ODBC) and Java Database Connectivity (JDBC) that utilize a Transmission Control Protocol/Internet Protocol (TCP/IP).

According to the embodiment, client layer 320 can operate on any type of machine utilizing a browser that is configured to access the Internet. In the illustrated embodiment, client layer 320 includes an email client 321 and a workspace client 322. Email client 321 can be a web application configured to provide message management, composition, and reception functionality. Email client 321 can be configured to run in a browser configured to access the Internet. Email client 321 can also be configured to communicate with server layer 310 over a Simple Mail Transfer Protocol (SMTP) connection. Workspace client 322 can be a software application configured to enter and administer tasks created in server layer 310, configured to display a dashboard reporting information on tasks created in server layer 310, and configured to analyze tasks created in server layer 310. Workspace client 322, like email client 321, can also be configured to run in a browser that is configured to access the Internet. Workspace client 322 can also be configured to communicate with server layer 310 over a HTTP connection.

Figure 4:
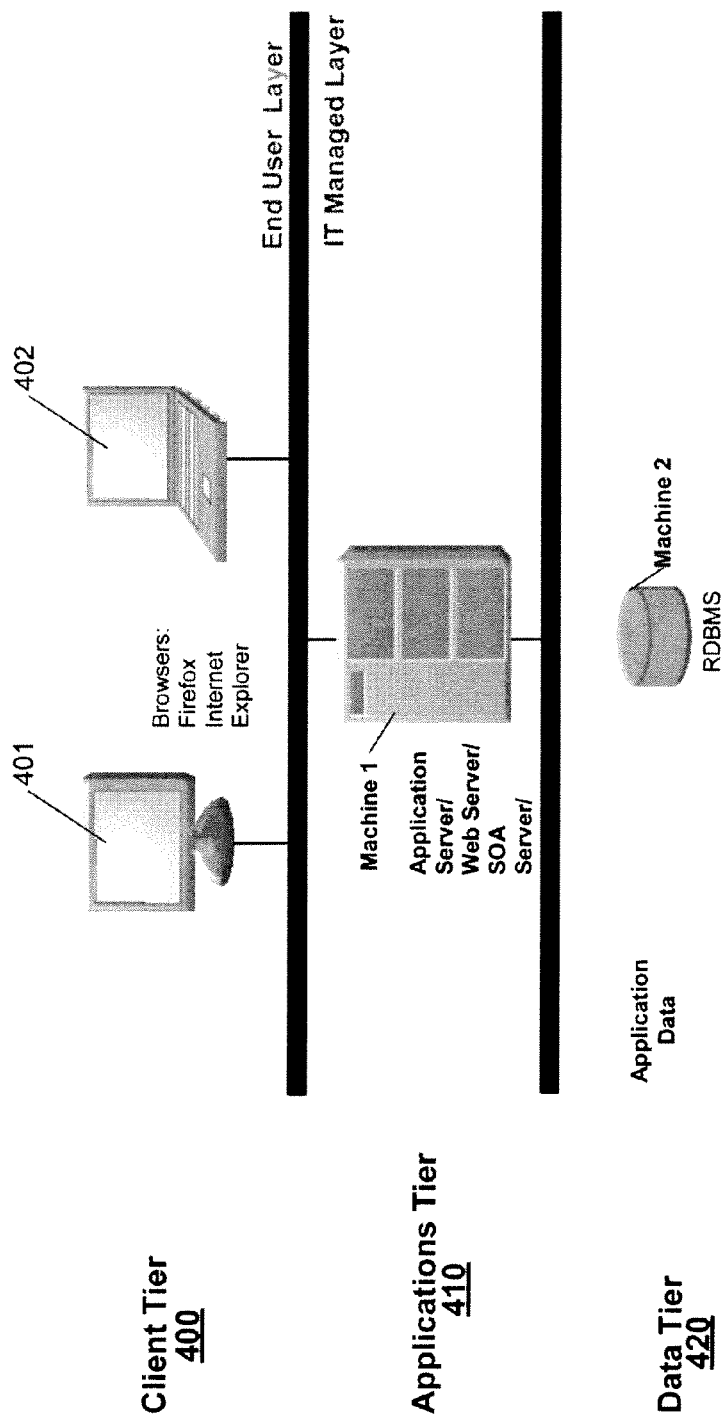
FIG. 4 illustrates a deployment of a financial close management system according to an embodiment of the invention.

FIG. 4 illustrates a deployment of a financial close management system according to an embodiment of the invention. According to the embodiment, the deployment includes a client tier 400, an applications tier 410, and a data tier 420. According to the embodiment, client tier 400 includes clients 401 and 402. In the illustrated embodiment, clients 401 and 402 operate in a browser configured to access the Internet and configured to run on any type of machine, such as Internet Explorer or Mozilla Firefox.

Applications tier 410 includes Machine 1, according to the embodiment. Machine 1 includes an application server, a web server, an SOA server, and a financial close management server (not shown).

According to the embodiment, data tier 420 includes Machine 2. Machine 2 includes a relational database RDMS.

Figure 5:
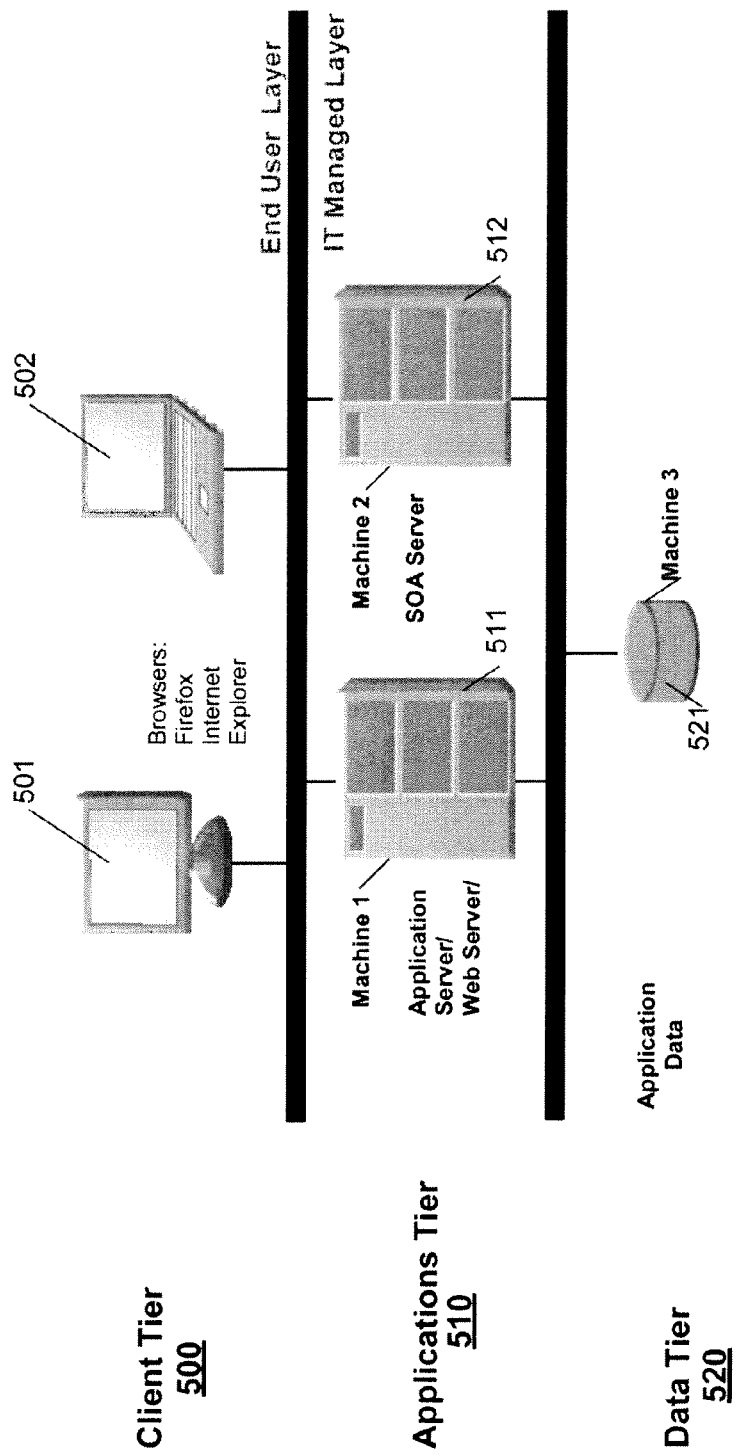
FIG. 5 illustrates a deployment of a financial close management system according to another embodiment of the invention.

FIG. 5 illustrates a deployment of a financial close management system according to another embodiment of the invention. According to the embodiment, similar to the deployment illustrated in FIG. 4, the deployment illustrated in FIG. 5 includes a client tier 500, an applications tier 510, and a data tier 520. According to the embodiment, client tier 500 includes clients 501 and 502. In the illustrated embodiment of FIG. 5, similar to the illustrated embodiment of FIG. 4, clients 501 and 502 operate in a browser configured to access the Internet and configured to run on any type of machine, such as Internet Explorer or Mozilla Firefox.

According to the embodiment, in contrast to the embodiment illustrated in FIG. 4, applications tier 510 includes Machine 1 and Machine 2. Applications tier 510 includes a second machine in order to handle the extra number of users. According to the embodiment, machine 1 includes an application server, a web server, and a financial close management server (not shown). Furthermore, according to the embodiment, machine 2 includes a SOA server.

According to the embodiment, data tier 520 includes Machine 3. Machine 3 includes a relational database RDMS.

One of ordinary skill in the art would readily appreciate that FIGS. 4 and 5 illustrate example deployments of a financial close management system, and that there are other example deployments within the scope of the invention. For example, one of ordinary skill would readily appreciate that an application tier can include any number of machines, and can include any distribution of the application server, web server, SOA server, and financial close management server among the machines, and still be within the scope of the invention.

Figure 6:
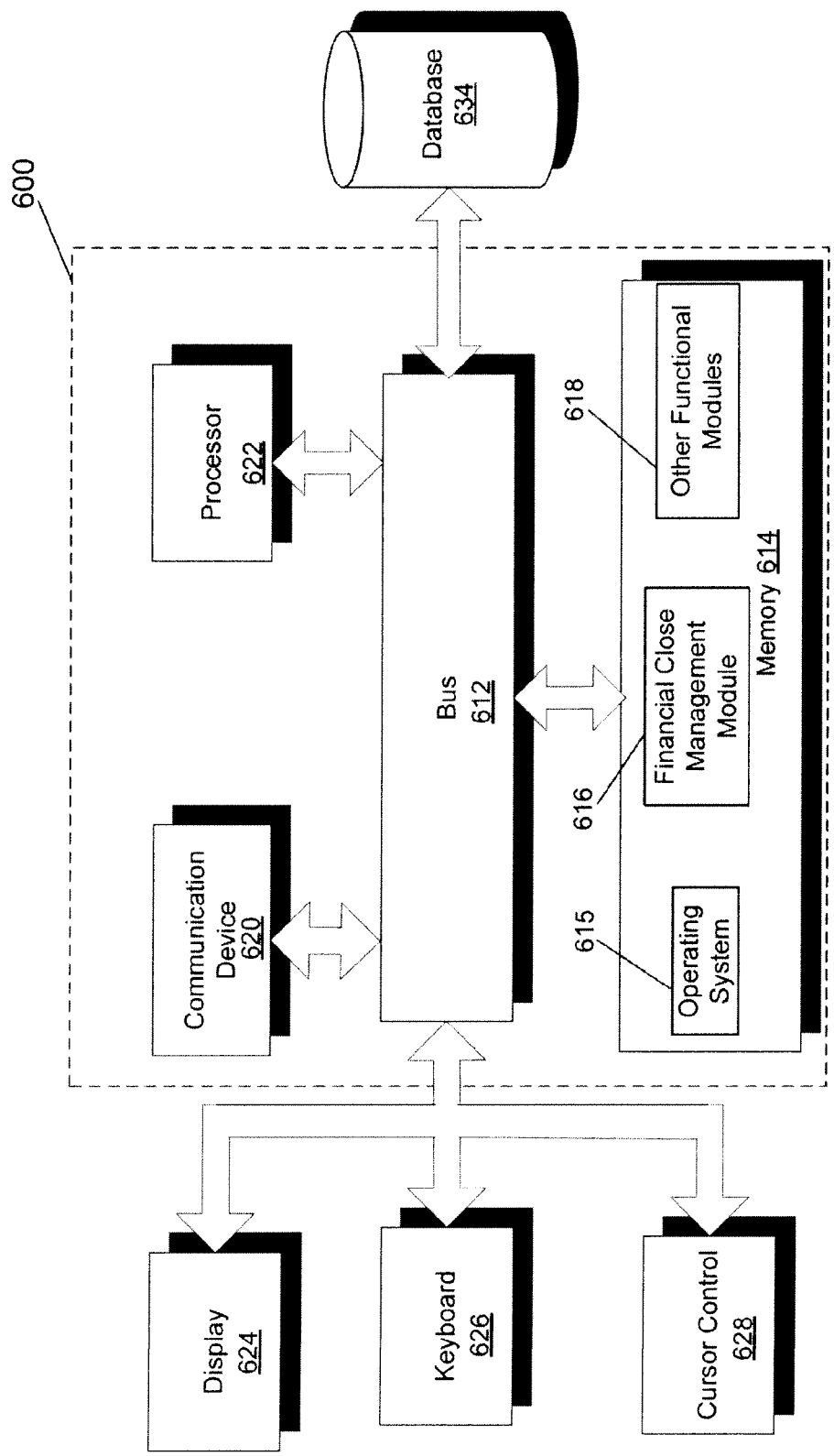
FIG. 6 illustrates a block diagram of a financial close management server that may implement an embodiment of the invention.

FIG. 6 illustrates a block diagram of a financial close management server 600 that may implement one embodiment of the invention. Financial close management server 600 includes a bus 612 or other communications mechanism for communicating information between components of financial close management server 600. Financial close management server 600 also includes a processor 622, operatively coupled to bus 612, for processing information and executing instructions or operations. Processor 622 may be any type of general or specific purpose processor. Financial close management server 600 further includes a memory 614 for storing information and instructions to be executed by processor 622. Memory 614 can be comprised of any combination of random access memory ("RAM"), read only memory ("ROM"), static storage such as a magnetic or optical disk, or any other type of machine or computer-readable medium. Financial close management server 600 further includes a communication device 620, such as a network interface card or other communications interface, to provide access to a network. As a result, a user may interface with financial close management server 600 directly, or remotely through a network or any other method.

A computer-readable medium may be any available medium that can be accessed by processor 622. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 622 can also be operatively coupled via bus 612 to a display 624, such as a Cathode Ray Tube ("CRT"). Display 624 can display information to the user. A keyboard 626 and a cursor control device 628, such as a computer mouse, can also be operatively coupled to bus 612 to enable the user to interface with financial close management server 600.

According to one embodiment, memory 614 can store software modules that may provide functionality when executed by processor 622. The modules can include an operating system 615, a financial close management module 616, as well as other functional modules 618. Operating system 615 can provide an operating system functionality for financial close management server 600. Financial close management module 616 can provide functionality for managing a financial close process, as will be described in more detail below. Financial close management server 600 can also be part of a larger system. Thus, financial close management server 600 can include one or more additional functional modules 618 to include the additional functionality. For example, functional modules 618 may include modules that are part of the "Fusion" products from Oracle Corporation.

Processor 622 can also be operatively coupled via bus 612 to a database 634. Database 634 can store data in an integrated collection of logically-related records or files. Database 634 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 7:
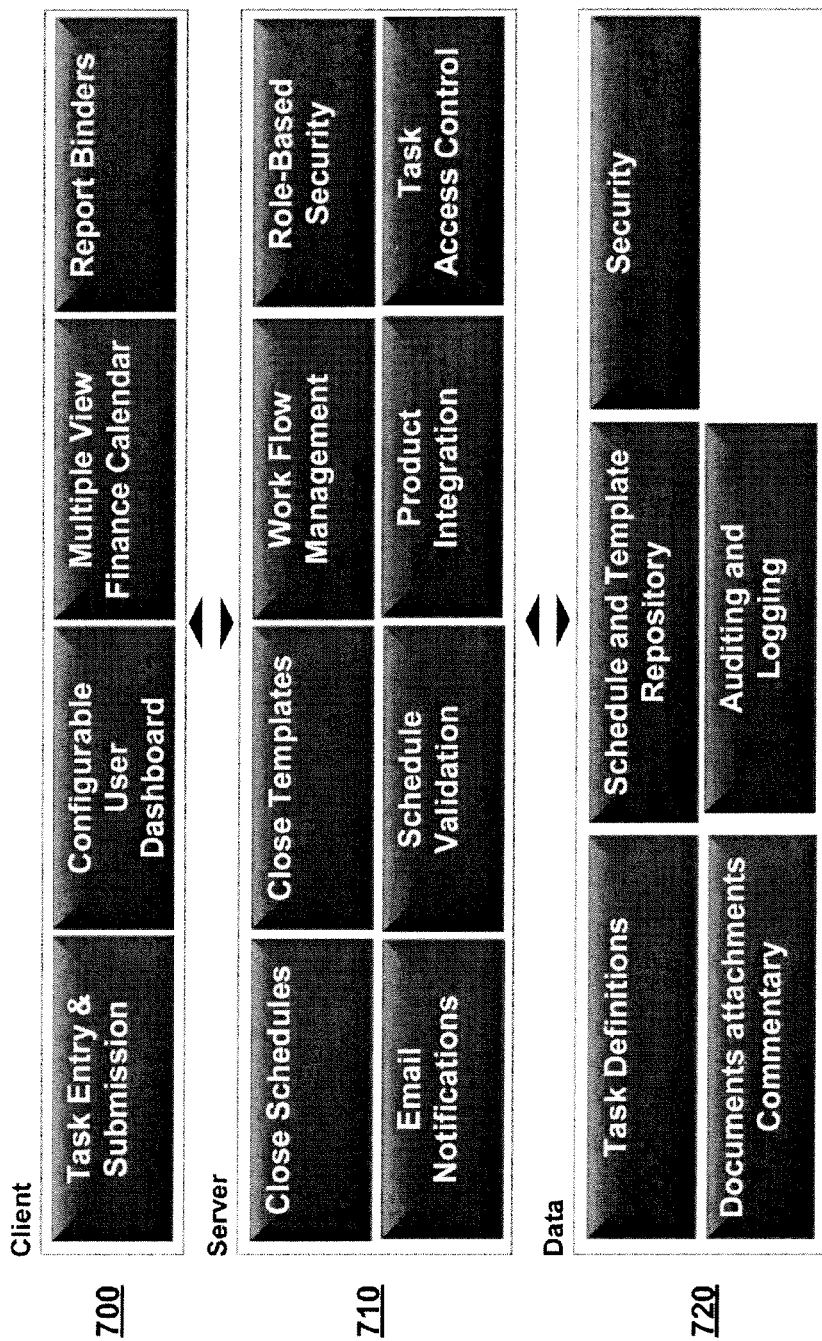
FIG. 7 illustrates functionality that can be implemented by a financial close management system according to an embodiment of the invention.

FIG. 7 illustrates functionality that can be implemented by a financial close management system according to an embodiment of the invention. However, one of ordinary skill in the art would readily understand that FIG. 7 illustrates an example distribution of functionality in the financial close management system, and that there can be other distributions of functionality that fall within the scope of the invention. In addition, one of ordinary skill in the art would also understand that a financial close management system can provide additional functionality not illustrated in FIG. 7, and still be within the scope of the invention.

According to the embodiment, the financial close management system illustrated in FIG. 7 includes client layer 700. According to the embodiment, client layer 700 can operate utilizing a browser configured to access the Internet and configured to run on any type of machine. In accordance with the embodiment, client layer 700 can provide task entry and submission functionality. More specifically, client layer 700 can allow a user to create one or more tasks for the financial close management system and submit the one or more tasks for processing. Client layer 700 can also provide functionality for a configurable user dashboard. The configurable user dashboard can provide a portal-style interface into the financial close management system, providing views into running schedules and task lists, as well as high-level summary representations into which a user can drill down for greater detail. According to the embodiment, the configurable user dashboard can be used for real time management of current schedules and task lists. Client layer 700 can also provide functionality for multiple views of a financial calendar. More specifically, client layer 700 can provide a day view, a week view, or a month view, where each view displays the tasks that are scheduled for that specific day, week, or month. In addition, client layer 700 can also provide functionality for viewing report binders. A report binder is a history of all activities that occurred as part of an process, such as all tasks associated with a financial close process. A report binder can be stored in a format, such as a compressed file. By selecting the format using a user interface of a financial close management system, a user can view the report binder using the user interface.

In accordance with the embodiment, the financial close management system also includes server layer 710. According to the embodiment, server layer 710 can operate on one or more machines to provide fail-over and load balancing. In accordance with the embodiment, server layer 710 can provide financial close schedule and financial close template functionality. More specifically, server layer 710 can create and processes schedules and templates for a financial close process as previously described above. Server layer 710 can also provide e-mail notification and vacation scheduling functionality. More specifically, server layer 710 can e-mail a user to notify the user that a task requires the user's attention, and can coordinate a vacation schedule for the users of a system to determine when a user will not be available to perform a task due to vacation. Server layer 710 can also provide work flow management and product integration functionality. Workflow management refers to processing one or more tasks associated with a template or schedule. Product integration is described in more detail in the "Integration" section. In addition, server layer 710 can also provide role-based security and task access control functionality. Role-based security refers to determining whether a user has access to a module of the financial close management system (such as viewing or editing a template or schedule, or viewing a dashboard) based on an associated role. Task access control refers to controlling access to a task (such as who can view and approve a task).

In accordance with the embodiment, the financial close management system also includes data layer 720. According to the embodiment, data layer 720 can provide task definition functionality and schedule and template repository functionality. More specifically, data layer 720 can store one or more defined tasks, schedules, and templates. Data layer 720 can provide document attachment and commentary functionality. More specifically, data layer 720 can store one or more document attachments or comments associated with a task. In addition, data layer 720 can provide auditing and logging functionality and security functionality. More specifically, data layer 720 can store actions performed in the financial close management system, and can store security roles that can be assigned to one or more users of the financial close management system.

Integration

One embodiment of the invention is directed towards an integration framework of a financial close management system that allows an end user to leverage services or interfaces from external applications as part of a business process, such as a financial close process, of a financial close management system. According to an embodiment, the integration framework can integrate a task that requires the user to interact with a user interface of an external application (identified as an "end user task") with the financial close management system. According to another embodiment, the integration framework can integrate a task that runs without any user interaction required, and that interacts with a web service of an external application (identified as a "system automated task") with the financial close management system.

Figure 8:
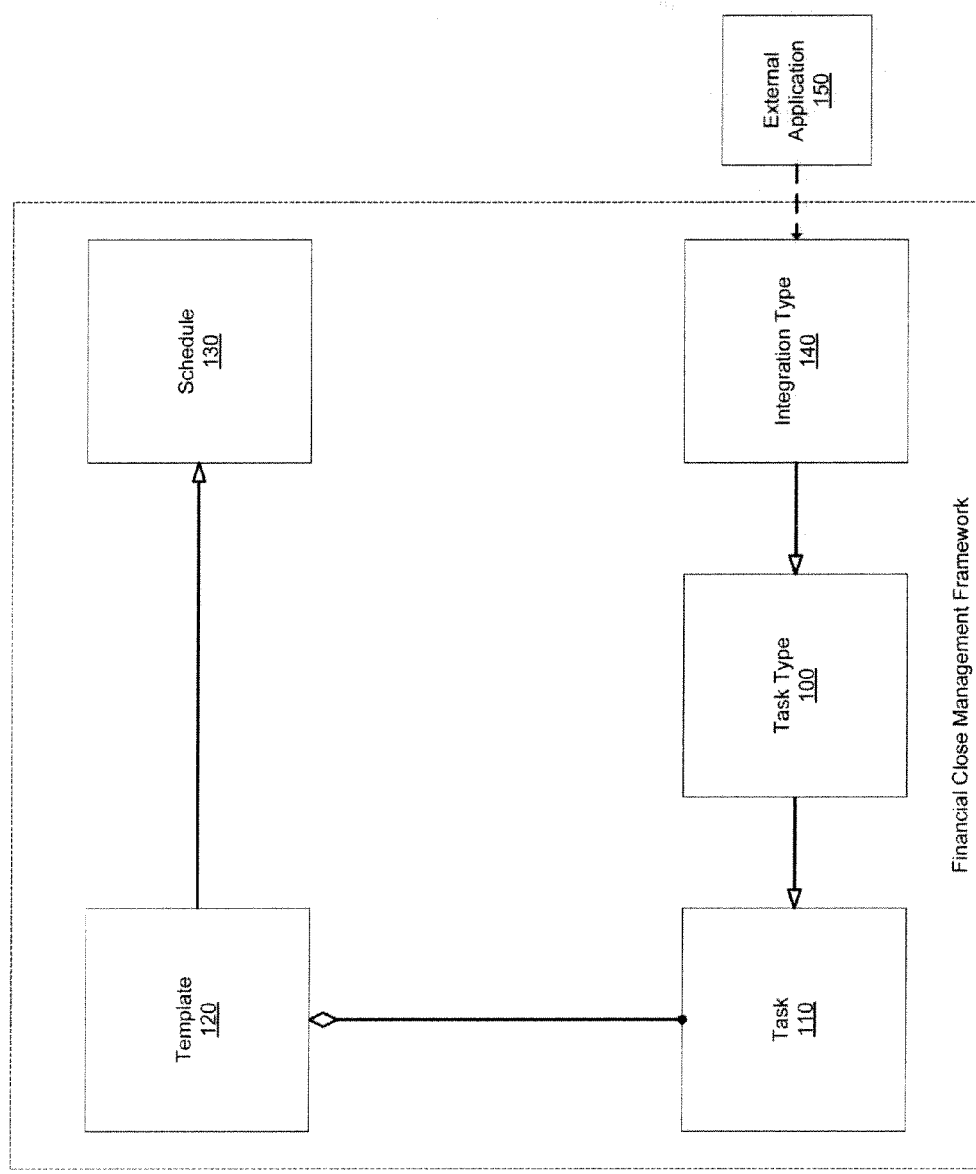
FIG. 8 illustrates an integration framework of a financial close management system according to an embodiment of the invention.

FIG. 8 illustrates an integration framework of a financial close management system according to an embodiment of the invention. More specifically, FIG. 8 illustrates an integration framework that is a component of a financial close management framework. FIG. 8 illustrates task type 100, task 110, template 120, and schedule 130, which is discussed in relation to FIG. 1. FIG. 8 also illustrates an additional core object according to an embodiment of the invention, integration type 140. Integration type 140 is a reusable definition that describes an action and a set of parameters that can be used to interface with an external application, such as external application 150. Interfacing with the external application can include calling either a service or an interface of the external application. An external application, such as external application 150, is a software application that is independent and external from the financial close management framework. Examples of an external application include the "Hyperion Financial Management," "Hyperion Financial Data Quality Management," and "Hyperion Financial Reporting" products from Oracle Corporation.

According to the embodiment, integration type 140 can include the following attributes: execution type, task parameters, execution detail, and response detail. An execution type defines the type of integration, either "end user" or "system automated." Task parameters define a set of parameters needed to invoke the end user or system automated task. For example, if the integrated service will run a report, a parameter allows for a user to specify which report to run. The values for these parameters may be set in a task type associated with integration type 140 (such as task type 110), or may be set at run time when a task associated with integration type 140 (such as task 110) is initiated. An execution detail defines execution information used to invoke a task. For an end user task, the execution detail can include a Uniform Resource Locator (URL) needed to invoke an external application interface. For a system automated task, the execution detail can include a web service endpoint needed to invoke the web service. A response detail includes information necessary to process information from a web service indicating success or failure and detail on the execution.

According to an alternate embodiment, integration type 140 can include the following additional attributes: name, description, unique code identifier, and external application. A name indicates a display name of integration type 140. A description indicates a general description associated with integration type 140. A unique code identifier uniquely identifies integration type 140 and distinguishes integration type 140 from other integration types defined in an integration framework. An external application identifies an external application that integration type 140 is identified with (such as external application 150).

As illustrated in FIG. 8, task type 100 can be based on integration type 140. In other words, task type 100 inherits from integration type 140, including inheriting a set of parameters defined by integration type 140. According to an embodiment, task type 100 can provide one or more default values for the set of parameters defined by integration type 140.

According to an embodiment, to integrate an external application service or interface within a financial close management system, the service or interface is first defined as an integration type within the financial close management system. Subsequently, a task type is created that wraps the integration for usage in the financial close management system. Lastly, a task is added within the financial close management system that is based on the created task type. According to the embodiment, an integration type is the only object that contains knowledge of the external application service or interface. Thus, the task type and task are not directly related to the external application service definition (or external application interface definition), and each object does not require knowledge of the external application service or interface.

Figure 9:
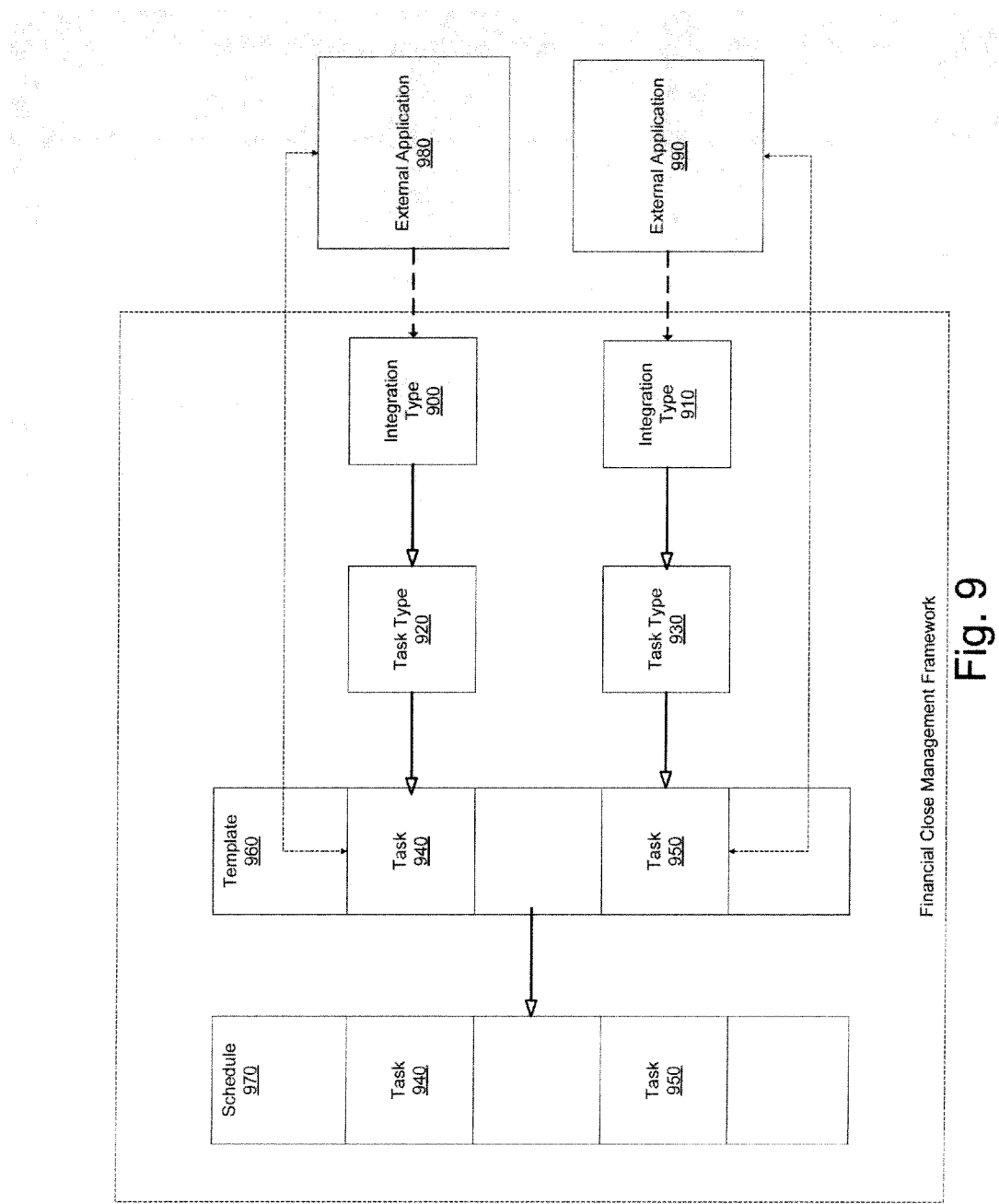
FIG. 9 illustrates an example implementation of an integration framework of a financial close management system according to an embodiment of the invention.

FIG. 9 illustrates an example implementation of an integration framework of a financial close management system according to an embodiment of the invention. One of ordinary skill in the art would readily appreciate that this is an example implementation described for clarification purposes, and that other implementations of the integration framework according to alternate embodiments also fall within the scope of the invention. For example, an implementation of an integration framework can include any number of integration types, external applications, task types, tasks, schedules, and templates, and still fall within the scope of the invention.

According to the illustrated embodiment, two integration types, integration types 900 and 910, can be defined for an integration framework, which is a component of a financial close management framework. As previously described, an integration type is a reusable definition that describes an action and a set of parameters that can be used to call either a service or an interface of an external application. In the illustrated embodiment, integration type 900 describes an action and a set of parameters used to call either a service or an interface of external application 980, and integration type 910 describes an action and a set of parameters used to call either a service or an interface of external application 990. As one of ordinary skill in the art would appreciate, any number of integration types can be defined for the integration framework.

According to the illustrated embodiment, two task types, task types 920 and 930, can be defined for the financial close management framework, where task type 920 inherits from integration type 900, and task type 930 inherits from integration type 910. As previously described, task types 920 and 930 can each define a specific type of task. Two tasks, tasks 940 and 950 can also be defined for the financial close management framework, within a template, template 960. While in the illustrated embodiment, the two tasks are defined within a template, in an alternate embodiment, tasks can be defined for the financial close management framework within a schedule, rather than a template. Task 940 inherits from task type 920 and can call either a service or an interface of external application 980. Task 950 inherits from task type 930 and can call either a service or an interface of external application 990. As one of ordinary skill in the art would appreciate, any number of tasks and task types can be defined for the financial close management framework, with any number of tasks inheriting from a given task type. Furthermore, any number of tasks can be defined within a schedule or within a template.

According to the embodiment, template 960 can be defined for the financial close management framework. As previously described, a template is a set of tasks. In the illustrated embodiment, template 960 can include tasks 940 and 950. As one of ordinary skill in the art would appreciate, any number of templates can be defined for the financial close management framework, and a template can include any number of tasks.

According to the embodiment, template 960 is expressed in schedule 970. Thus, schedule 970 inherits tasks 940 and 950, which can call either a service or an interface of external applications 980, and 990, respectively. As one of ordinary skill in the art would appreciate, any number of schedules can be defined for the financial close management framework, and a template can be expressed in any number of schedules.

One integration type is an end user task integration type that integrates a task that requires the user to interact with a user interface of an external application with the financial close management system. An example of a user interaction with a user interface of an external application is entering data into a data grid in Hyperion Financial Management. Another example of a user interaction with a user interface of an external application is executing a report in Hyperion Financial Reporting. According to an embodiment of the invention, in order to integrate an end user task with the financial close management system, the task can be exposed as a directly callable web application URL endpoint. From the perspective of a user of the financial close management system, the end user task integration type can provide a button to bring the user to a page to perform the task. In one embodiment, the financial close management system can launch the page as a new tab in a workspace. In another embodiment, the financial close management system can launch a new browser window, where the browser window is configured to access the Internet. According to the embodiment, the task is completed when a user submits the work in the financial close management system, and (optionally) the work is approved.

Figure 10:
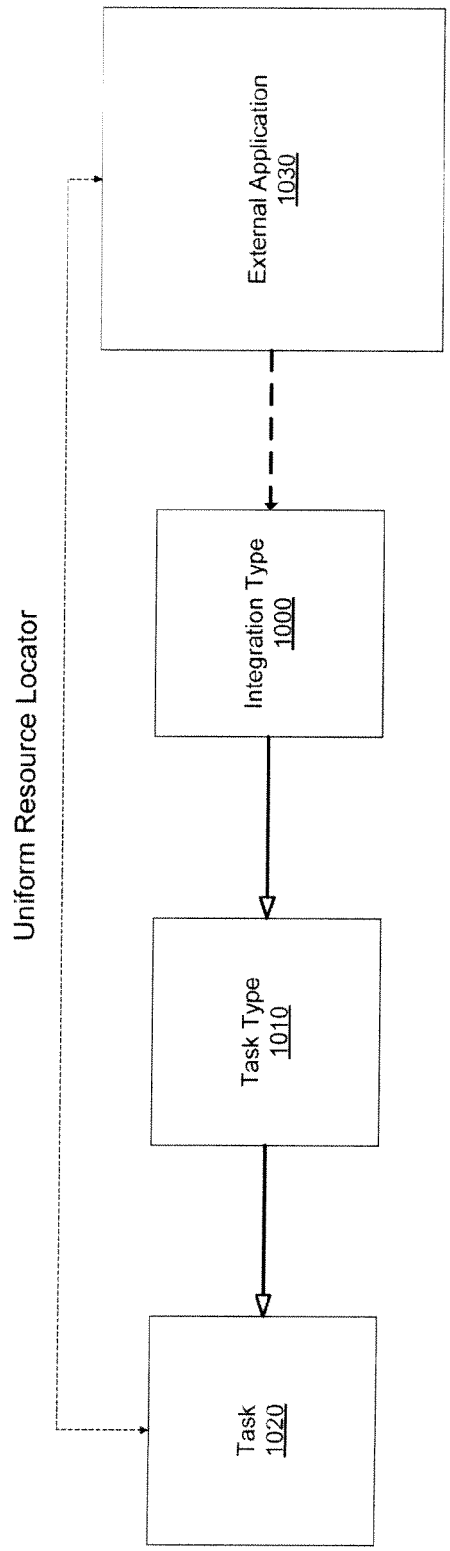
FIG. 10 illustrates an end user task integration type according to an embodiment of the invention.

FIG. 10 illustrates an end user task integration type according to an embodiment of the invention. FIG. 10 illustrates integration type 1000, task type 1010, task 1020, and external application 1030. In the illustrated embodiment, integration type 1000 is an end user task integration type. Thus, task 1020 which is based on task type 1010, which in turn is based on integration type 1000, includes a URL that directs a user to external application 1030. Based on this URL, a user can interact with a user interface of external application 1030, and thus, can complete the component of the task that requires interaction with external application 1030.

Another integration type is a system automated task integration type that integrates a task that runs without any user interaction required and that automatically interacts with a web service of an external application with the financial close management system. An example of automatic interaction with a web service of an external application is a consolidate process in Hyperion Financial Management. Another example of automatic interaction with a web service of an external application is a load data process in Hyperion Financial Management. According to an embodiment, in order to integrate a system automated task with the financial close management system, the task can be exposed as an asynchronous web service. In other words, the web service is configured to be called asynchronously so that the financial close management system is not required to wait for the task to be completed. The system automated task is completed, according to an embodiment, when an external application returns an indication that the task is completed.

Figure 11:
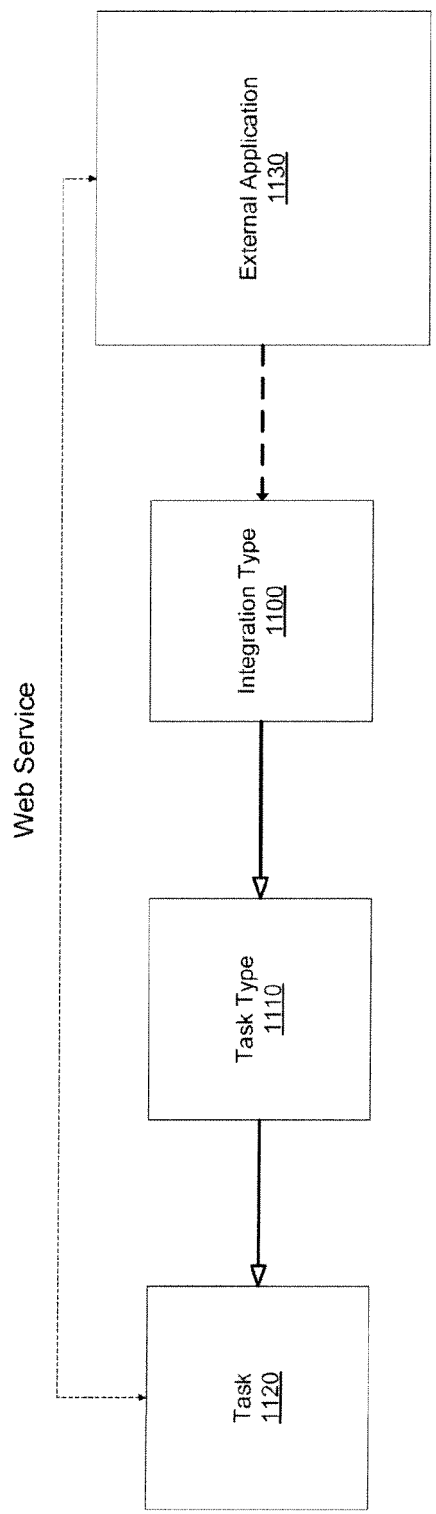
FIG. 11 illustrates a system automated task integration type according to an embodiment of the invention.

FIG. 11 illustrates a system automated task integration type according to an embodiment of the invention. FIG. 11 illustrates integration type 1100, task type 1110, task 1120, and external application 1130. In the illustrated embodiment, integration type 1100 is a system automated task integration type. Thus, task 1120 which is based on task type 1110, which in turn is based on integration type 1100, includes a name of a web service of external application 1130. Task 1120 can make an asynchronous call to the web service of external application 1130 in order to automatically perform its task as defined by a set of parameters of task 1120. The web service of external application 1130, upon completion of the task, returns an indication to task 1120 that the task is completed.

Figure 12:
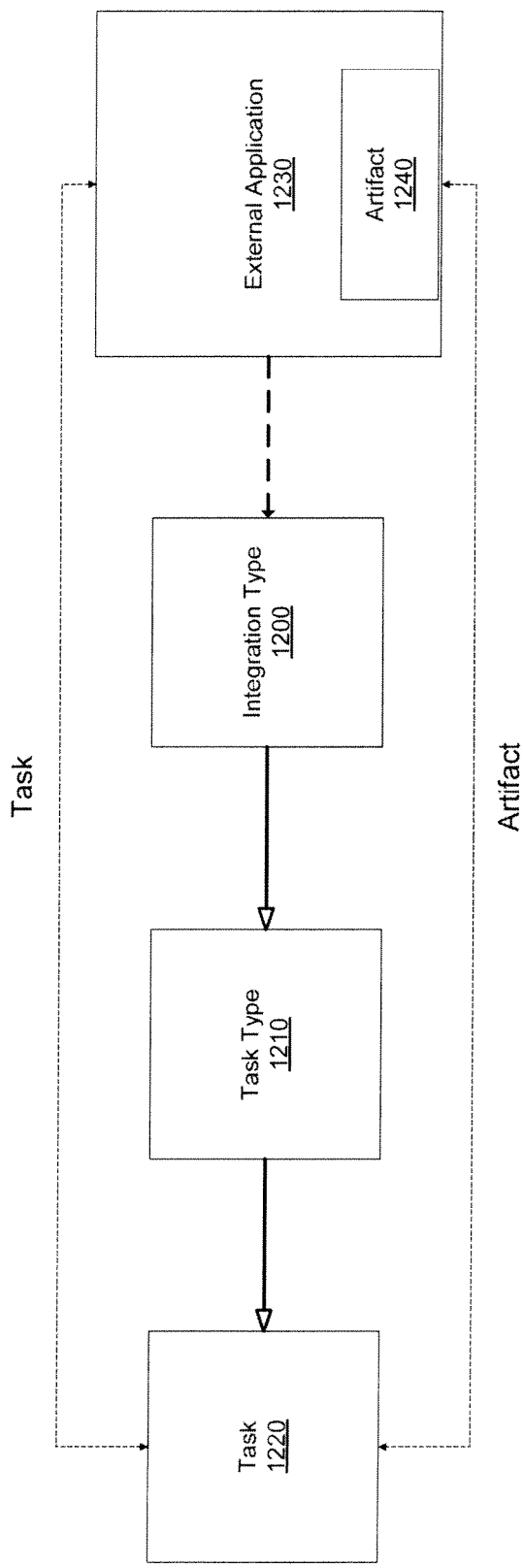
FIG. 12 illustrates an integrated task creating an artifact in an external application according to an embodiment of the invention.

FIG. 12 illustrates an integrated task creating an artifact in an external application according to an embodiment of the invention. FIG. 12 illustrates integration type 1200, task type 1210, task 1220, and external application 1230. Task 1220 can perform a task which utilizes external application 1230. As previously discussed, the task can include interacting with a user interface of external application 1230 via a URL, or making an asynchronous call to a web service of external application 1230. According to the embodiment, artifact 1240 can be created at external application 1230. As an example, artifact 1240 can include a report created by external application 1230. According to the embodiment, external application returns a link to artifact 1240 to task 1220. While one artifact, and one link to the artifact, are each illustrated in FIG. 12, one of ordinary skill in the art would readily appreciate that any number of artifacts can be created at external application 1230, and that any number of links can be returned to task 1220.

Figure 13:
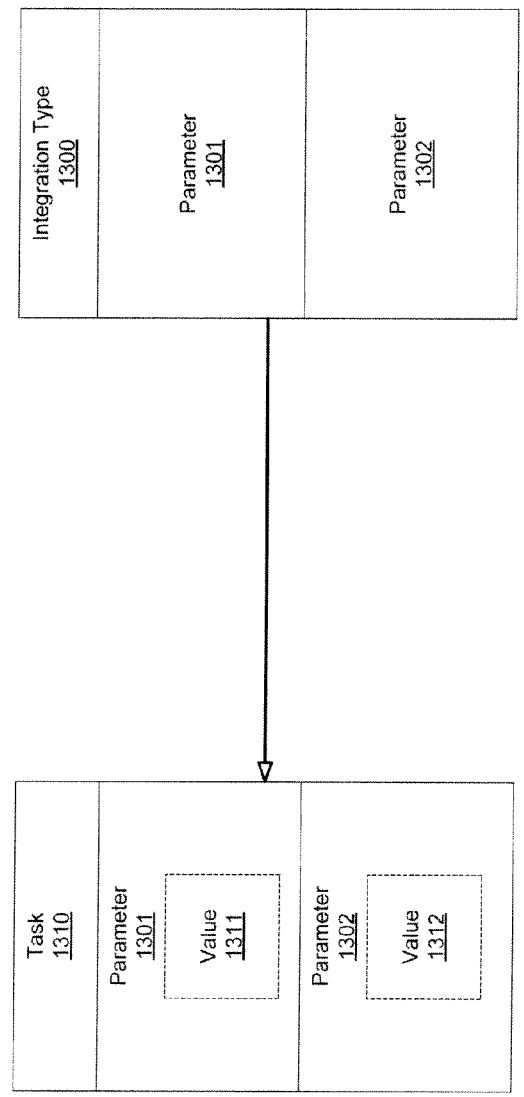
FIG. 13 illustrates parameters associated with an integration type according to an embodiment of the invention.

FIG. 13 illustrates parameters associated with an integration type according to an embodiment of the invention. Specifically, FIG. 13 illustrates an integration type 1300 and a task 1310 that is based on integration type 1300. Integration type 1300 includes parameters 1301 and 1302. Parameters 1301 and 1302 of integration type 1300 represent values that are sent to an external service provider when a task invokes a web service of an external application. For an end user task, the parameter values are sent as query parameters on an URL used to display a web module of the external application. For a system automated task, the parameters values are sent as part of a Simple Object Access Protocol (SOAP) message.

According to the illustrated embodiment, task 1310 also includes parameters 1301 and 1302, but also includes values 1311 and 1312. Thus, according to the embodiment, parameters can be defined for an integration type, which are inherited by a corresponding task, and parameter values can be defined for the parameters at the corresponding task.

According to an embodiment, each parameter defined for an integration type can have the following attributes: parameter name, parameter code, required flag, parameter order, tooltip and parameter dependencies. A parameter name is a display name of the parameter. The parameter name can be displayed next to the parameter when a task is created based on an integration type. A parameter code is an internal name used for the parameter. The parameter code can be used to generate a service request or URL when the task is processed. The value for a parameter code can be alpha-numeric. The required flag indicates whether or not a parameter value is required to execute the tasks. The parameter order is a number value indicating an order to display the parameters in a user interface of the financial close management system. A tooltip is descriptive text about the parameter and its usage. The tooltip value can be displayed if a user "hovers" over the parameter displayed at the user interface of the financial close management system. The parameter dependencies are a list of parameters that this parameter is dependent on. For example, if a parameter is dependent on another parameter (its parent), the parameter can be disabled in the user interface of the financial close management system until the parent parameter has a value.

In addition to the above attributes, a parameter can be of a specific parameter type. Such parameter types include the following: text, number, date, checkbox, static list, dynamic list, options group, document navigator, and dimension selector. A text type is used for a text value. When creating a parameter of this type, a maximum field length and maximum number of text rows can be specified. A number type is used for a numeric value. When creating a parameter of this type, a lower and upper bound of the numeric value can be specified. A date type is used for a date value. When creating a parameter of this type, a lower and upper bound can be specified. When a parameter of this type is displayed in a user interface of the financial close management system, the user can have the ability to use a date picker control. A checkbox type is used for a Boolean value. In the user interface of the financial close management system, a parameter of this type can be displayed as a checkbox control. A static list type is used for a pre-defined set of text values. A user can choose from the set of values using the user interface of the financial close management system. A dynamic list type is used for a dynamic set of text values, which can be determined at runtime, and is described below in more detail. An options group type is used for a pre-defined set of values, where a user can chose multiple values from the set. A document navigator type is used for a hierarchical set of values (e.g., folders and documents), which can be determined at runtime, and is described below in more detail. A dimension selector type is used for a pre-determined set of dimension values, and is described below in more detail.

According to an embodiment, a dynamic list parameter type represents a flat set of values that has an associated web service of an external application to provide a valid list of values. Thus, a dynamic list parameter has values that can be determined at run time. As an example, a task can require a name of a report and the list of valid reports can be retrieved from an external application by calling a web service. If the report name parameter is defined as a dynamic list parameter, the financial close management system can use an external application's web service to retrieve a list of values for a user to select from. Thus, instead of having to manually enter the name of a report, the end user will have a valid list of reports to select from.

According to the embodiment, to provide this functionality, the financial close management system needs to know how to call the appropriate web service. Thus, the following attributes can be defined for each dynamic list parameter type: Web Service Description Language (WDSL) location, namespace, port, name, SOAP action, response element, and response transform. The WSDL location is a URL for a web service's WDSL. The namespace is the namespace of the web service. The port is the web service port type, as defined in the WSDL. The name is the web service name, as defined in the WSDL. The SOAP action is the SOAP action for the web service. The response element is the name of the SOAP response Extensible Markup Language (XML) element that contains the parameter value. The response transform is an Extensible Stylesheet Language Transformation (XLST) string to transform a response XML into a valid form.

According to an embodiment, a document navigator parameter type is similar to the dynamic list parameter type in that the valid set of values can be retrieved from an external application at runtime. However, the document navigator parameter type represents a hierarchical set of values instead of a flat list. Thus, as an example, a document navigator parameter type can be used to represent documents and their folders.

A document navigator parameter type can have the same attributes as the dynamic list parameter type to define an associated web service. In addition to those attributes, the document navigator parameter type can also include the following attributes: parameter path code, one time query flag, parent folder parameter, item type web service, and item type filter parameter. A parameter path code is a path to a value of a hierarchical set of values. A one time query flag used to determine whether the web service returns an entire hierarchy in a single call. If a web service returns the entire hierarchy in a single call, the one time query flag can be set to a value of "Y." Likewise, if the web service returns the hierarchy one level at a time, the one time query flag can be set to a value of "N." A parent folder parameter is a web service parameter that indicates where a financial close management system should place a parent folder name. If the web service is not a "one time query" service (i.e., if the one time query flag is set to "Y") then the financial close management system will send a parent folder to the web service to provide the hierarchical context on each call. An item type web service is an additional web service that can be used to list out valid item types, when the items returned by an associated web service are segregated into types. An item type filter parameter is the item type to filter on if the item types can be filtered.

According to an embodiment, a dimension selector parameter type allows a user to select dimension values (such as a year or a period). The dimension selector parameter type can include a dimension selector URL and a dimension selector selection. The dimension selector URL is a URL of an external application's dimension selector user interface. The dimension selector selection is an XML string stating which dimensions are selectable, and whether the parameter type allows multiple selections.

An execution of an integrated task, such as an end user task and a system automated task, will now be described in more detail.

For an end user task, a financial close management system uses a directly callable external web application URL to execute the end user task. The URL can display the external user interface associated with the end user task. An example format of the URL, according to an embodiment of the invention, is:
{protocol}://{server}:{port}/{context}/
{page}?{param1}$PARAM1$&{param2}=
$PARAM2$ . . . .

According to the embodiment, the values for $PARAM1$, $PARAM2$, etc., can be filled in by the financial close management system with parameter codes that match based on the integration type definition. An example URL, utilizing the above format, is as follows:
http://rptsvr:80/reportingapp/
viewReport.jsp?reportName=$PARAM1$ In the above example, a "reportName" parameter code can be defined in the integration type. The financial close management system can use the value for the "reportName" parameter in place of $PARAM1$.

For a system automated task, a financial close management system uses endpoint information for an external web service. The web service endpoint information can be specified in an integration type's WSDL location element. An example format of the web service endpoint information, according to an embodiment of the invention, is:
   {protocol}://{server}:{port}/{context}/{service}?WDSL An example web service endpoint information, utilizing the above format, is as follows:
http://rptsvr:80/reportingService/ReportService?WSDL In addition to the WSDL location, the integration type can describe the web service detail using the following information: service name, service namespace, service operation, and service port type. The service name is the name of the service being called. In other words, the service name is the name of the web service defined in the WSDL (i.e., <wsdl:definitions name="Service Name">). The service namespace is the namespace associated with the web service. The namespace is defined in the WSDL (i.e., <wsdl:definitions name="Service Name" targetNamespace="Service Namespace">). The service operation is the name of the method to call on the web service. The service operation is also defined in the WSDL (i.e., <wsdl: operationname="Operation Name">). The service port type is the port definition for the web service. The port type is also defined in the WSDL (i.e., <wsdl:portType name="Service Port Type">).

An integrated task, such as a system automated task and an end user task, can also handle security for the task to prevent unauthorized users from accessing an external application. Security involves authentication and authorization. Authentication is the process of verifying an identity of a user, and verifying that the user is a trusted user. Authorization is the process of verifying that an authenticated user has the authority to perform a certain operation.

For a system automated task, a financial close management system can rely on a Web Services Security (WS-Security) standard to establish an identity of a user when making web service calls. WS-Security is an extension to SOAP that can apply security to web services through the use of various security token formats, such as Security Assertion Markup Language (SAML), Kerberos, and X.509. An external web service that is integrated with the financial close management server can support WS-Security and SAML based tokens for authentication. According to an embodiment, with SAML tokens, a trust relationship is established between the financial close management system and an external application through an exchange of certificates. This allows the financial close management system to invoke a system automated task using credentials such as a user's credentials or an assignee's credentials. According to the embodiment, a public key of the financial close management system can be imported into an external application's keystore, and a public key of the external application can be imported into a keystore of the financial close management system. Also according to the embodiment, while the financial close management system can handle authentication of a user, the financial close management system can let the external application handle authorization of a user.

For an end user task, a financial close management system can support single sign-on (SSO) with an external application, if that application is integrated with a SSO framework utilized by the financial close management system. According to an embodiment, when invoking an end user task, the financial close management system can include a SSO token in the URL if the task includes a SSO token replacement parameter. The external application can receive the SSO token and use it to launch the end user task. In an alternate embodiment, if the external application does not support the integration described above, the financial close management system can invoke the end user task URL without providing any user credentials. In this embodiment, the external application can prompt the user for credentials before displaying the end user task.

According to an embodiment, a system automated task supports asynchronous invocation. Asynchronous invocation, as understood by one of ordinary skill in the art, is a type of web service invocation that allows other processing to continue before the invoked service returns a response. Also according to the embodiment, a web service can have two port types, where each port type performs a one-way operation. One port responds to the web service request and the second port calls back into a financial close management system with a response. In addition to the two port types, according to the embodiment, the web service can accept Web Security Addressing (WS-Addressing) based reply information. The WS-Addressing headers can be used by the web service to direct responses to the correct callback service.

A handling of a web service response by an integrated task, such as an end user task and a system automated task, will now be described in more detail.

According to an embodiment, there are three types of web services that a financial close management system can receive a response from. These three types of web services include: a web service that executes a system automated task, a web service that provides a list of values for a dynamic list parameter type, and a web service that provides a hierarchical list of values for a document navigator parameter type. When invoked, each of the services described above responds with an XML-based SOAP message. The data types returned may be different based on the external application. A financial close management system can provide a mechanism to translate the response XML into a format understandable by the financial close management system. More specifically, for a web service defined in an integration type, an XLST string can be specified to take the actual web service response and translate it into a response expected by a financial close management system.

The following paragraphs describe the response XML expected for each of the web service types.

For a system automated task, according to an embodiment of the invention, a schema for a response XML, or XML schema document (XSD) that is transmitted by the web service, is as follows:

```
<xs:schema xmlns:xs="http://www.w3.org/2001/XMLSchema"
    elementFormDefault="qualified">
    <xs:simpleType name="resultValue">
        <xs:restriction base="xs:string">
            <xs:enumeration value="Success"/>
            <xs:enumeration value="Failure"/>
        </xs:restriction>
    </xs:simpleType>
    <xs:element name="TaskResult">
        <xs:complexType>
            <xs:sequence>
                <xs:element ref="Result"/>
                <xs:element ref="LogLocation"/>
                <xs:element ref="Messages"/>
            </xs:sequence>
        </xs:complexType>
    </xs:element>
    <xs:element name="Result" type="resultValue"/>
    <xs:element name="LogLocation" type="xs:anyURI"/>
    <xs:element name="Messages">
        <xs:complexType>
            <xs:sequence>
                <xs:element ref="Message"/>
            </xs:sequence>
        </xs:complexType>
    </xs:element>
    <xs:element name="Message" type="xs:string"/>
</xs:schema>
```

According to an embodiment, an example response XML for a system automated task is as follows:

```
<TaskResult>
    <Result>Success</Result>
    <LogLocation>http://RptSvr1/ReportApp/ViewLog.jsp?LogID=1234</LogLocation>
    <Messages>
        <Message>The report ran successfully.</Message>
    </Messages>
</TaskResult>
```

For a dynamic list parameter type, according to an embodiment of the invention, an XSD that is transmitted by the web service, is as follows:

```
<xs:element name="selectItem" maxOccurs="unbounded">
    <xs:complexType>
        <xs:sequence>
            <xs:element name="code" type="xs:string"
                minOccurs="1" maxOccurs="1"/>
            <xs:element name="name" type="xs:string"
                minOccurs="1" maxOccurs="1"/>
        </xs:sequence>
    </xs:complexType>
</xs:element>
```

According to an embodiment, an example response XML for a dynamic list parameter type is as follows:

```
<selectItem>
    <code>SEL1</code>
    <name>Selection Item 1</name>
</selectItem>
<selectItem>
    <code>SEL2</code>
    <name>Selection Item 2</name>
</selectItem>
<selectItem>
    <code>SEL3</code>
    <name>Selection Item 3</name>
</selectItem>
```

For a document navigator parameter type, according to an embodiment of the invention, an XSD that is transmitted by the web service, is as follows:

```
<xs:schema xmlns:xs="http://www.w3.org/2001/XMLSchema"
    elementFormDefault="qualified">
    <xs:element name="listing">
        <xs:complexType>
            <xs:sequence>
                <xs:element ref="folders"/>
                <xs:element ref="documents"/>
            </xs:sequence>
            <xs:attribute name="folder" use="optional"
                type="xs:NCName"/>
        </xs:complexType>
    </xs:element>
    <xs:element name="folders">
        <xs:complexType>
            <xs:sequence>
                <xs:element ref="folder"/>
            </xs:sequence>
        </xs:complexType>
    </xs:element>
    <xs:element name="folder">
        <xs:complexType>
            <xs:attribute name="description" use="optional"/>
            <xs:attribute name="id" use="required"
                type="xs:NCName"/>
            <xs:attribute name="name" use="required"/>
        </xs:complexType>
```

```
        </xs:element>
        <xs:element name="documents">
            <xs:complexType>
                <xs:sequence>
                    <xs:element maxOccurs="unbounded"
                        ref="document"/>
                </xs:sequence>
            </xs:complexType>
        </xs:element>
        <xs:element name="document">
            <xs:complexType>
                <xs:attribute name="description" use="optional"/>
                <xs:attribute name="id" use="required"
                    type="xs:NCName"/>
                <xs:attribute name="name" use="required"/>
                <xs:attribute name="type" use="optional"
                    type="xs:integer"/>
            </xs:complexType>
        </xs:element>
</xs:schema>
```

According to an embodiment, an example response XML for a document navigator parameter type is as follows:

```
<listing>
<folders>
<folder id="folder1" name="Folder 1" description="Folder 1
Description"/>
<folder id="folder2" name="Folder 2" description="Folder 1
Description"/>
</folders>
</listing>
<listing folder="folder1">
    <folders>
        <folder id="folder3" name="Folder 3"
        description="Folder 3 Description"/>
    </folders>
    <documents>
        <document id="doc1" type="1" name="Document 1"
        description="Doc 1 description"/>
        <document id="doc2" type="5" name="Document 2"/>
        <document id="doc3" type="5" name="Document 3"/>
    </documents>
</listing>
```

A process of creating integration types will now be described in more detail. According to an embodiment, a user can create one or more integration types within a financial close management system by adding and editing the integration types directly in a user interface of the financial close management system.

FIG. 14 illustrates an example of a user interface of a financial close management system according to an embodiment of the invention. The user interface can display name 1400, application 1410, and execution type 1420. Name 1400 indicates a name of each integration type. Application 1410 indicates an external application associated with each integration type. Execution type 1420 indicates a type of each integration type.

Figure 15:
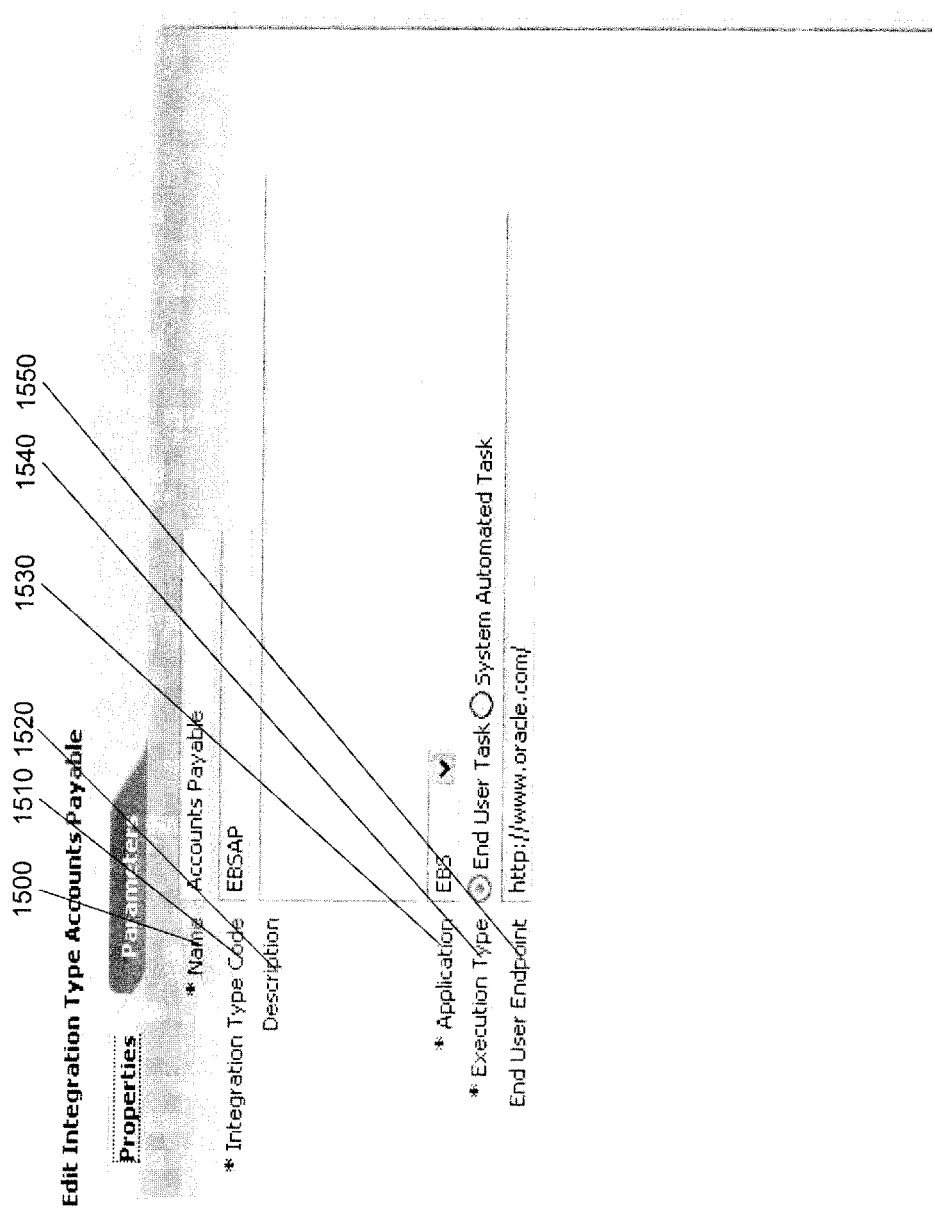
FIG. 15 illustrates an example of a user interface of a financial close management system configured to allow a user to create or edit an integration type according to an embodiment of the invention.

FIG. 15 illustrates an example of a user interface of a financial close management system configured to allow a user to create or edit an integration type according to an embodiment of the invention. The user interface displays a screen that identifies attributes of a new or existing integration type. In the illustrated embodiment, the user interface displays name 1500, integration type code 1510, description 1520, application 1530, execution type 1540, and end user endpoint 1550. Name 1500 identifies a display name of the integration type. Integration type code 1510 uniquely identifies the integration type and distinguishes the integration type from other integration types. Description 1520 indicates a general description associated with the integration type. Application 1530 identifies an external application that integration type is identified with. Execution type 1540 defines the type of integration, either "end user task" or "system automated task." End user endpoint 1550 identifies a directly callable web application URL endpoint, used to access an external application, when the integration type is an end user task integration type. According to an embodiment, a user can utilize the user interface to create (or edit) an integration type by entering (or modifying) attributes for the integration type.

Figure 16:
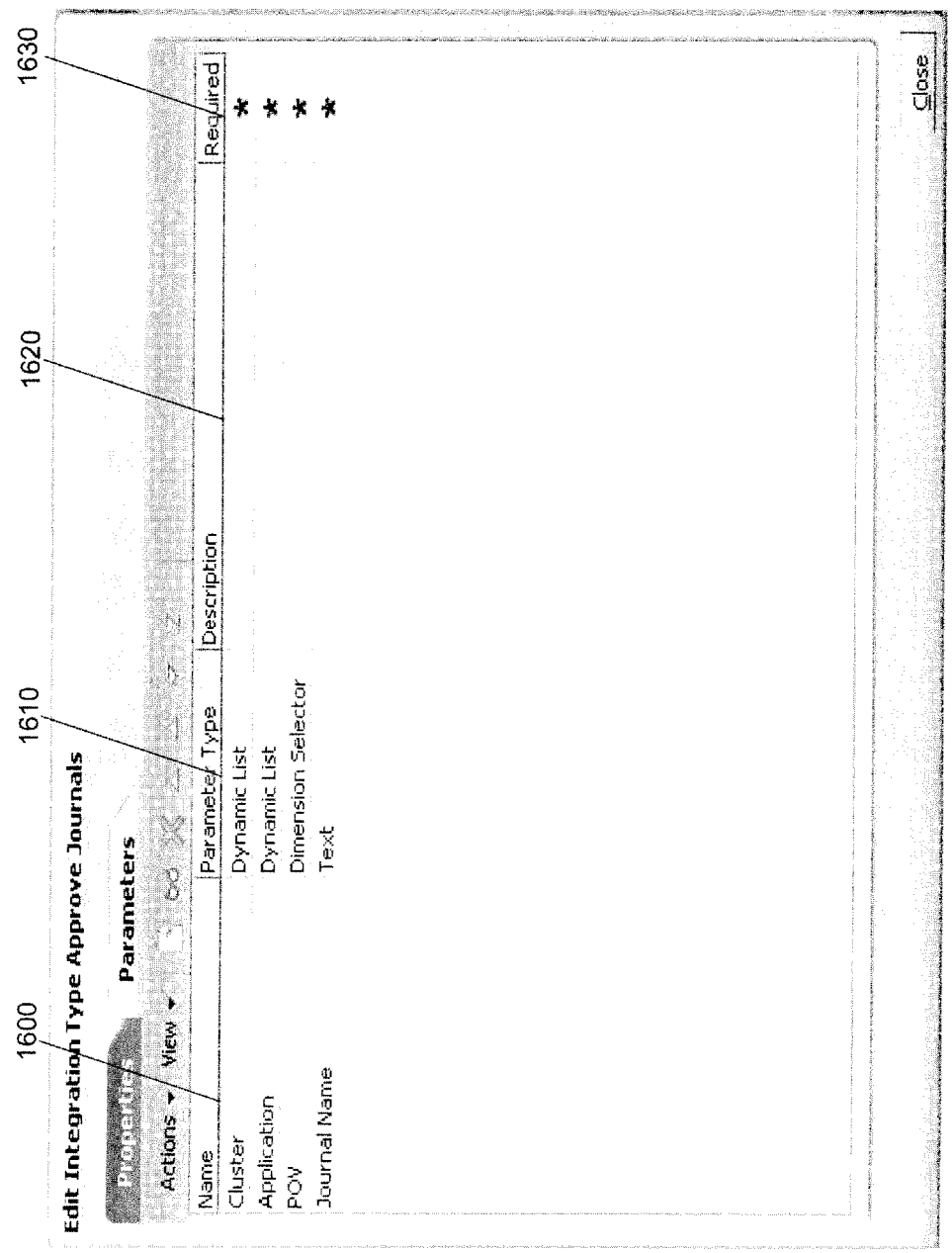
FIG. 16 illustrates an example of a user interface of a financial close management system configured to allow a user to create or edit a parameter for an integration type according to an embodiment of the invention.

FIG. 16 illustrates an example of a user interface of a financial close management system configured to allow a user to create or edit a parameter for an integration type according to an embodiment of the invention. The user interface displays a screen that identifies parameters for an integration type. In the illustrated embodiment, the user interface displays name 1600, parameter type 1610, description 1620, and required 1630. Name 1600 is a display name of the parameter. Parameter type 1610 indicates a type of the parameter. Description 1620 indicates a general description associated with the integration type. Required 1630 indicates whether or not a parameter value is required to execute a task associated with the parameter. According to an embodiment, a user can utilize the user interface to create (or edit) a parameter of an integration type by entering (or modifying) attributes for the parameter.

According to another embodiment of the invention, a user can create one or more integration types within a financial close management system by creating an integration XML document. The XML document can contain all of the integration types associated with an external application being integrated. According to the embodiment, the following XML schema can represent a structure and content for an integration XML document:

```
<?xml version="1.0" encoding="UTF-8"?>
<xs:schema xmlns:xs="http://www.w3.org/2001/XMLSchema"
            elementFormDefault="qualified"
            xmlns:xsl="http://www.w3.org/1999/XSL/Transform">
    <xs:element name="integrationTypes">
        <xs:complexType>
            <xs:sequence>
                <xs:element name="application" maxOccurs="1" minOccurs="0">
                    <xs:complexType>
                        <xs:attribute name="applicationName" use="required" type="xs:string"/>
                        <xs:attribute name="webAppName" use="required" type="xs:string"/>
                    </xs:complexType>
                </xs:element>
                <xs:element name="integrationType" maxOccurs="unbounded" minOccurs="1">
                    <xs:complexType>
                        <xs:sequence>
```

-continued

```
<xs:element name="responseXSLTemplate" type="xs:string" maxOccurs="1"
                minOccurs="0"/>
<xs:element name="responseNamespace" type="xs:anyURI" maxOccurs="1"
                minOccurs="0"/>
<xs:element name="name" maxOccurs="unbounded" minOccurs="1">
    <xs:complexType mixed="true">
        <xs:attribute name="language" use="required" type="xs:string"/>
    </xs:complexType> 13
</xs:element>
<xs:element name="description" maxOccurs="unbounded" minOccurs="1">
    <xs:complexType mixed="true">
        <xs:attribute name="language" use="required" type="xs:string"/>
    </xs:complexType>
</xs:element>
<xs:element name="parameter" maxOccurs="unbounded" minOccurs="0">
    <xs:complexType>
        <xs:sequence>
            <xs:element name="xsltTransformation" type="xs:string" maxOccurs="1"
                    minOccurs="0"/>
            <xs:element name="dimSelectorSelection" maxOccurs="1" minOccurs="0">
                <xs:complexType>
                    <xs:sequence>
                        <xs:element name="Parameters">
                            <xs:complexType>
                                <xs:sequence>
                                    <xs:element name="ParameterNames">
                                        <xs:complexType>
                                            <xs:sequence>
                                                <xs:element name="ParameterName" maxOccurs="unbounded">
                                                    <xs:complexType>
                                                        <xs:sequence>
                                                            <xs:element name="Name" type="xs:string" maxOccurs="1"
                                                                    minOccurs="1"/>
                                                            <xs:element name="Value" type="xs:string" maxOccurs="1"
                                                                    minOccurs="1"/>
                                                        </xs:sequence>
                                                    </xs:complexType>
                                                </xs:element>
                                            </xs:sequence>
                                        </xs:complexType>
                                    </xs:element>
                                </xs:sequence>
                            </xs:complexType>
                        </xs:element>
                    </xs:sequence>
                </xs:complexType>
            </xs:element>
        </xs:sequence>
    </xs:complexType>
</xs:element>
<xs:element name="dependency" maxOccurs="unbounded" minOccurs="0">
    <xs:complexType>
        <xs:attribute name="parameterCode" use="required" type="xs:string"/>
        <xs:attribute name="parameterName" use="required" type="xs:string"/>
    </xs:complexType>
</xs:element>
<xs:element name="name" maxOccurs="1" minOccurs="1">
    <xs:complexType mixed ="true">
        <xs:attribute name="language" use="required" type="xs:string"/> 14
    </xs:complexType>
</xs:element>
<xs:element name="selectItem" maxOccurs="unbounded" minOccurs="0">
    <xs:complexType>
        <xs:sequence>
            <xs:element name="name" maxOccurs="unbounded" minOccurs="1">
                <xs:complexType mixed="true">
                    <xs:attribute name="language" use="required" type="xs:string"/>
                </xs:complexType>
            </xs:element>
        </xs:sequence>
        <xs:attribute name="order" use="required" type="xs:string"/>
        <xs:attribute name="selectItemCode" use="required"
                        type="xs:string"/>
    </xs:complexType>
</xs:element>
<xs:element name="docNavDocTypeXsltTransformation" type="xs:string"
                maxOccurs="1" minOccurs="0"/>
</xs:sequence>
<xs:attribute name="SOAPAction" type="xs:string"/>
<xs:attribute name="dimSelectorURL" type="xs:anyURI"/>
<xs:attribute name="docNavDocTypeName" type="xs:string"/>
<xs:attribute name="docNavDocTypeParameter" type="xs:string"/>
<xs:attribute name="docNavDocTypePort" type="xs:string"/>
```

```
            <xs:attribute name="docNavDocTypeRespElement" type="xs:NMTOKEN"/>
            <xs:attribute name="docNavDocTypeSOAPAction" type="xs:string"/>
            <xs:attribute name="docNavDocTypeURI" type="xs:anyURI"/>
            <xs:attribute name="docNavDocTypeWSDLLoc" type="xs:anyURI"/>
            <xs:attribute name="docNavFolderParameter" type="xs:string"/>
            <xs:attribute name="docNavOneTimeQuery" type="xs:string"/>
            <xs:attribute name="multiselect">
               <xs:simpleType>
                  <xs:restriction base="xs:string">
                     <xs:enumeration value="Y"/>
                     <xs:enumeration value="N"/>
                  </xs:restriction>
               </xs:simpleType>
            </xs:attribute>
            <xs:attribute name="order" use="required" type="xs:integer"/>
            <xs:attribute name="parameterCode" use="required" type="xs:string"/>
            <xs:attribute name="parameterPathCode" type="xs:string"/>
            <xs:attribute name="parameterType" use="required">
               <xs:simpleType>
                  <xs:restriction base="xs:string">
                     <xs:enumeration value="TEXT"/>
                     <xs:enumeration value="INTEGER"/>
                     <xs:enumeration value="NUMBER"/>
                     <xs:enumeration value="DATE"/> 15
                     <xs:enumeration value="BOOLEAN"/>
                     <xs:enumeration value="LOV"/>
                     <xs:enumeration value="DYNLOV"/>
                     <xs:enumeration value="RADIO"/>
                     <xs:enumeration value="USER"/>
                     <xs:enumeration value="POV"/>
                     <xs:enumeration value="DOCNAV"/>
                  </xs:restriction>
               </xs:simpleType>
            </xs:attribute>
            <xs:attribute name="required" use="required">
               <xs:simpleType>
                  <xs:restriction base="xs:string">
                     <xs:enumeration value="Y"/>
                     <xs:enumeration value="N"/>
                  </xs:restriction>
               </xs:simpleType>
            </xs:attribute>
            <xs:attribute name="serviceName" type="xs:string"/>
            <xs:attribute name="serviceNamespace" type="xs:anyURI"/>
            <xs:attribute name="servicePort" type="xs:string"/>
            <xs:attribute name="serviceResponseElement" type="xs:NMTOKEN"/>
            <xs:attribute name="serviceWSDLLoc" type="xs:anyURI"/>
         </xs:complexType>
      </xs:element>
   </xs:sequence>
   <xs:attribute name="applicationCode" use="required" type="xs:string"/>
   <xs:attribute name="callbackOperation" type="xs:string"/>
   <xs:attribute name="callbackPortType" type="xs:string"/>
   <xs:attribute name="endUserURL" type="xs:anyURI"/>
   <xs:attribute name="executionType" use="required">
      <xs:simpleType>
         <xs:restriction base="xs:string">
            <xs:enumeration value="S"/>
            <xs:enumeration value="U"/>
         </xs: restriction >
      </xs:simpleType>
   </xs:attribute>
   <xs:attribute name="integrationTypeCode" use="required" type="xs:string"/>
   <xs:attribute name="serviceName" type="xs:string"/>
   <xs:attribute name="serviceNamespace" type="xs:anyURI"/>
   <xs:attribute name="serviceOperation" type="xs:string"/>
   <xs:attribute name="servicePortType" type="xs:string"/>
   <xs:attribute name="serviceWSDLLoc" type="xs:anyURI"/>
   <xs:attribute name="userCreated" use="required">
      <xs:simpleType>
         <xs:restriction base="xs:string">
            <xs:enumeration value="Y"/> 16
            <xs:enumeration value="N"/>
         </xs: restriction>
      </xs:simpleType>
   </xs:attribute>
 </xs:complexType>
</xs:element>
</xs:sequence>
</xs:complexType>
```

```
        </xs:element>
</xs:schema>
```

According to the embodiment, the example XML schema includes the following elements: integrationType, name, description, parameter, selectItem, and dependency. The integrationType parameter is a root element of an XML tree and describes one integration type in a financial close management system. The name element can be used to store a translated name of each integration type. There can be a localized name element for each language supported by the financial close management system. The description element can be used to store a translated description of each integration type. There can be a localized description element for each language supported by the financial close management system. The parameter element describes one parameter of an integration type. The selectItem element describes one element in a selectable list for a list of values type parameter or a radio type parameter. The dependency element indicates that one parameter is dependent on another parameter. Each element may have one or more attributes that further define the element.

In accordance with an embodiment, the integration XML document can also describe an external application that each integration type is associated with. Attributes of the external application include name and internal parameters.

According to the embodiment, after an integration XML document has been created, the XML document can be loaded into a financial close management system to create or update integration types in the system.

According to an embodiment of the invention, an example integration XML document is provided, as follows:

```
<?xml version="1.0" encoding="UTF-8"?>
<integrationTypes xmlns:msxsl="urn:schemas-microsoft-com:xslt"
                                 xmlns:fcmns1="http://reports.xyz.com">
    <application applicationName="Sample"/>
    <integrationType integrationTypeCode="RUNREPORT" applicationCode="Sample"
                                 executionType="S" userCreated="N"
                                 serviceNamespace="http://reports.xyz.com"
                                 serviceWSDLLoc="http://rptsvr:80/reportingService/ReportService?WSDL"
                                 serviceName="ReportService" servicePortType="ReportService"
                                 callbackPortType="ReportServiceResponse" serviceOperation="runReport"
                                 callbackOperation="RunReportResponse">
        <responseXSLTemplate>
            <![CDATA[
            <xsl:template match="return">
                <fcmns1:TaskResult>
                    <fcmns1:Result>
                        <xsl:choose>
                            <xsl:when test="resultCode = 'Success'">Success</xsl:when>
                            <xsl:otherwise>Failure</xsl:otherwise>
                        </xsl:choose>
                    </fcmns1:Result>
                    <fcmns1:LogLocation>
                        <xsl:value-of select="resultLogPath"/> 23
                    </fcmns1:LogLocation>
                    <fcmns1:Messages>
                        <fcmns1:Message>
                            <fcmns1:Value>
                                <xsl:value-of select="resultMessage"/>
                            </fcmns1:Value>
                        </fcmns1:Message>
                    </fcmns1:Messages>
                </fcmns1:TaskResult>
            </xsl:template>
            ]]>
        </responseXSLTemplate>
        <name language="en" countryCode="US">Run Report</name>
        <description language="en" countryCode="US">
            Run Report Automated Task
        </description>
        <parameter parameterCode="reportName" required="Y"
                         parameterType="DYNLOV" order="1"
                         serviceWSDLLoc="http://rptsvr:80/reportingService/ReportListingService?WSDL"
                         serviceNamespace="http://reports.xyz.com" serviceName="ReportListingService"
                         servicePort="ReportListingServicePortType"
                         serviceResponseElement="ns0:getReportsResponse"
SOAPAction="getReports">
            <name language="en" countryCode="US">Report Name</name>
            <xsltTransformation>
                <xsl:stylesheet xmlns:xsl="http://www.w3.org/1999/XSL/Transform"
                                           xmlns:ns0="http://reports.xyz.com" version="1.0">
                    <xsl:template match="ns0:getReportsResponse">
                        <selectItems>
                            <xsl:for-each select="return">
```

```
                    <selectItem>
                        <code>
                            <xsl:value-of select="."/>
                        </code>
                        <name>
                            <xsl:value-of select="."/>
                        </name>
                    </selectItem>
                </xsl:for-each>
            </selectItems>
        </xsl:template>
    </xsl:stylesheet>
</xsltTransformation>
        </parameter>
    </integrationType>
    <integrationType integrationTypeCode="VIEWREPORT" applicationCode="Sample"
        executionType="U" userCreated="N"
        endUserURL="http://rptsvr:80/reportingApp/ViewReport.jsp?reportName=
$REPORTNAME$">
        <name language="en" countryCode="US">Manage Documents</name> 24
        <description language="en" countryCode="US">View Report UI Task</description>
        <parameter parameterCode="REPORTNAME" required="Y"
            parameterType="DYNLOV" order="1"
            serviceWSDLLoc="http://rptsvr:80/reportingService/ReportListingService?WSDL"
            serviceNamespace="http://reports.xyz.com" serviceName="ReportListingService"
            servicePort="ReportListingServiceReportType"
            serviceResponseElement="ns0:getReportsResponse" SOAPAction="getReports">
            <name language="en" countryCode="US">Report Name</name>
            <xsltTransformation>
                <xsl:stylesheet xmlns:xsl="http://www.w3.org/1999/XSL/Transform"
                                xmlns:ns0="http://reports.xyz.com" version="1.0">
                    <xsl:template match="ns0:getReportsResponse">
                        <selectItems>
                            <xsl:for-each select="return">
                                <selectItem>
                                    <code>
                                        <xsl:value-of select="."/>
                                    </code>
                                    <name>
                                        <xsl:value-of select="."/>
                                    </name>
                                </selectItem>
                            </xsl:for-each>
                        </selectItems>
                    </xsl:template>
                </xsl:stylesheet>
            </xsltTransformation>
        </parameter>
    </integrationType>
</integrationTypes>
```

According to the above example, the first integration type, RUNREPORT, points to an external web service for running an automated report on the http://rptsvr:80/reportingService/ReportingService web service. The web service method runReport takes a single parameter reportName that identifies the report to run. The available reports can be listed by a user interface by calling the http://rptsvr:80/reportingService/ReportingService web service method getReports as defined in the integration type.

Also according to the above example, the second integration type, VIEWREPORT, points to an end user user interface module at the URL http://rptsvr1:80/reportingApp/ViewReport.jsp. When called in a browser configured to access the Internet, the URL display the report for the end user. The ViewReport URL also takes a single parameter REPORTNAME via the URL. The actual REPORTNAME value is replaced when the URL is launched. The available reports will be listed by the user interface by calling the getReports web service method as defined in the integration type.

According to the example, if the results from the runReport and getReports methods are in a format expected by the financial close management system, associated XSL templates can be included in the integration type definition, as shown above.

Figure 17:
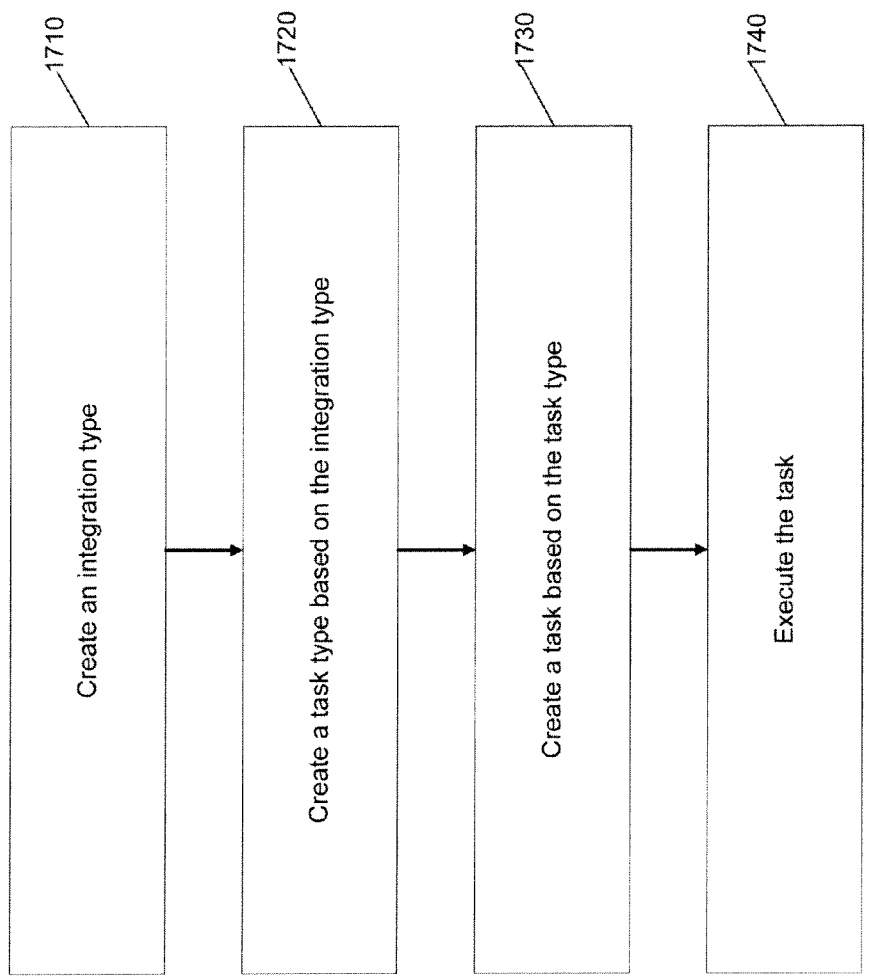
FIG. 17 illustrates a flow diagram of the functionality of a financial close management module according to an embodiment of the invention.
Figure 35:
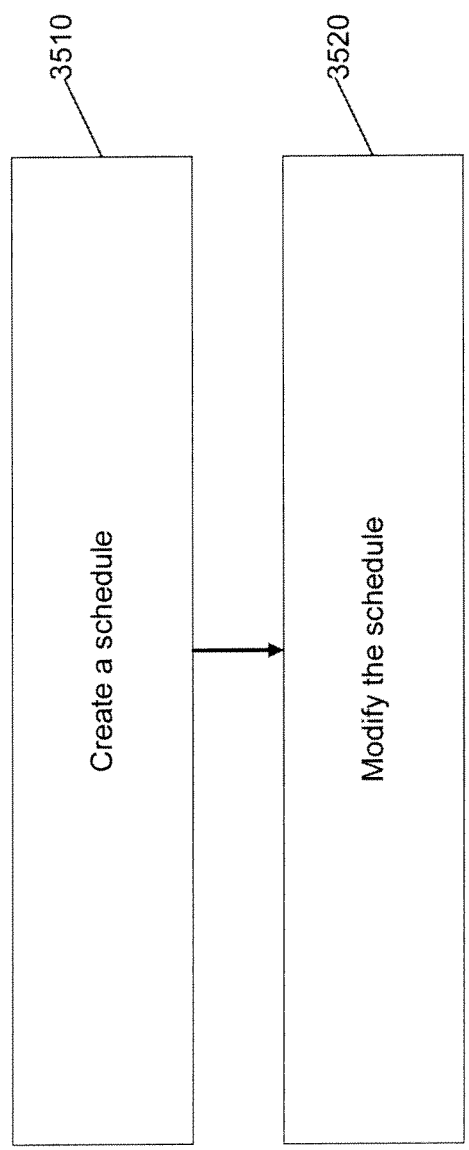
FIG. 35 illustrates a flow diagram of the functionality of a financial close management module according to another embodiment of the invention.

FIG. 17 illustrates a flow diagram of the functionality of a financial close management module according to an embodiment of the invention. In one embodiment, the functionality of the flow diagram of FIG. 17, as well as FIG. 35 and FIG. 47, is implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1710, an integration type is created in a financial close management system. According to the embodiment, an integration type includes a reusable definition that describes an action and a set of parameters that can be used to interface with an external application. At 1720, a task type is created based on the integration type in the financial close management system. According to the embodiment, a task type defines a type of task that can be performed in the financial close management system. At 1730, a task is created based on the task type in the financial close management system. According to the embodiment, a task is a component of a financial close process. At 1740, the task is executed in the financial close management system. According to the embodiment, the task interfaces with the external application using the integration type.

Thus, according to an embodiment of the invention, tasks of a financial management system can be associated with an external application through an integration framework that utilizes integration types. In accordance with the embodiment, the integration framework can allow a user to leverage services from external applications as part of a process flow, and thus, provides a single application to manage all the activities of the process flow.

Managing Schedules

One embodiment of the invention is directed towards managing schedules. As previously described, a schedule is a core object of a financial close management system, and is an expression of a template. According to the embodiment, managing a schedule can include creating a new schedule, modifying an existing schedule, deleting an existing schedule, duplicating an existing schedule, validating an existing schedule, creating a template from an existing schedule, setting a status of an existing schedule, and importing and exporting an existing schedule. In addition, according to the embodiment, managing a schedule can include defining task type parameters that can be set during scheduling and setting task parameters of a schedule at a schedule level rather than a task level.

As described above, a schedule is an expression of a template, which is an ordered set of tasks. A schedule can inherit from a template, including all the tasks of the template, and assigns each task to a particular point in time on a calendar (such as date). A schedule can have one of four statuses: Pending, Open, Closed, and Locked. The status of Pending indicates that the schedule has been created, but is not yet active. The status of Open indicates that the schedule is active, that the schedule is open for work to be performed, and that tasks in the schedule can be run. The status of Closed indicates that the schedule is no longer active but follow-up work may be required. In this status, tasks in the schedule continue to proceed based on their definitions, but tasks cannot be added to the schedule. The status of Locked indicates that the schedule is locked, that tasks in the schedule are forced to complete, and that only an administrator can modify the schedule or its tasks. In this status, a user cannot modify the schedule or its tasks, but can only view and delete the schedule.

According to an embodiment, when a schedule is created in a financial close management system, the schedule can have a default status of Pending. The default status of Pending allows adjustments to be made to the schedule. To run a schedule, the status of the schedule can be changed from Pending to Open. When the schedule has a status of Open, tasks can execute according to their definition. The status of the schedule can be changed to Closed after all tasks of the schedule are completed, or after it is determined that no new tasks should be added to the schedule.

Figure 18:
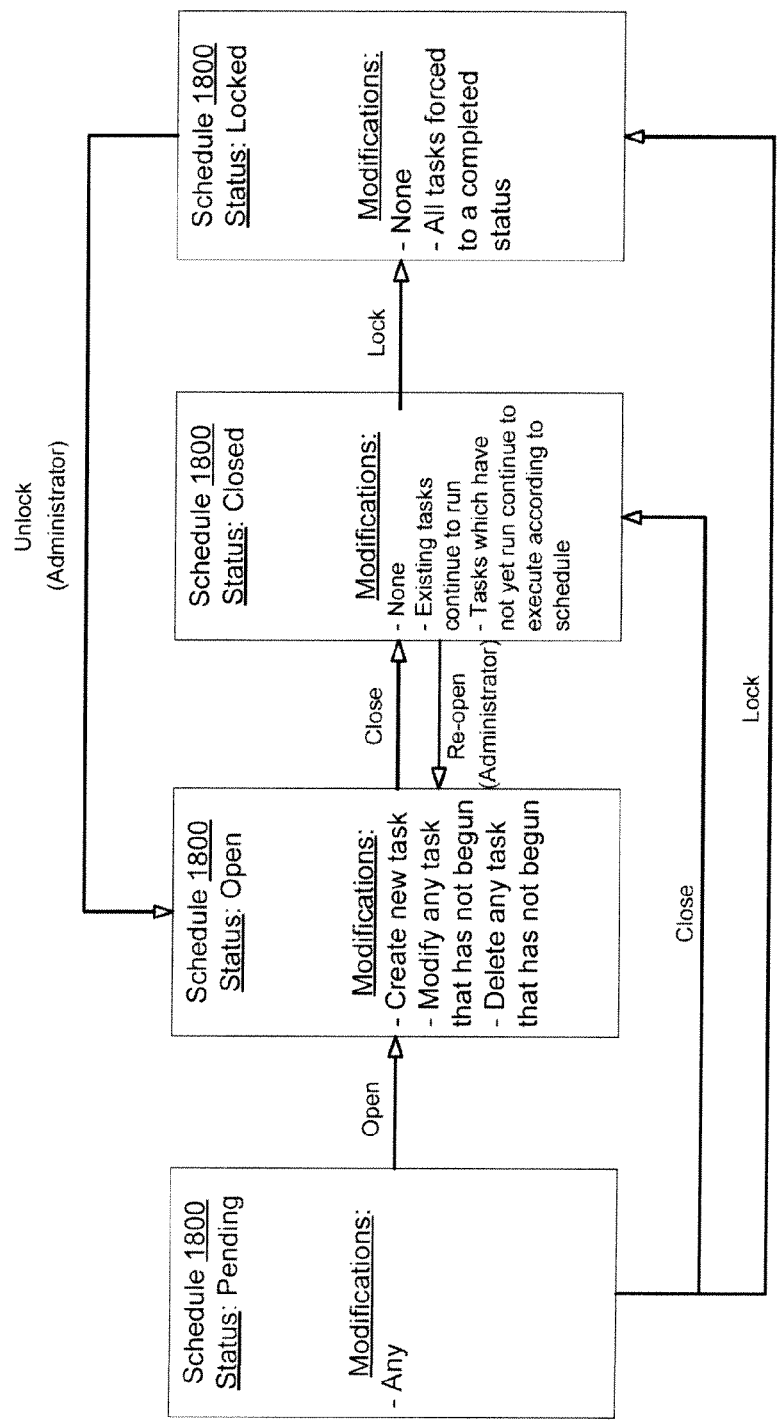
FIG. 18 illustrates different statuses of a schedule according to an embodiment of the invention.

According to an embodiment of the invention, a status of a schedule can determine, in part, how a schedule can be managed. Specifically, the status of the schedule can determine, in part, what type of modifications can be made to an existing schedule. Specific types of modifications that can be made to an existing schedule will be discussed below in more detail. FIG. 18 illustrates different statuses of a schedule according to an embodiment of the invention. Specifically, FIG. 18 illustrates four instances of a schedule, schedule 1800, where each instance of schedule 1800 has one of the following statuses: Pending, Open, Closed, and Locked. In the instance of schedule 1800 where the status is Pending, schedule 1800 has been created, but is not yet active, which means that none of the tasks of schedule 1800 have started. Thus, schedule 1800 can be modified in any way, as no initiated tasks will be affected by the modifications to schedule 1800. Thus, as illustrated in FIG. 18, the financial close management system can allow a user to make any type of modification to schedule 1800. However, in the instance of schedule 1800 where the status is Open, schedule 1800 is active, and one or more tasks of schedule 1800 have started to run. Thus, schedule 1800 can only be modified in a way that does not affect the tasks of schedule 1800 that have started to run. Thus, as illustrated in FIG. 18, the financial close management system only allows a user to perform one of the following modifications: create a new task for schedule 1800, modify any task of schedule 1800 that has not begun, or delete any task of schedule 1800 that has not begun.

In the instance of schedule 1800 where the status is Closed, schedule 1800 is in an administrative status where no modifications to schedule 1800 are permitted. Specifically, no additional tasks can be added, no existing tasks can be modified, and existing tasks can complete. Any tasks that have not yet run continue to execute according to schedule 1800. In the instance of schedule 1800 where the status is Locked, no modifications to schedule 1800 are permitted, and all tasks are forced to a completed status. Any tasks that have not yet run will not execute.

Thus, according to the illustrated embodiment of FIG. 18, the ability to modify an existing schedule is restricted as the schedule proceeds from a status of Pending, to a status of Open, to a status of Closed, and to a status of Locked. Furthermore, according to the embodiment, as illustrated in FIG. 18 through the use of arrows, a schedule can move from a status of Pending to a status of Open, can move from a status of Open to a status of Closed, can move from a status of Closed to a status of Locked, can move from a status of Pending to a status of Closed, and can move from a status of Pending to a status of Locked, where a user of a financial close management system can change the status of the schedule. According to the embodiment, a schedule can also move from a status of Closed back to a status of Open, or from a status of Locked back to a status of Open, but only an administrator of a financial close management system can change the status of the schedule from Closed or Locked back to Open.

Methods for creating a new schedule will now be described in more detail.

Figure 19:
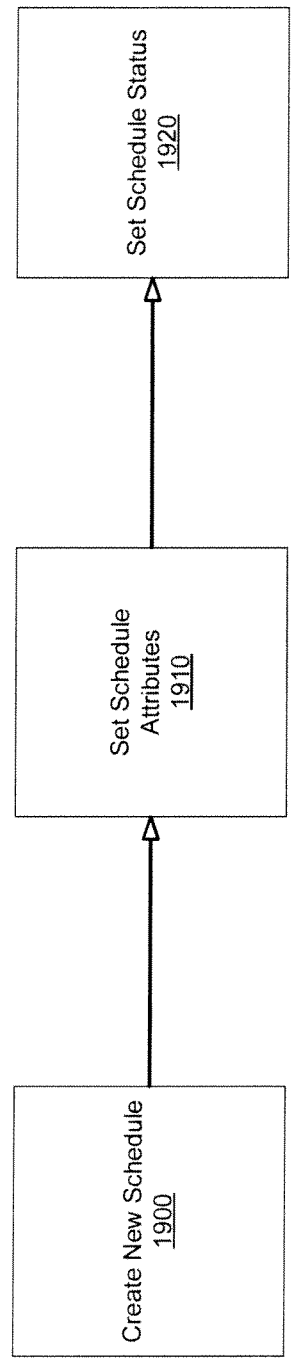
FIG. 19 illustrates a method of creating a schedule according to an embodiment of the invention.

FIG. 19 illustrates a method of creating a schedule according to an embodiment of the invention. According to the illustrated embodiment, a schedule can be created manually. In the illustrated embodiment, at 1900, a new schedule is created. More specifically, a new schedule object is created in the financial close management system in response to an indication by a user to create the new schedule object. At 1910, attributes of the schedule are set. More specifically, attributes of the schedule are set by the user. In an example embodiment, the attributes of the schedule can include a schedule name, a schedule description, a start date, an end date, a year, a period, and a schedule owner. At 1920, a status of the schedule is set. More specifically, according to an embodiment of the invention, the status of the schedule is set to one of the four statuses described above: Pending, Open, Closed, or Locked. According to an embodiment of the invention, a user can create a schedule by selecting a button displayed on a user interface of the financial close management screen which displays a "Manage Schedules" screen on the user interface. An example of a "Manage Schedules" screen displayed by the user interface is described in relation to FIG. 31 below.

Figure 20:
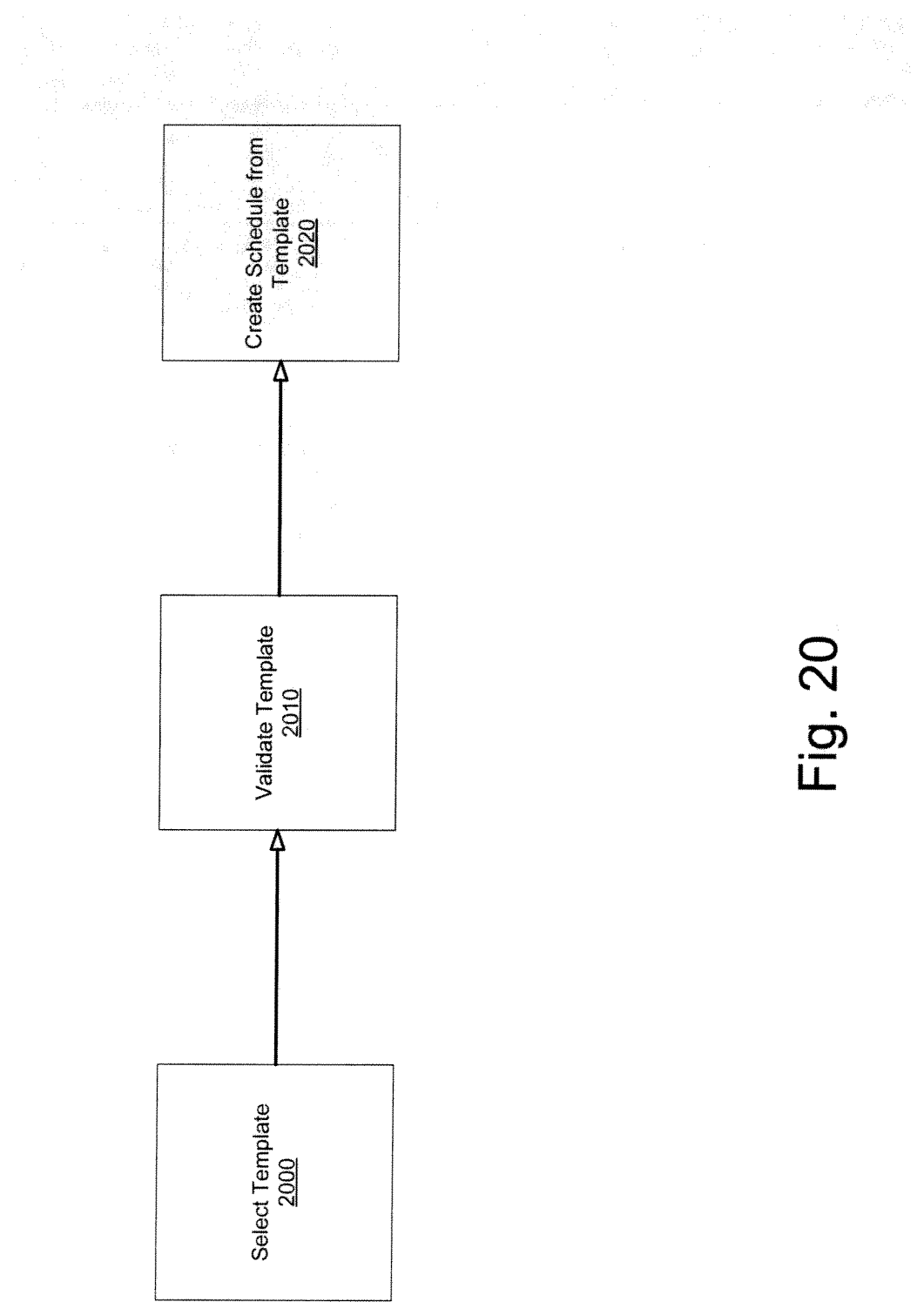
FIG. 20 illustrates another method of creating a schedule according to an embodiment of the invention.

FIG. 20 illustrates another method of creating a schedule according to an embodiment of the invention. According to the illustrated embodiment, a schedule can be created automatically from a template, where the schedule inherits tasks from the template. In the illustrated embodiment, at 2000, a template is selected. More specifically, according to an embodiment of the invention, an existing template within the financial close management system is selected by a user. At 2010, the template is validated. More specifically, according to the embodiment, the financial close management system determines that the template complies with a set of business rules defined within the financial close management system. At 2020, a schedule is created from the selected template. The creating the schedule from the selected template can include copying each task of the selected template. More specifically, according to the embodiment, a financial close management system can align offset days to calendar dates based on a "Day Zero" date that is entered by a user and assigned to one or more tasks of the template assigned an offset day of 0. As previously described, one or more tasks of a template are assigned an offset day of 0 in the template. All tasks that precede the one or more tasks assigned an offset day of 0 are assigned offset days that are negative numbers in the template, and all tasks that succeed the one or more tasks assigned an offset day of 0 are assigned offset days that are positive numbers in the template. When the schedule is created from the selected template, the one or more tasks of the template assigned an offset day of 0 are scheduled for the "Day Zero" date entered by the user in the schedule. The tasks of the template assigned negative numbers are scheduled for the corresponding dates before the "Day Zero" date in the schedule. For example, all tasks of the template assigned an offset day of −1 are scheduled for a date that is one day before the "Day Zero" date in the schedule, all tasks of the template assigned an offset day of −2 are scheduled for a date that is two days before the "Day Zero" date in the schedule, and so on. Likewise, the tasks of the template assigned positive numbers are scheduled for the corresponding dates after the "Day Zero" date in the schedule. For example, all tasks of the template assigned an offset day of 1 are scheduled for a date that is one day after the "Day Zero" date" in the schedule, all tasks of the template assigned an offset day of 2 are scheduled for a date that is two days after the "Day Zero" date in the schedule, and so on.

In an embodiment, when the schedule is created from the template, a rule can be enforced so that a task is not scheduled on a date that is a weekend day (i.e., Saturday or Sunday). In this embodiment, each task of the template is scheduled for the first available date based on the assigned offset day, and taking into account the rule that a task cannot be scheduled on a date that is a weekend day. For example, if a task of the template assigned an offset day of 0 is scheduled for a date that is a Friday in the schedule, then a task of the template assigned an offset date of 1 is scheduled for a date that is the following Monday in the schedule. Likewise, if a task of the template assigned an offset day of 0 is scheduled for a date that is a Monday in the schedule, then a task of the template assigned an offset date of −1 is scheduled for a date that is the previous Friday in the schedule.

According to an embodiment, a user can manually align an offset day for a task of the template to a calendar date for the corresponding task in the schedule. For example, if a template includes a task with an offset day of 0, and a task with an offset day of 1, a user can manually align the task with an offset day of 1, so that the task in the template with an offset day of 1 is scheduled in the schedule on a calendar date that is a number of days, for example three days, after the task in the template with an offset day of 0.

In accordance with the embodiment, if a task has predecessors in other templates, a user can review a list of predecessor tasks and manually adjust any predecessor task that requires assignment.

According to the embodiment, the creation of the schedule based on the template can further include setting attributes of the schedule. More specifically, attributes of the schedule can be set by the user. In an example embodiment, the attributes of the schedule can include a schedule name, a schedule description, a start date, an end date, a year, a period, and a schedule owner.

According to an embodiment of the invention, a user can create a schedule from a template by selecting a button displayed on a user interface of the financial close management screen which displays a "Manage Schedules" screen on the user interface. An example of a "Manage Schedules" screen displayed by the user interface is described in relation to FIG. 31 below.

Modifications to an existing schedule will now be described in more detail.

Modifications to an existing schedule can include adding a task to an existing schedule, modifying an existing task of an existing schedule, and deleting an existing task of an existing schedule. These modifications are described in relation to FIGS. 21-23.

Figure 21:
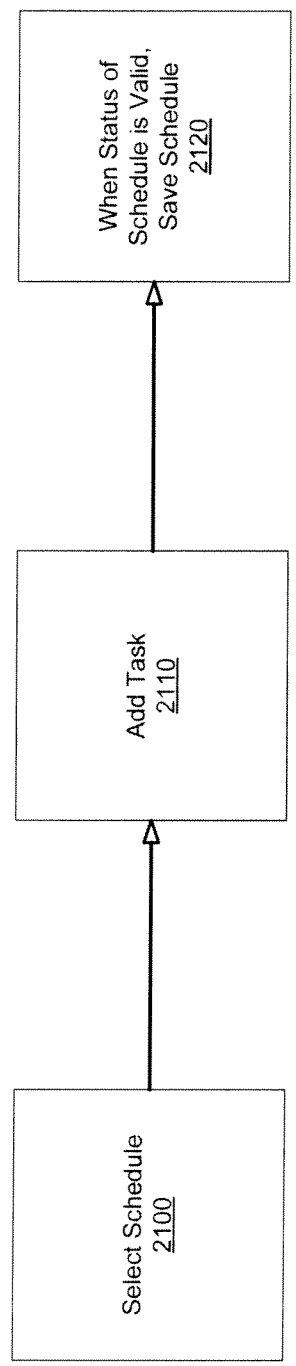
FIG. 21 illustrates a method of adding a task to a schedule according to an embodiment of the invention.

FIG. 21 illustrates a method of adding a task to a schedule according to an embodiment of the invention. At 2100, an existing schedule is selected in a financial close management system. At 2110, a task is added to the schedule. According to the embodiment, adding a task to the schedule can include manually creating a task or automatically creating a task based on a selected task type. In accordance with the embodiment, adding a task to the schedule can include assigning values for attributes of the task. Such attributes can include task name, task description, priority, start date, end date, duration, task owner, and task assignee. In addition, according to the embodiment, adding a task to the schedule can include assigning values for parameters of the task. Furthermore, in accordance with the embodiment, adding a task to the schedule can include specifying children tasks below the new task in a task hierarchy. Finally, in accordance with the embodiment, adding a task to the schedule can include setting one or more predecessors for the new task. According to the embodiment, a predecessor can be from another schedule. At 2120, when a status of the schedule is a valid status, the schedule (with the new task) is saved in the financial close management system. According to the embodiment, for the status of the schedule to be a valid status, the status of the schedule can be a status of Pending or Open. In contrast, if the status of the schedule is Closed or Locked, the financial close management system can display an error message in a user interface and refuse to allow the addition of a new task by failing to save the modified schedule in the financial close management system.

Figure 22:
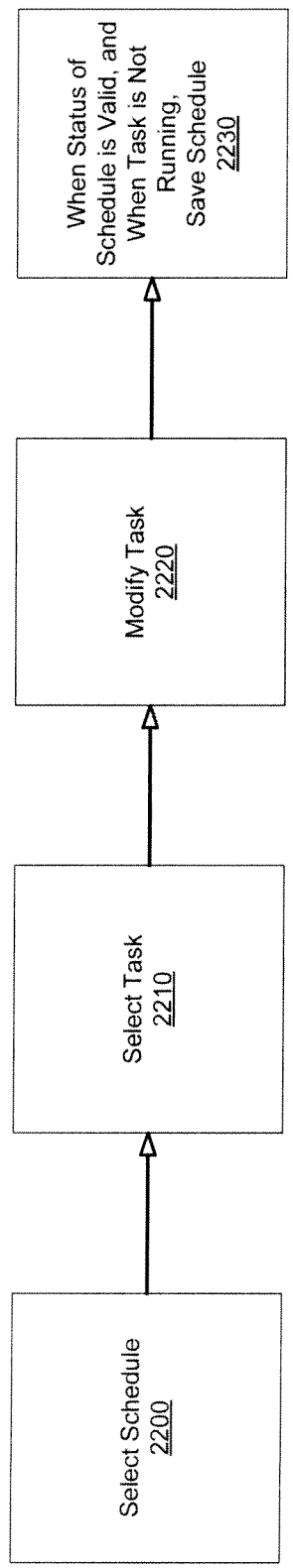
FIG. 22 illustrates a method of modifying a task of a schedule according to an embodiment of the invention.

FIG. 22 illustrates a method of modifying a task of a schedule according to an embodiment of the invention. At 2200, an existing schedule is selected in a financial close management system. At 2210, a task of the schedule is selected. At 2220, the task is modified. In accordance with the embodiment, modifying the task can include modifying values for attributes of the task. Such attributes can include task name, task description, priority, start date, end date, duration, task owner, and task assignee. In addition, according to the embodiment, modifying a task to the schedule can include modifying values for parameters of the task. In one specific embodiment, modifying values for parameters of the task can be restricted based on a status of the task. For example, a start date parameter can be restricted so that it cannot be changed once the task has a status of Open. As another example, a comment parameter can be restricted so that it cannot be edited once the task has a status of Closed. Furthermore, in accordance with the embodiment, modifying the task can include modifying children tasks below the new task in a task hierarchy. Finally, in accordance with the embodiment, modifying a task to the schedule can include modifying one or more predecessors for the new task. According to the embodiment, a predecessor can be from another schedule. At 2230, when a status of the schedule is a valid status and when the task is not currently running, the schedule (with the modified task) is saved in the financial close management system. According to the embodiment, for the status of the schedule to be a valid status, the status of the schedule can be a status of Pending or Open. In contrast, if the status of the schedule is Closed or Locked, the financial close management system can display an error message in a user interface and refuse to allow the modification of the task by failing to save the modified schedule in the financial close management system. Furthermore, according to the embodiment, the financial close management system can display an error message in a user interface and refuse to allow the modification of the task if the task is running at the time of the modification.

Figure 23:
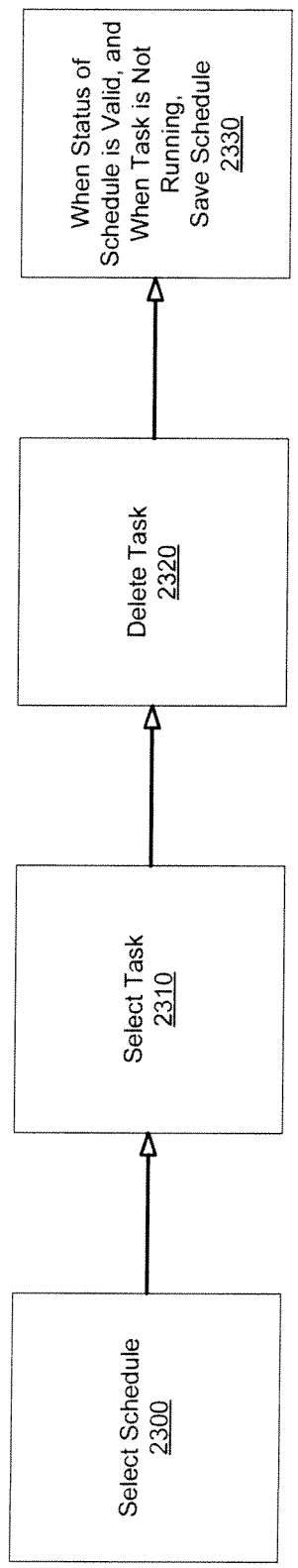
FIG. 23 illustrates a method of deleting a task of a schedule according to an embodiment of the invention.

FIG. 23 illustrates a method of deleting a task of a schedule according to an embodiment of the invention. At 2300, an existing schedule is selected in a financial close management system. At 2310, a task of the schedule is selected. At 2320, the task is deleted. At 2330, when a status of the schedule is a valid status and when the task is not currently running, the schedule (without the deleted task) is saved in the financial close management system. According to the embodiment, for the status of the schedule to be a valid status, the status of the schedule can be a status of Pending, or Open. In contrast, if the status of the schedule is Closed or Locked, the financial close management system can display an error message in a user interface and refuse to allow the deletion of the task by failing to save the modified schedule in the financial close management system. Furthermore, according to the embodiment, the financial close management system can display an error message in a user interface and refuse to allow the deletion of the task if the task is running at the time of the deletion.

Figure 24:
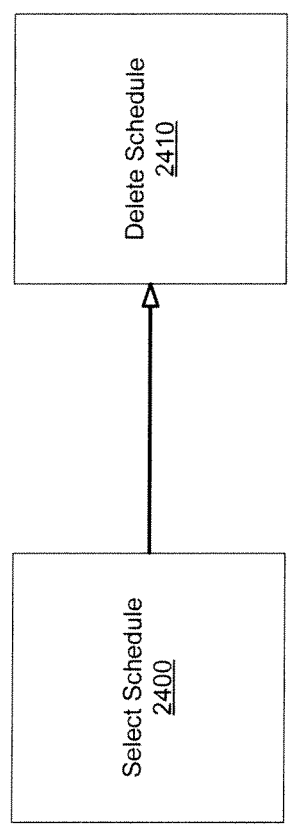
FIG. 24 illustrates a method of deleting a schedule according to an embodiment of the invention.

Modifications to an existing schedule can also include deleting an existing schedule. FIG. 24 illustrates a method of deleting a schedule according to an embodiment of the invention. At 2400, an existing schedule is selected in a financial close management system. At 2410, the schedule is deleted from the financial close management system. According to the embodiment of the invention, deleting a schedule removes the schedule and all references to it from the financial close management system.

Figure 25:
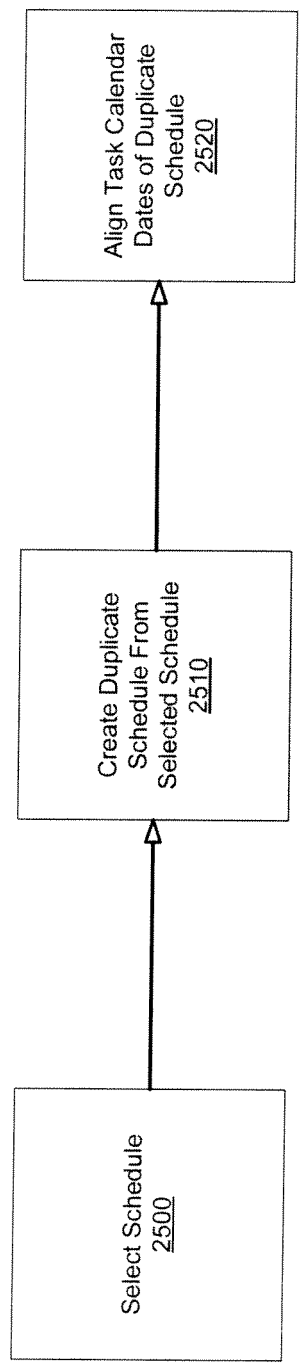
FIG. 25 illustrates a method of duplicating a schedule according to an embodiment of the invention.

Modifications to an existing schedule can also include duplicating an existing schedule. FIG. 25 illustrates a method of duplicating a schedule according to an embodiment of the invention. At 2500, an existing schedule is selected in a financial close management system. At 2510, a duplicate schedule is created from the selected schedule. According to an embodiment of the invention, the existing schedule is copied into a duplicate schedule, which is a separate object in the financial close management system. The copying of the existing schedule can include copying each task of the existing schedule. Optionally, the financial close management system can allow a user to modify attributes of the duplicate schedule. At 2520, the task calendar dates of the duplicate schedule are aligned. In accordance with the embodiment of the invention, the calendar dates of tasks of the duplicate schedule are set, where the calendar dates of the duplicate schedule are different from the calendar dates of the existing schedule.

Figure 26:
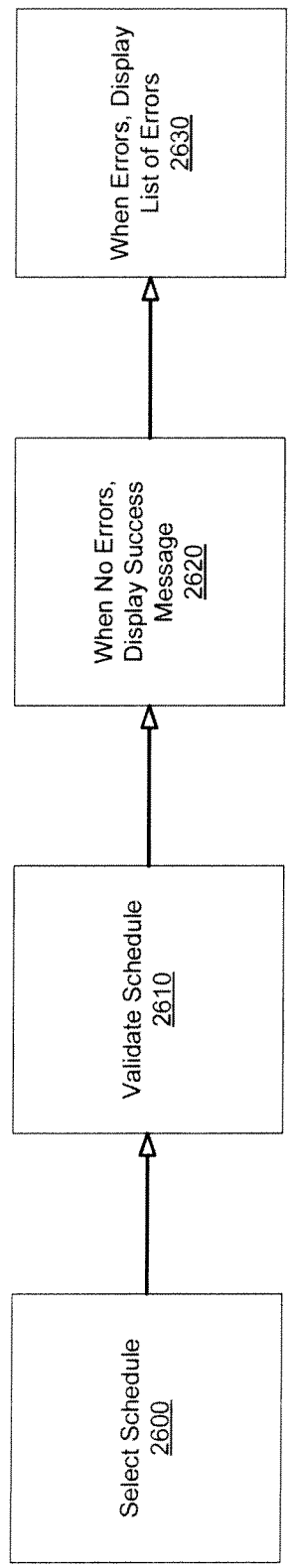
FIG. 26 illustrates a method of validating a schedule according to an embodiment of the invention.

Modifications to an existing schedule can also include validating a schedule. FIG. 26 illustrates a method of validating a schedule according to an embodiment of the invention. At 2600, a schedule is selected. At 2610, a schedule is validated. More specifically, according to the embodiment, the financial close management system determines that the schedule complies with a set of business rules defined within the financial close management system. At 2620, when the validation of the schedule does not result in any errors, the financial close management system displays a success message in a user interface. At 2630, when the validation of the schedule does result in errors, the financial close management system displays a list of errors in the user interface.

Figure 27:
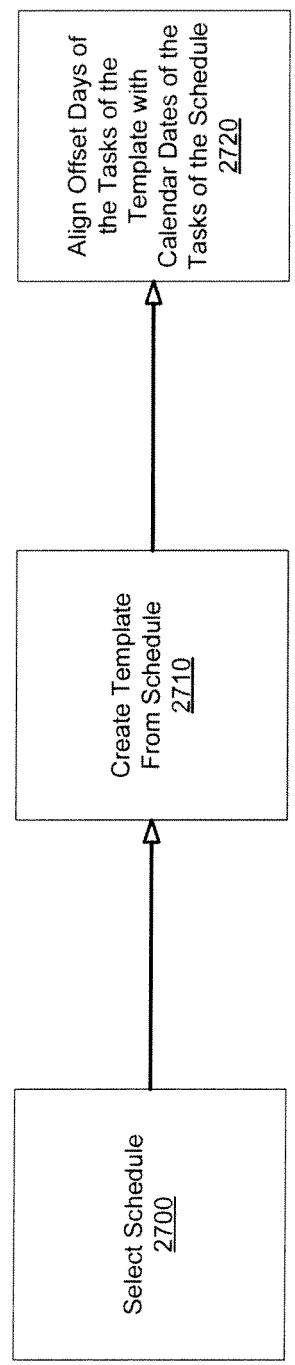
FIG. 27 illustrates a method of creating a template from a schedule according to an embodiment of the invention.

Modifications to an existing schedule can also include creating a template from a schedule. FIG. 27 illustrates a method of creating a template from a schedule according to an embodiment of the invention. At 2700, a schedule is selected. At 2710, a template is created from the schedule. According to the embodiment, creating a template from the schedule includes copying each task from the schedule into the template. At 2720, the offset days of the tasks of the template are aligned with the calendar dates of the tasks of the schedule. According to the embodiment, aligning the offset days of the tasks of the template with the calendar dates of the tasks of the schedule includes organizing the tasks of the schedule by offset days. According to the embodiment, one or more tasks of the schedule can be assigned an offset day of 0. Furthermore, all tasks of the schedule that precede the one or more tasks assigned an offset day of 0, can be assigned offset days that are negative numbers in the template, and all tasks of the schedule that succeed the one or more tasks assigned an offset day of 0 can be assigned offset days that are positive numbers in the template.

Figure 28:
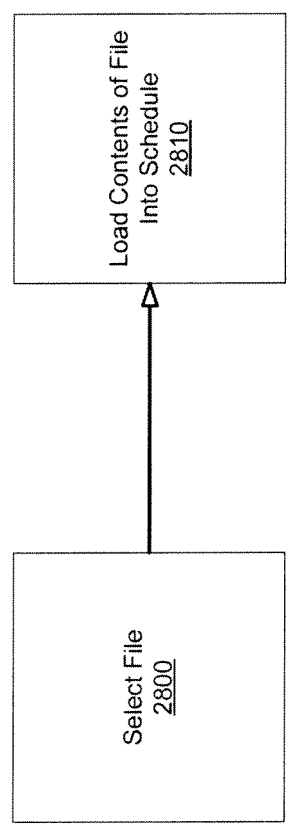
FIG. 28 illustrates a method of importing a schedule according to an embodiment of the invention.

Modifications to an existing schedule can also include importing a schedule. FIG. 28 illustrates a method of importing a schedule according to an embodiment of the invention. At 2800, a file is selected. According to the embodiment, a file can be a flat file, such as a common separated values (CSV) flat file. The CSV flat file can follow a tagged column format, where each row includes data associated with a task. Such data can include a task name, a task type, a task assignee, and a task approver. According to the embodiment, the file can be stored in the financial close management system. At 2810, the contents of the file are loaded into a schedule of the financial close management system. According to the embodiment, the financial close management system can create a new schedule, or select an existing schedule, convert each row of the CSV flat file into a task object within the financial close management system and insert the converted task into the schedule. As a result, a schedule is created which includes the tasks of the CSV flat file.

Figure 29:
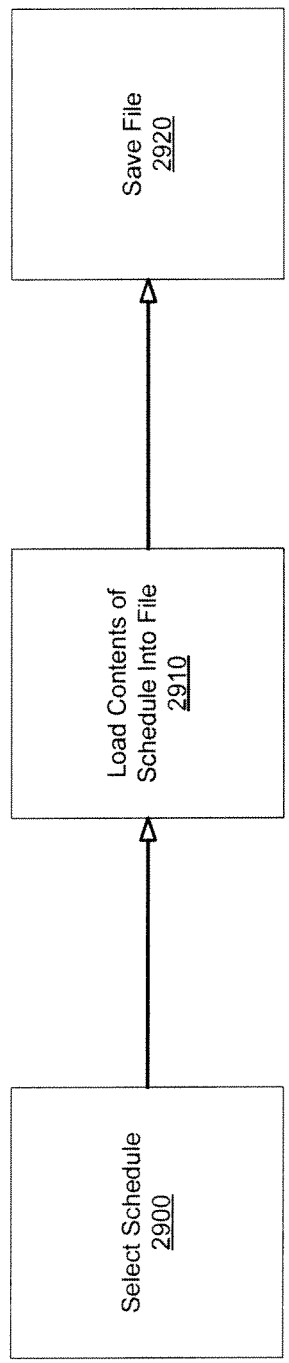
FIG. 29 illustrates a method of exporting a schedule according to an embodiment of the invention.

Modifications to an existing schedule can also include exporting a schedule. FIG. 29 illustrates a method of exporting a schedule according to an embodiment of the invention. At 2900, a schedule is selected. The schedule can be an existing schedule of the financial close management system. At 2910, the contents of the schedule are loaded into a file. According to the embodiment, the financial close management system can create a file within the system. The file can be a flat file, such as a CSV flat file. The CSV flat file can follow a tagged column format, where each row includes data associated with a task. Such data can include a task name, a task type, a task assignee, and a task approver. Subsequently, the financial close management system can select each task of the schedule and convert the task into a row for the flat file and load the row into the flat file. At 2920, the file is saved in the financial close management system.

According to an embodiment of the invention, a user can import or export an existing schedule by selecting a button displayed on a user interface of the financial close management screen which displays a "Manage Schedules" screen on the user interface. An example of a "Manage Schedules" screen displayed by the user interface is described in relation to FIG. 31 below.

Figure 30:
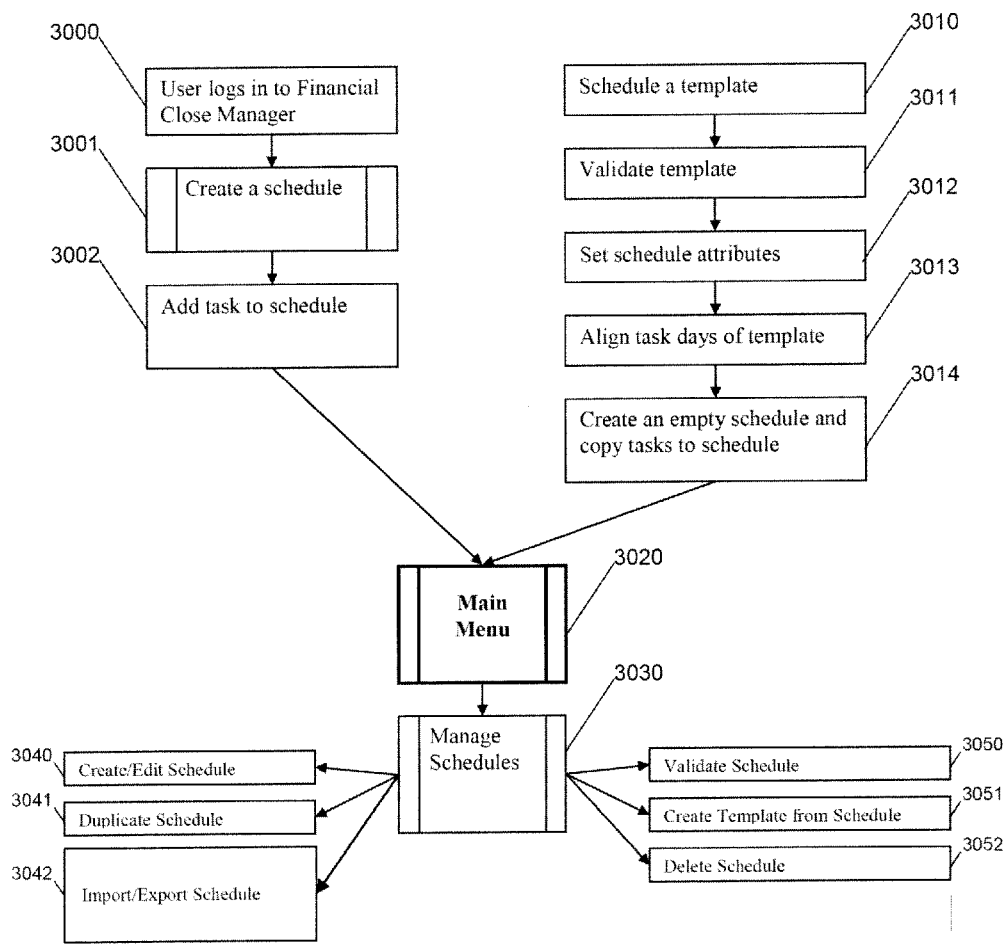
FIG. 30 illustrates a flow diagram for creating and managing schedules according to an embodiment of the invention.

FIG. 30 illustrates a flow diagram for creating and managing schedules according to an embodiment of the invention. More specifically, FIG. 30 illustrates two flows for creating a schedule. In the first flow, at 3000, a user logs in to a financial close management system. At 3001, a user manually creates a schedule in the financial close management system as previously described in relation to FIG. 19. Subsequently, at 3002, a user adds a task to the schedule. According to the embodiment, a user can repeat 3002 a number of times in order to add a number of tasks to the schedule.

In the second flow, at 3010, a user schedules an existing template within the financial close management system. At 3011, a user validates the template. At 3012, a user sets attributes of the schedule. At 3013, a user aligns task days of the template with calendar dates of the schedule. At 3014, a user creates an empty schedule with the financial close management system and copies the tasks of the template to the schedule. This flow describes the process of creating a schedule from a template, also described in relation to FIG. 20.

After either manually creating a schedule, or creating a schedule from a template, a user of the financial close management system can navigate to a main menu of a user interface, at 3020, and can further navigate to a "Manage Schedules" screen of the user interface, at 3330. An example of a "Manage Schedules" screen displayed by the user interface is described in relation to FIG. 31 below. According to the embodiment, from the "Manage Schedules" screen, the user can modify an existing schedule as previously described in relation to FIGS. 21-29. More specifically, at 3040, the user can create a new schedule or edit an existing schedule as previously described in relation to FIGS. 21-23. At 3041, the user can duplicate an existing schedule as previously described in relation to FIG. 25. At 3042, the user can import or export an existing schedule as described in relation to FIGS. 28-29. At 3050, the user can validate an existing schedule as described in relation to FIG. 26. At 3051, the user can create a template from a schedule as described in relation to FIG. 27. At 3052, the user can delete a schedule as described in relation to FIG. 24.

Figure 31:
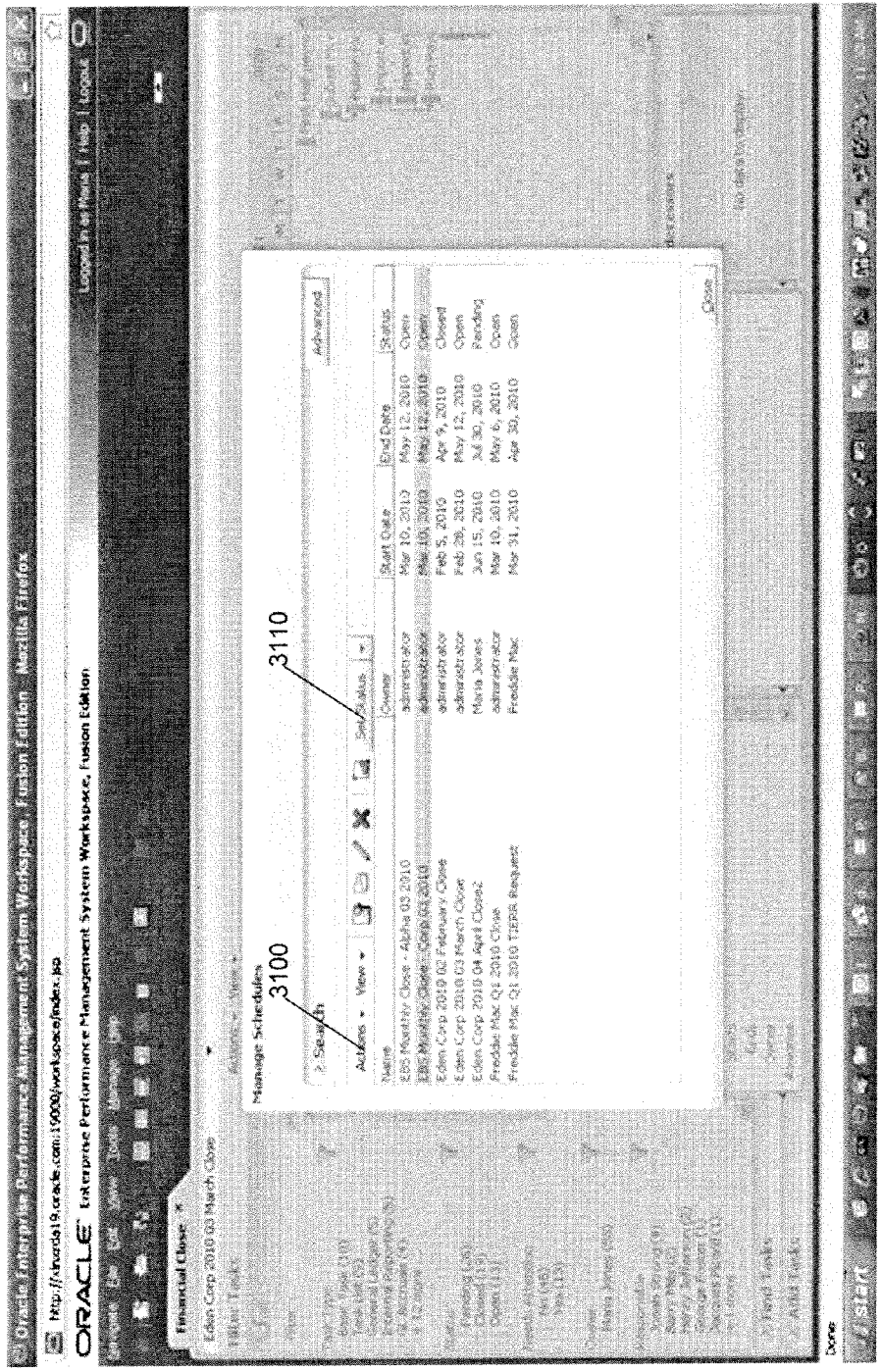
FIG. 31 illustrates an example of a user interface of a financial management system which displays a "Manage Schedules" screen according to an embodiment of the invention.

FIG. 31 illustrates a user interface of a financial close management system which displays a "Manage Schedules" screen according to an embodiment of the invention. The user interface illustrated in FIG. 31 displays a list of the existing schedules of the financial close management system. The user interface includes actions button 3100 which allows a user to modify an existing schedule as previously described in relation to FIGS. 21-29. The user interface also includes a set status button 3110 which allows a user to change the status of an existing schedule as previously described in relation to FIG. 18.

When modifying a schedule, some tasks have parameters that need to be changed every time they are put into a schedule. For example, a task with a date driven parameter can require a different date each time the task is added to a schedule. According to an embodiment of the invention, a task type, which is later inherited by a task, can be defined to include one or more parameters that can be set at a schedule, rather than a task. Subsequently, according to the embodiment, when adding a task which inherits from the task type, to a schedule, a value for the parameter can be set at the schedule rather than the task. According to an embodiment, if a system has multiple tasks with a same parameter, by setting a value for the parameter at the schedule, a value can be set for the parameter of each task of the schedule.

Figure 32:
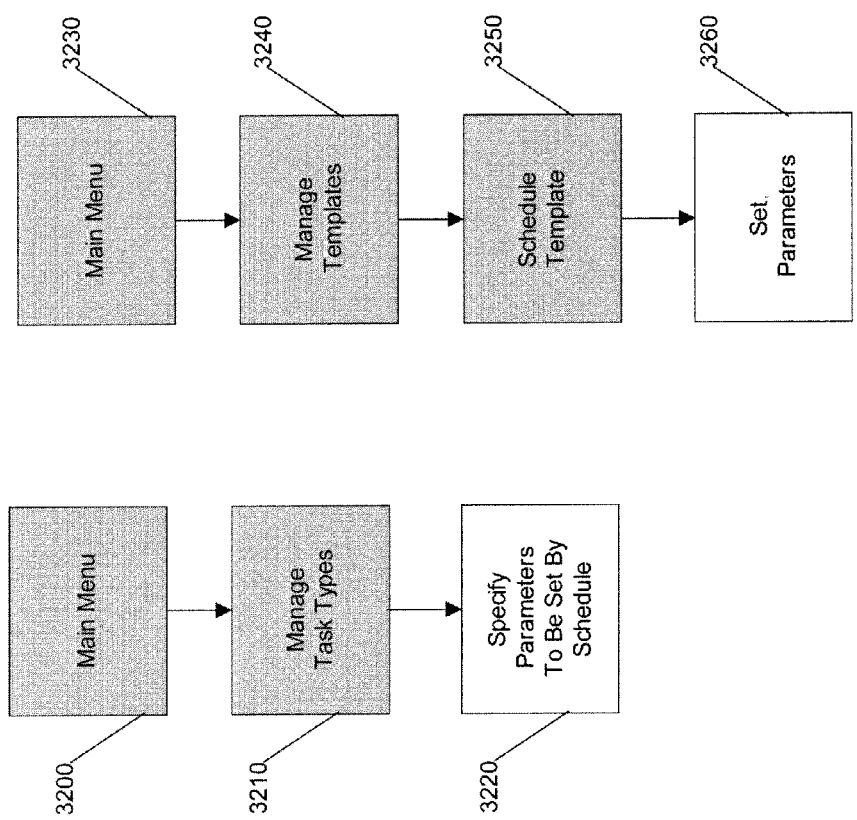
FIG. 32 illustrates a flow diagram for setting task parameters at a schedule according to an embodiment of the invention.

FIG. 32 illustrates a flow diagram for setting task parameters at a schedule according to an embodiment of the invention. FIG. 32 illustrates an administrative flow (the leftmost flow of FIG. 32), and a template scheduling flow (the rightmost flow of FIG. 32). In the administrative flow, at 3200, a user enters a main menu of a financial close management system. At 3210, the user navigates to a screen of the financial close management system configured to manage task types. At 3220, the user creates a new task type, or selects an existing task type, with one or more parameters and specifies which parameters are to be set by a schedule. In the template scheduling flow, at 3230, a user enters a main menu of the financial close management system. At 3240, the user navigates to a screen of the financial close management system configured to manage templates. At 3250, a user creates a new template, or selects an existing template, where the template includes at least one task that inherits from the task type which includes parameters that were previously specified to be set by a schedule, and schedules the template. Scheduling the template includes creating a schedule from the template. At 3260, the user selects a value to be assigned to the parameter, and the schedule assigns the value to the parameter of the at least one task.

Figure 33:
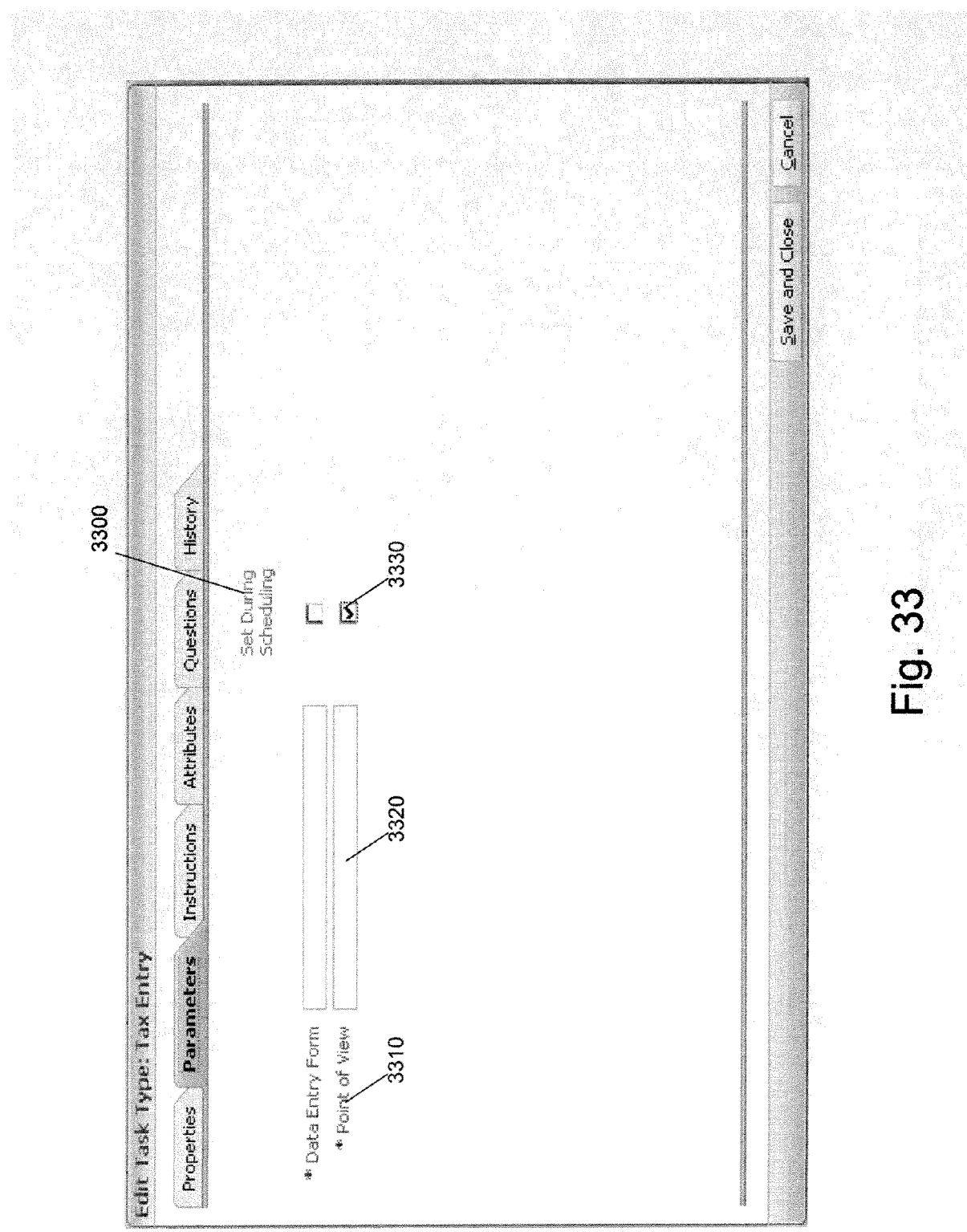
FIG. 33 illustrates an example of a user interface of a financial close management system configured to define task type parameters whose values can be set at a schedule according to an embodiment of the invention.

FIG. 33 illustrates an example of a user interface of a financial close management system configured to define task type parameters whose values can be set at a schedule according to an embodiment of the invention. The user interface illustrated in FIG. 33 displays Set During Scheduling 3300, for a selected task type, that includes a field for each parameter that allows a user to configure whether a value for the parameter can be set in a schedule that includes a task that inherits from the selected task type. According to the embodiment, if a field in Set During Scheduling 3300 is enabled by the user, then a value for the parameter is capable of being set at a schedule which includes a task that inherits from the selected task type, in addition to being capable of being set at the task or at the task type. In contrast, if a field in Set During Scheduling column 3300 is not enabled by the user, then a value for the parameter can only be set at a task that inherits from the selected task type, or at the selected task type. As an example, the user interface illustrated in FIG. 33 displays a parameter name field 3310, a parameter value field 3320 that allows a user to set a value for the parameter identified by parameter name field 3310, and a checkbox field 3330 that allows a user to configure whether a value for the parameter can be set in a schedule. In the illustrated embodiment, parameter value field 3320 is left blank, and checkbox field 3330 has been enabled. This allows a user to set a value for the parameter identified by parameter name field 3310 at a schedule that includes a task that inherits from the selected task type.

FIG. 34 illustrates an example of a user interface of a financial close management system configured to set values of task parameters of a schedule according to an embodiment of the invention. According to the embodiment, the user interface illustrated in FIG. 34 is a user interface that is displayed when creating a schedule where one or more tasks of the schedule includes parameters that have been defined to allow their values to be set at a schedule. In accordance with the embodiment, the user interface displays task type 3400, parameter 3410, current value 3420 and new value 3430. Task type 3400 displays a task type that a parameter belongs to, for each parameter that has been defined to allow their values to be set at a schedule. Parameter 3410 displays a name of each parameter that has been defined to allow their values to be set at a schedule. Current value 3420 displays a current value for each parameter that has been defined to allow their values to be set at a schedule, if there is a current value for the parameter. New value 3430 displays a field which allows a user to enter a new value for each parameter that has been defined to allow their values to be set at a schedule. Thus, by entering a value for each parameter displayed at the user interface of FIG. 34, a user can set the value of each parameter at the schedule, even if a previously value for the parameter was set either at the task or the task type that the task inherits from.

FIG. 35 illustrates a flow diagram of the functionality of a financial close management module according to another embodiment of the invention. At 3510, a schedule is created in a financial close management system. The schedule includes an ordered set of tasks and a status, where each task of the schedule is assigned a calendar date. At 3520, the schedule is modified in the financial close management system, while the schedule is active. According to the embodiment, the status of the schedule determines, in part, what type of modifications can be made to the schedule.

Thus, according to an embodiment of the invention, attributes of a schedule can be managed, thus adding significant flexibility to the schedule. In accordance with the embodiment, a schedule can be created manually or from a template. In addition, a schedule can be modified to increase the efficiency of a schedule according to the embodiment. Finally, task parameter values can be set at a schedule, rather than at each individual task, which increases the speed and efficiency of the scheduling process.

Filtering of Custom Attributes

One embodiment of the invention is directed towards filtering of custom attributes. According to the embodiment, a custom attribute is an attribute of an object defined by a user. Once a user has defined one or more custom attributes, the user can filter a set of objects based on a filtering criteria that includes one or more custom attributes to produce a subset of objects. The filtering can be dynamic so that when the set of objects is modified (such as creating a new object, deleting an existing object, or modifying an existing object), the filter is automatically updated. In an embodiment, a filtering criteria can be based on the set of objects present in the system, so that any filter that is defined returns at least one object. Furthermore, in an embodiment, once a filter is applied, any additional filter applied to the original filter can have a filtering criteria based on the subset of objects returned by the original filter.

In one embodiment of the invention, a user can filter on one or more custom attributes in a financial close management system. However, in other embodiments, a user can filter on one or more custom attributes in any type of computer system where a user can define one or more custom attributes for an object of the computer system.

An alternate embodiment of the invention is directed toward filtering of attributes. In contrast to custom attributes, an attribute is a system-defined attribute that can be associated with an object.

Figure 36:
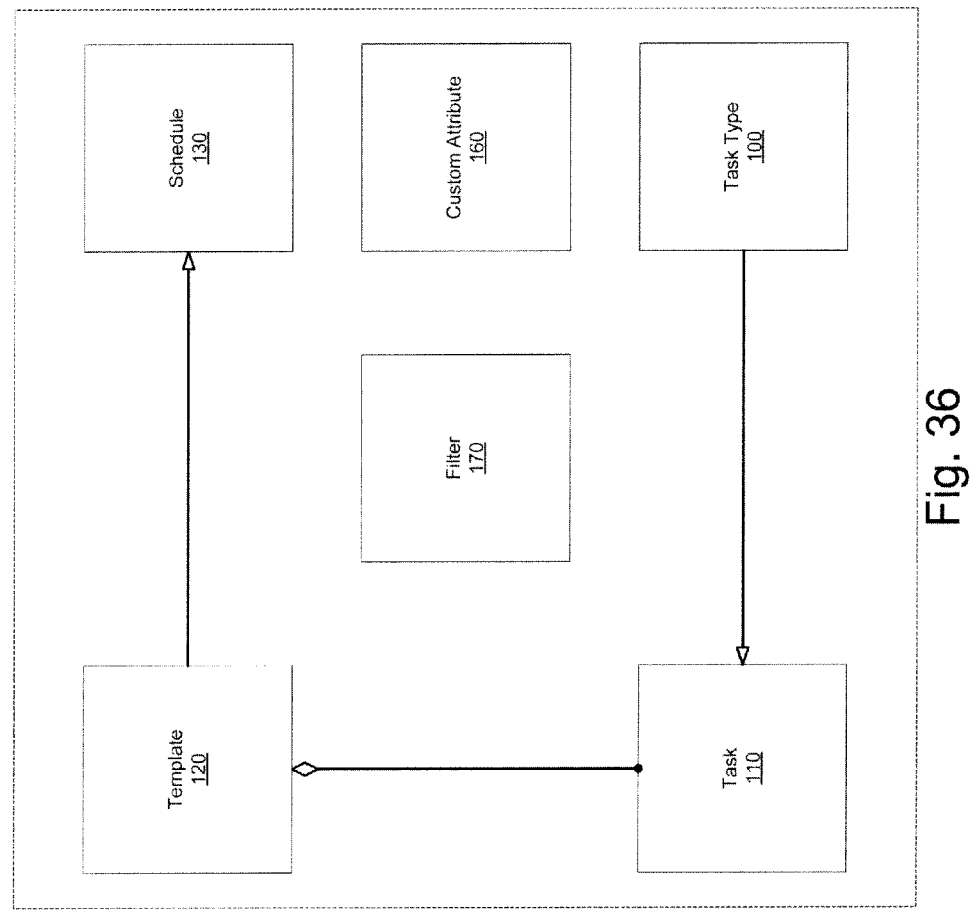
FIG. 36 illustrates a framework for filtering on custom attributes according to an embodiment of the invention.

FIG. 36 illustrates a framework for filtering on custom attributes according to an embodiment of the invention. According to the embodiment, FIG. 36 illustrates a framework that is a component of a financial close management framework. However, one of ordinary skill in the art would appreciate that this is merely an example implementation of the framework, and that the framework can be part of any computer system framework, and still be within the scope of the invention.

FIG. 36 illustrates task type 100, task 110, template 120, and schedule 130, which is discussed in relation to FIG. 1. FIG. 36 also illustrates two additional core objects according to an embodiment of the invention, custom attribute 160, and filter 170. A custom attribute is a user-defined attribute that can be associated with an object, such as task type 100, task 110, template 120, and schedule 130. According to an embodiment of the invention, a custom attribute includes a name, a value, and a value type. The name is the name of the custom attribute. The value is the value of the custom attribute. The value type defines what type the value of the custom attribute is. According to the embodiment, possible value types include Date, List, Number, Text, and True/False. If the value type is List, a user can define a list of possible values that can be selected as the value of the custom attribute. Furthermore, in accordance with an embodiment, once a custom attribute is defined, it can be associated with any object by any user.

A filter defines a subset of objects, such as task type 100, task 110, template 120, and schedule 130, based on a filtering criteria when applied to a set of objects in a system and displays the subset of objects to a user using a user interface. A filter can use any attribute associated with an object as its filtering criteria. As will be discussed in more detail, a filter can also use a custom attribute associated with the object as its filtering criteria.

Figure 37:
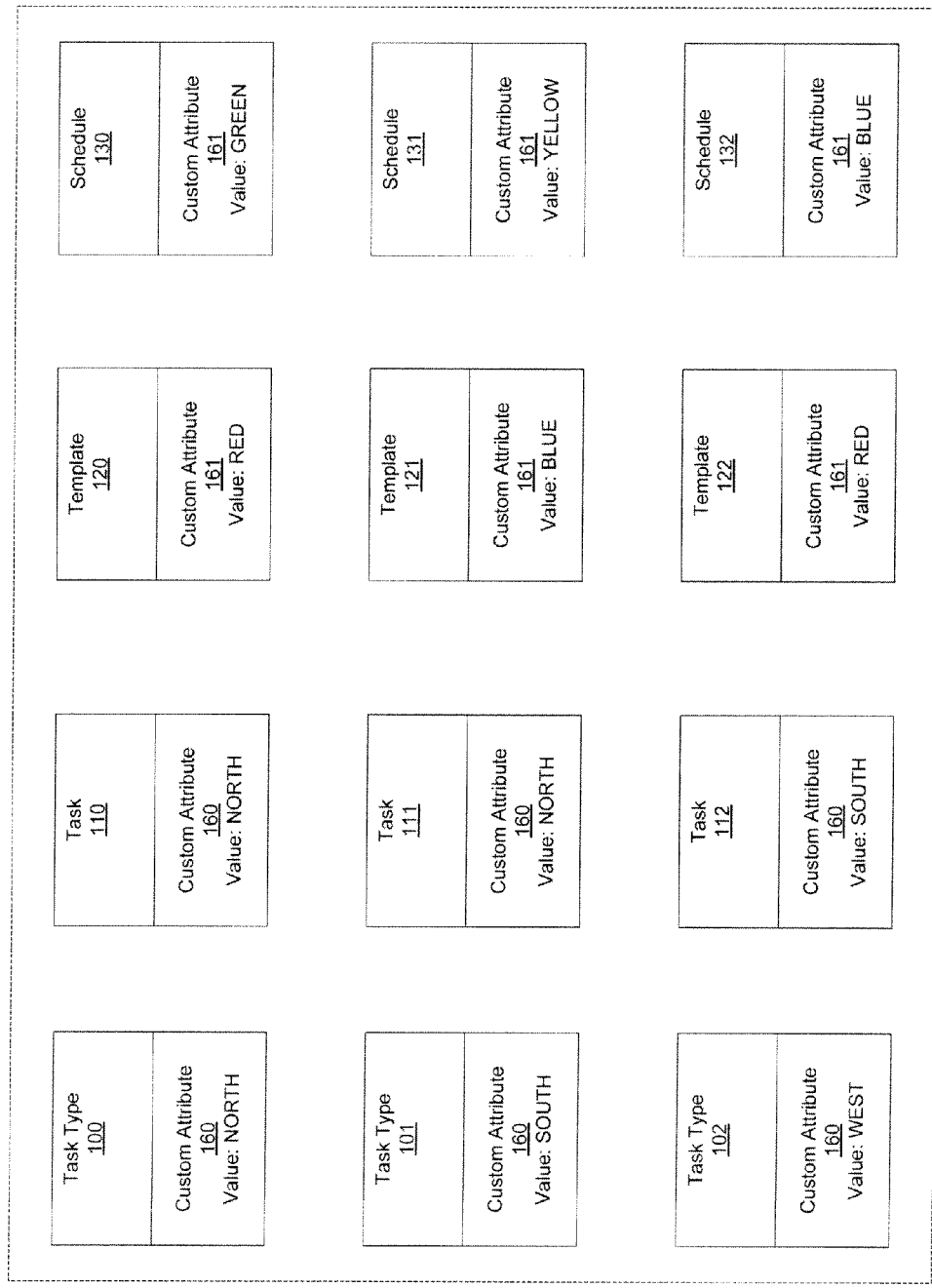
FIG. 37 illustrates an implementation of custom attributes according to an embodiment of the invention.

FIG. 37 illustrates an implementation of custom attributes according to an embodiment of the invention. According to the embodiment, a user can define a custom attribute and associate it with an object (such as task type, task, template, and schedule). FIG. 37 illustrates twelve objects (task types 100, 101, and 102, tasks 110, 111, and 112, templates 120, 121, and 122, and schedules 130, 131, and 132), where each object has a custom attribute associated with it. According to the embodiment, FIG. 37 illustrates two types of custom attributes, custom attribute 160, and custom attribute 161. According to the embodiment, task types 100, 101, and 102, and types 110, 111, and 112 are each associated with custom attribute 160, and templates 120, 121, and 122, and schedules 130, 131, and 132 are each associated with custom attribute 161. Each instance of custom attribute 160 and 161 can have a unique value, but as illustrated in FIG. 37, some custom attributes can have identical values. As one of ordinary skill in the art would appreciate, FIG. 37 illustrates an example configuration of custom attributes, and other configurations of custom attributes are within the scope of the invention. For example, each object can have its own custom attribute, or each object can have the same custom attribute but with a unique value associated with the custom attribute for each object. Furthermore, an object can have any number of custom attributes associated with it. Once at least one object is associated with a custom attribute, the one or more objects can be filtered using the custom attribute as filtering criteria, as will be described below in more detail.

Figure 38:
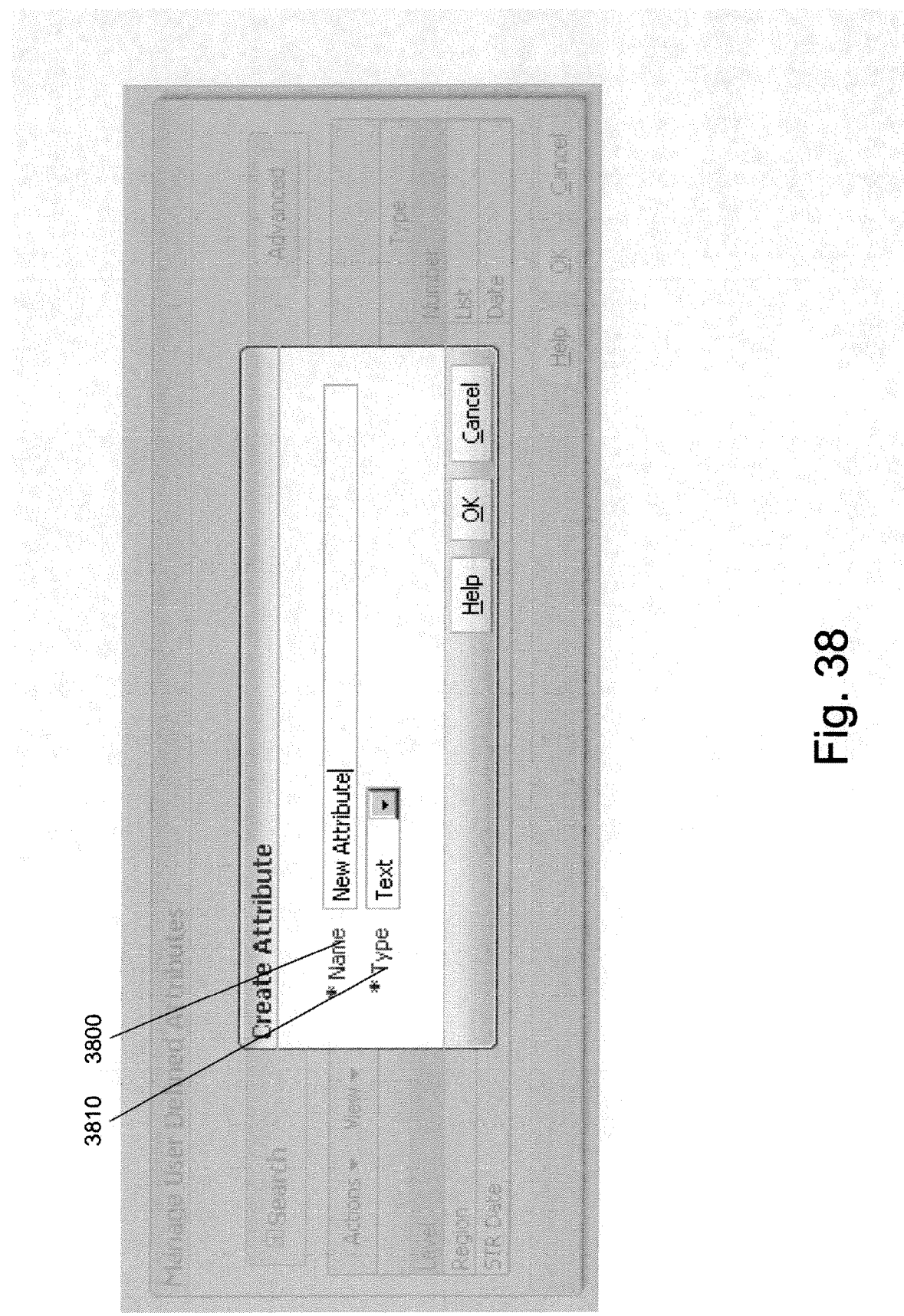
FIG. 38 illustrates an example of a user interface configured to create a custom attribute according to an embodiment of the invention.

FIG. 38 illustrates an example of a user interface configured to create a custom attribute according to an embodiment of the invention. According to the embodiment, the user interface displays name 3800 and type 3810. A user can enter a value for name 3800, which is the custom attribute name. A user can also select a type from type 3810, which is the custom attribute type. As is illustrated in the following figure, FIG. 39, if a user selects the type List, a user can enter one or more values associated with the list.

Figure 39:
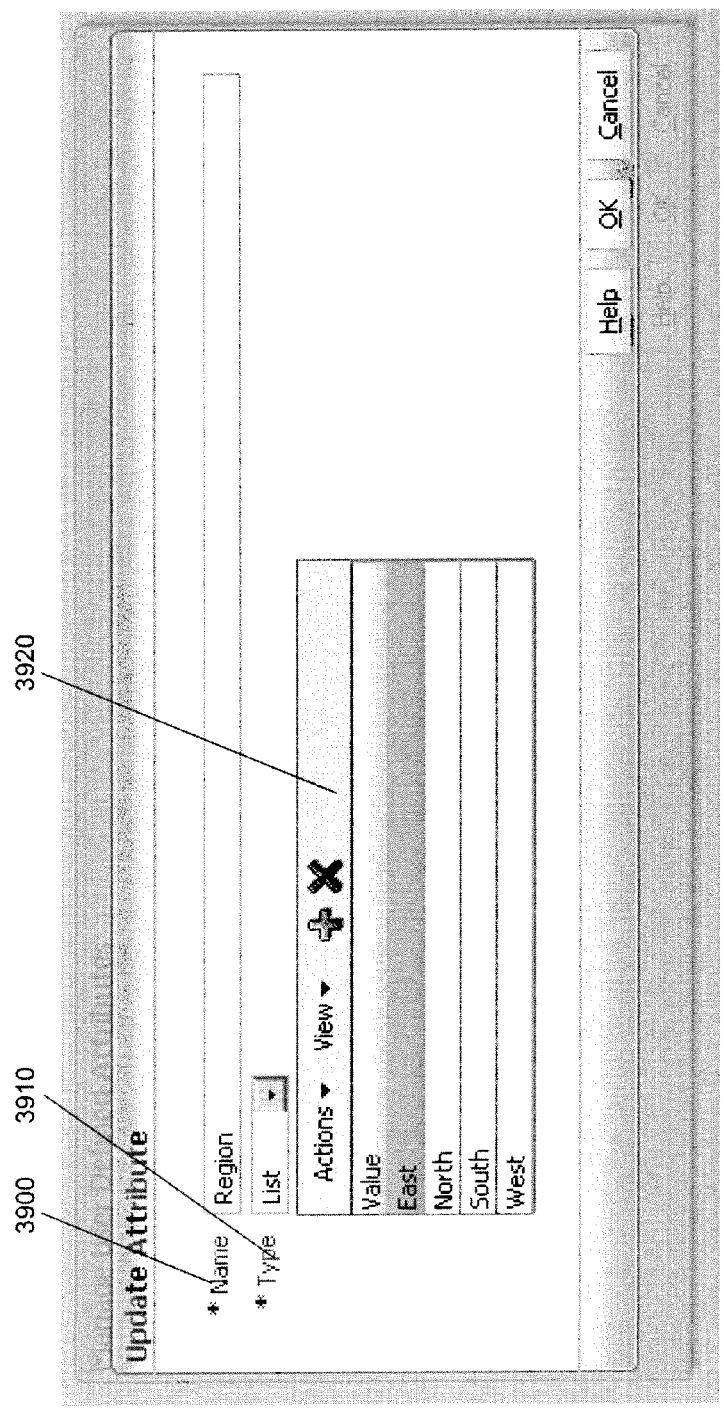
FIG. 39 illustrates an example of a user interface configured to update a custom attribute according to an embodiment of the invention.

FIG. 39 illustrates an example of a user interface configured to update a custom attribute according to an embodiment of the invention. According to the embodiment, similar to the embodiment illustrated in FIG. 38, the user interface displays name 3900 and type 3910. Similar to the embodiment illustrated in FIG. 38, a user can modify the custom attribute name displayed at name 3900, and can modify the custom attribute type displayed at type 3910. In the illustrated embodiment, the custom attribute type is List, so the user interface also displays values 3920, which are the values associated with the list. According to the embodiment, the user can add new values to the list, or delete existing values from the list. Thus, in accordance with the embodiment, and the embodiment illustrated in FIG. 38, a user can define a library of custom attributes.

Figure 40:
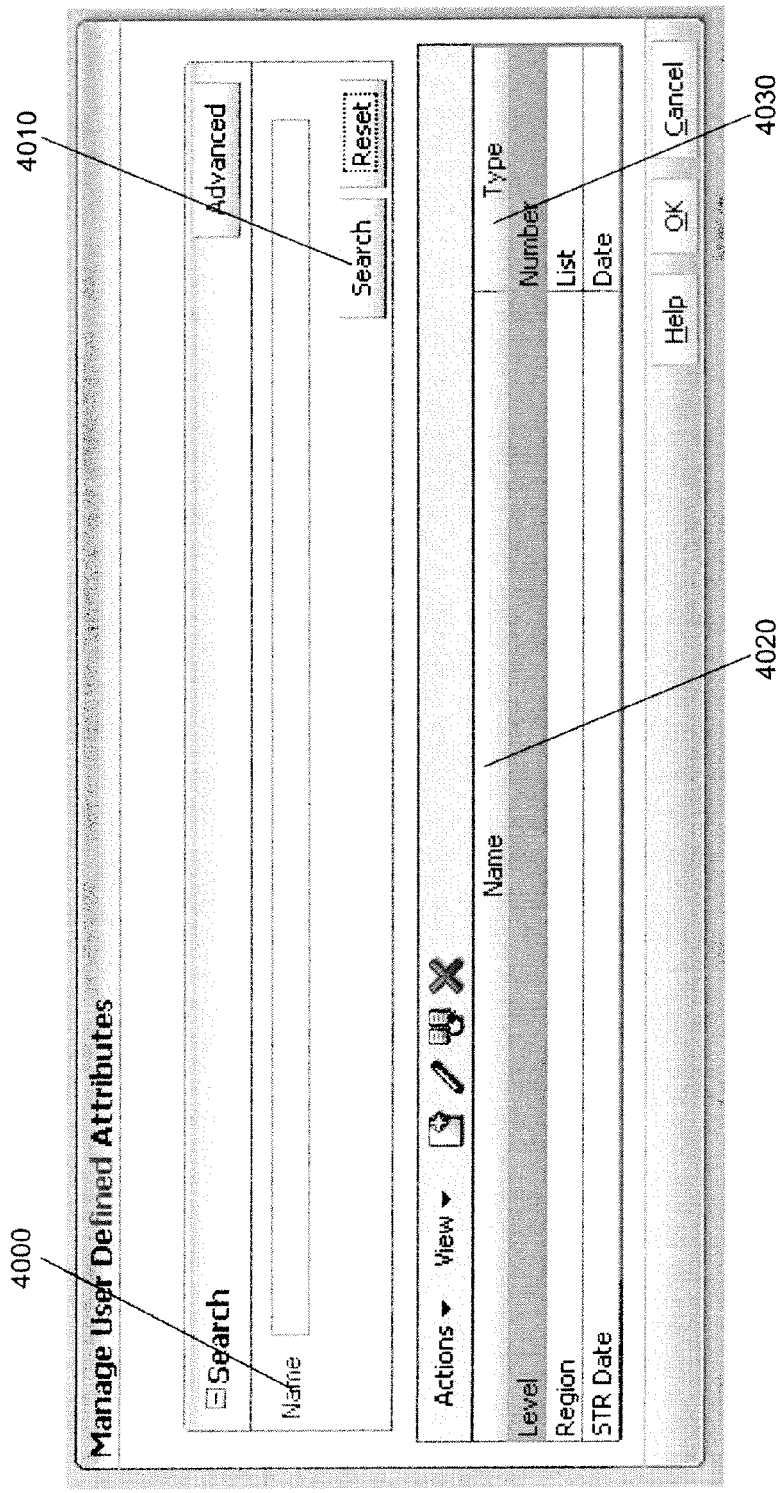
FIG. 40 illustrates an example of a user interface configured to manage custom attributes according to an embodiment of the invention.

FIG. 40 illustrates an example of a user interface configured to manage custom attributes according to an embodiment of the invention. According to the embodiment, the user interface displays name 4000 which allows a user to enter text. The user interface also displays search button 4010. When a user selects search button 4010, the user interface will query the system and return all custom attributes that include the same name as the text entered in name 4000. The user interface will display the name of each custom attribute at name 4020, and the type of each custom attribute at 4030.

Figure 41:
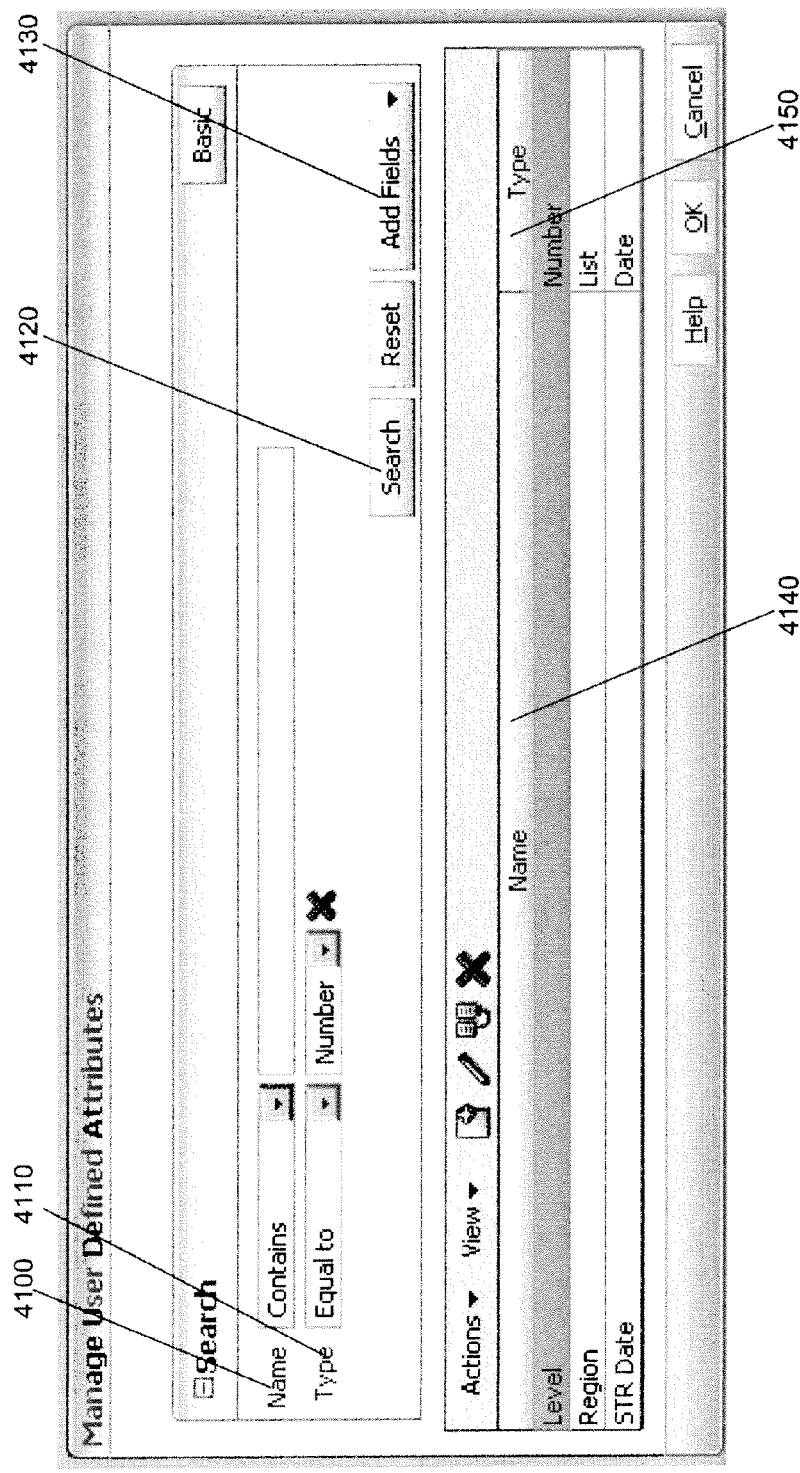
FIG. 41 illustrates another example of a user interface configured to manage custom attributes according to an embodiment of the invention.

FIG. 41 illustrates another example of a user interface configured to manage custom attributes according to an embodiment of the invention. According to the embodiment, the user interface displays name 4100 which allows a user to enter text. In contrast to the embodiment illustrated in FIG. 40, in the embodiment illustrated in FIG. 41, the user interface also displays a modifier (in this case, Contains), which allows the user interface to query the system using the modifier. For example, in the illustrated embodiment, when a user enters text, the user interface can query on all custom attributes that contain the text, rather than all custom attributes with names that match the text. The user interface also displays type 4110 which allows a user to enter a value (or select a value), and allow the user interface to query the system by type as well as by name. In the embodiment illustrated in FIG. 41, the user interface also displays a modifier (in this case, Equal to), and a type value (in this case, Number) which allows the user interface to query the system using the modifier. For example, in the illustrated embodiment, the user interface can query on all custom attributes that have a type equal to Number. When a user selects search button 4120, the user interface will query the system and return all custom attributes that include the same name as the text entered in name 4100 and the same type as the value selected or entered in type 4110. A user can select add fields button 4130 to add more query fields to the user interface. The user interface will display the name of each custom attribute at name 4140, and the type of each custom attribute at 4150.

Figure 42:
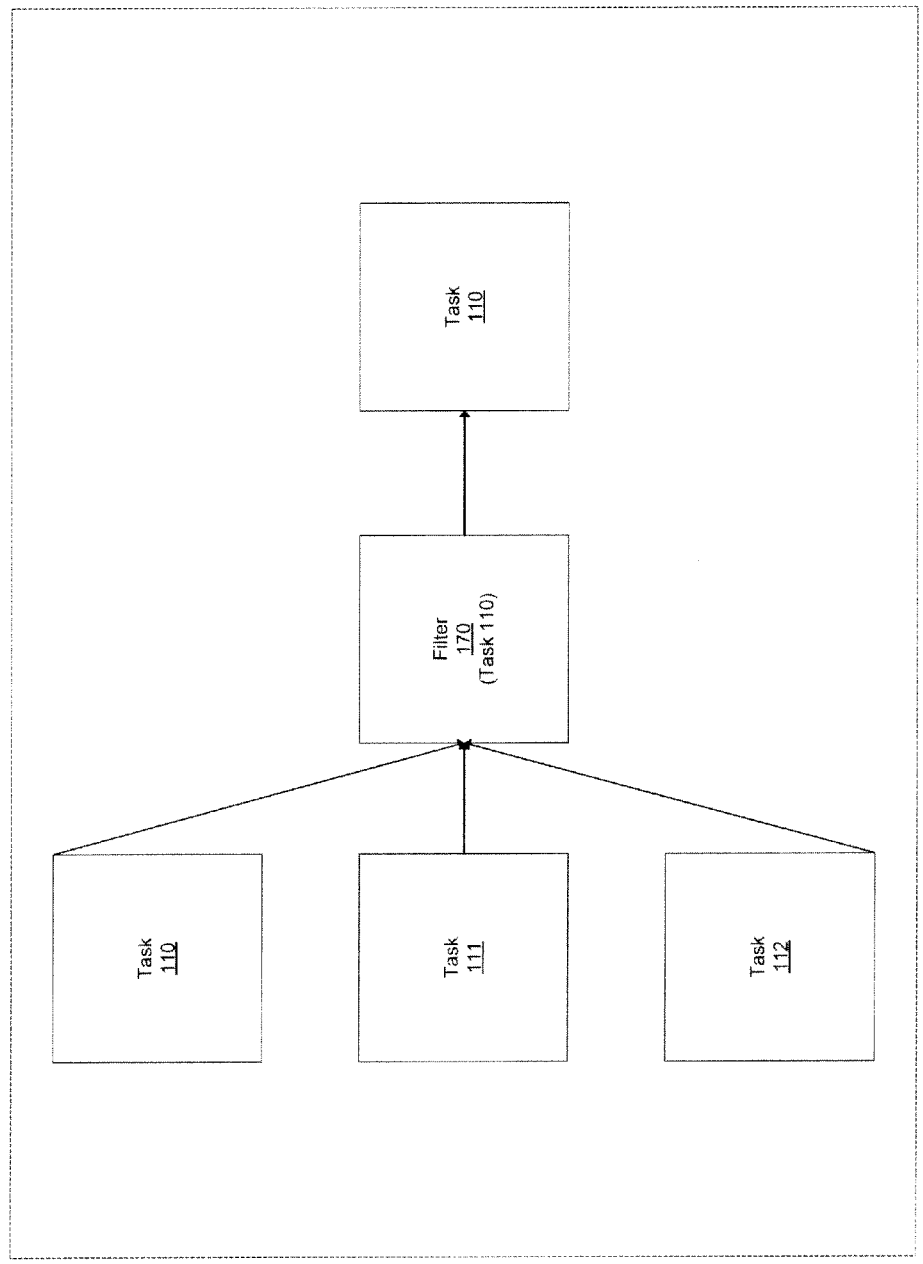
FIG. 42 illustrates an implementation of a filter according to an embodiment of the invention.

FIG. 42 illustrates an implementation of a filter according to an embodiment of the invention. As previously described, a filter defines a subset of objects, based on a filtering criteria when applied to a set of objects in a system and displays the subset of objects to a user using a user interface. FIG. 42 illustrates a set of three objects (task 110, task 111, and task 112) and a filter 170. The filtering criteria of filter 170 is defined so that filter 170 will only display a subset of one object (task 110). Thus, when filter 170 is applied to the set of three objects (task 110, task 111, and task 112), filter 170 only displays the subset of one object (task 110), as illustrated in FIG. 42.

According to an embodiment of the invention, a filter can use any attribute of an object as its filtering criteria. Also according to the embodiment, the filter can be a dynamic filter and can automatically update its subset of objects based on changes to the set of objects (such as new objects, deleted objects, or modifications to existing objects). Furthermore, according to an embodiment, a filter can be applied to another filter, so that multiple filters can filter a set of objects to a subset of objects. In an embodiment utilizing multiple filters, the filters can be applied and removed in any order. For example, a user can apply a first filter, a second filter, and a third filter, where the three filters filter a set of objects to a subset of objects. More specifically, the first filter filters a set of objects to a subset of objects, the second filter filters the subset of objects into a second subset of objects, and the third filter filters the second subset of objects into a third subset of objects. Subsequently, a user can remove a second filter, and the set of objects can be re-filtered based on only the first filter and the third filter. In the re-filtering, the first filter filters the set of objects to a subset of objects, and the third filter filters the subset of objects into a second subset of objects.

Also, according to an embodiment, a system can determine the attributes associated with a set of objects present in a system, and base a filtering criteria of a filter on attributes that are associated with at least one object, so that the filter will always return at least one object. More specifically, the filtering criteria of the filter can be defined to only include values of attributes that are associated with at least one object from the set of objects. For example, if a set of objects includes a first task with an attribute A with a value of "A1", and a second task with the attribute A with a value of "A2," then the filtering criteria of the filter can be defined to only include one of, or both, the values "A1" and "A2" of attribute A. Thus, according to the embodiment, a filter that is defined will return at least one task (either the first task, the second task, or both tasks).

According to another embodiment, once a filter is applied, a filtering criteria for an additional filter applied to the original filter can be based on the subset of objects returned by the original filter. More specifically, the filtering criteria for the additional filter can be defined to only include values of attributes that are associated with at least one object from the subset of objects returned by the original filter. As an example, a set of objects includes three tasks: a first task, a second task, and a third task. The first task can include two attributes: attribute A with a value of "A1," and attribute B with a value of "B1." The second task can also include two attributes: attribute A with a value of "A1," and attribute B with a value of "B2." The third task can include three attributes: attribute A with a value of "A2," attribute B with a value of "B3," and attribute C with a value of "C1." Initially, a filter can be defined, where the filter defines a subset of objects using a filtering criteria. For example, a filter can be defined that defines a subset of objects that includes the first task and a second task. In the embodiment, a second filter can be defined, where the second filter defines a second subset of objects using a second filtering criteria, where the second filtering criteria be defined to only include values of attributes that are associated with at least one object from the subset of objects. According to the example, the second filtering criteria can be defined to include one of, or both, the values "B1" and "B2" of attribute B. In this example, the second filtering criteria does not include any values for attribute C, because attribute C is not associated with any object in the subset of objects (i.e., the first task and the second task).

Figure 43:
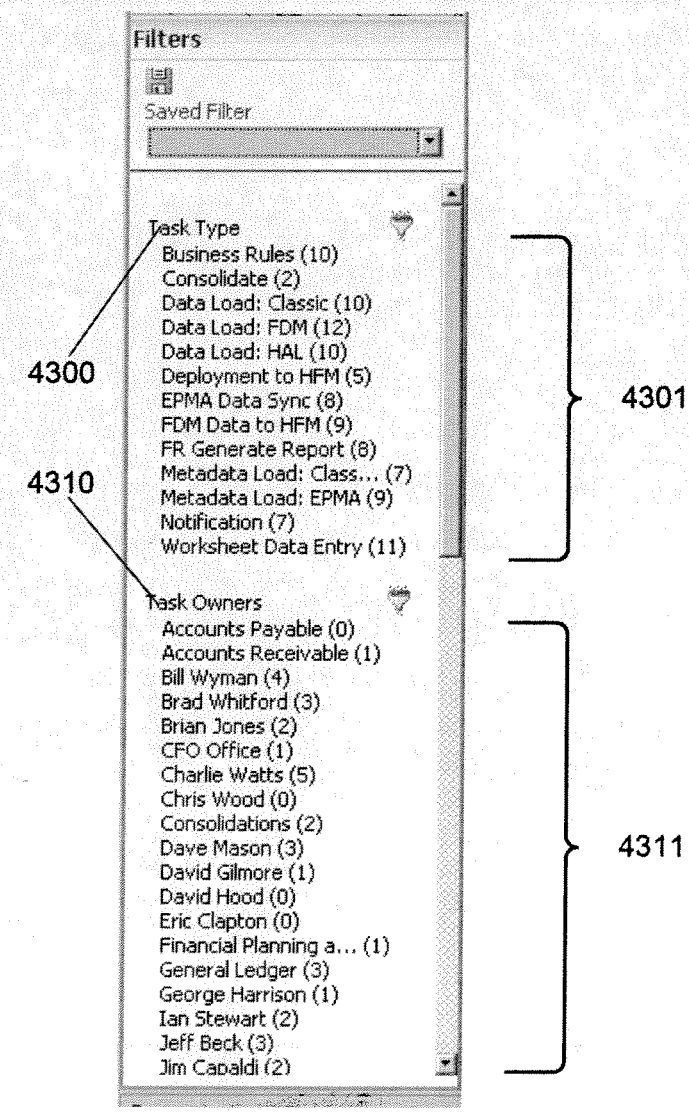
FIG. 43 illustrates an example of a user interface configured to display a filter panel according to an embodiment of the invention.

FIG. 43 illustrates an example of a user interface configured to display a filter panel according to an embodiment of the invention. According to an embodiment of the invention, the filter panel displays a list of saved filters. In the illustrated embodiment, the filter panel displays each object attribute being filtered, and below each object attribute, the filter panel displays a list of filters that are based on the object attribute. In the illustrated embodiment of FIG. 43, filter panel displays task type 4300 and, below task type 4300, the filter panel displays list 4301. List 4301 includes a list of filters, where each filter uses a different task type value as filtering criteria. Likewise, filter panel also displays task owners 4310 and, below task owners 4310, the filter panel displays list 4311. List 4311 includes a list of filters, where each filter uses a different task owner value as filtering criteria. Each filter displays the number of tasks returned by the filter to the right of the filter. When a user selects a filter, the filter displays the tasks returned by the filter in an adjoining screen of the user interface. An example of this display will now be described in relation to FIG. 44.

Figure 44:
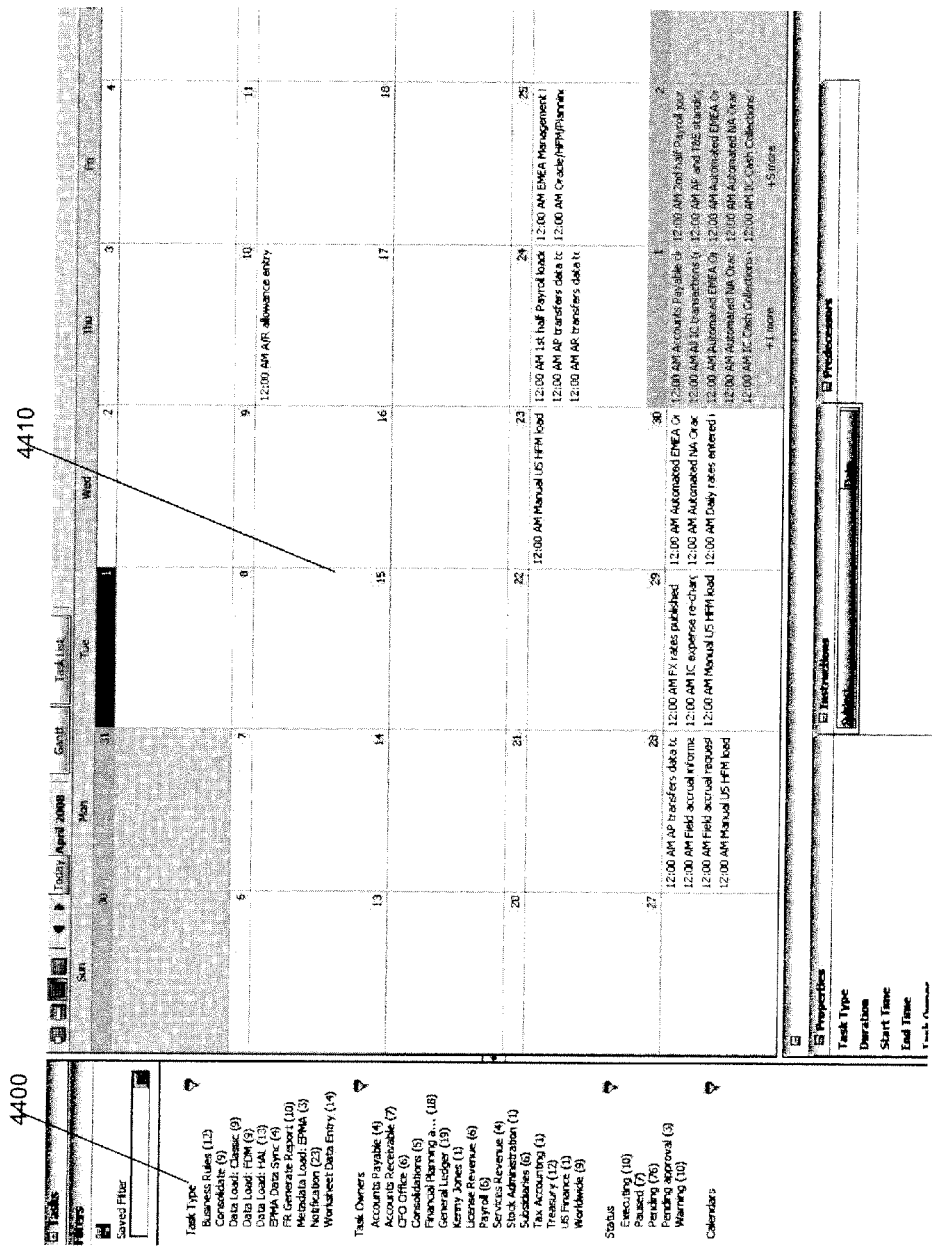
FIG. 44 illustrates an example of a user interface configured to display a filter panel and a view of objects based on an applied filter of the filter panel according to an embodiment of the invention.

FIG. 44 illustrates an example of a user interface configured to display a filter panel and a view of objects based on an applied filter of the filter panel according to an embodiment of the invention. The user interface includes filter panel 4400. Filter panel 4400 is similar to the filter panel illustrated in FIG. 43, but includes additional object attributes being filtered, in this case, status and calendars. The user interface also includes financial close process view 4410. Financial close process view 4410 displays a set of objects, such as tasks, associated with the financial close process. When a filter of filter panel 4400 is selected, financial close process view 4410 updates itself and displays only the tasks returned by the selected filter.

Figure 45:
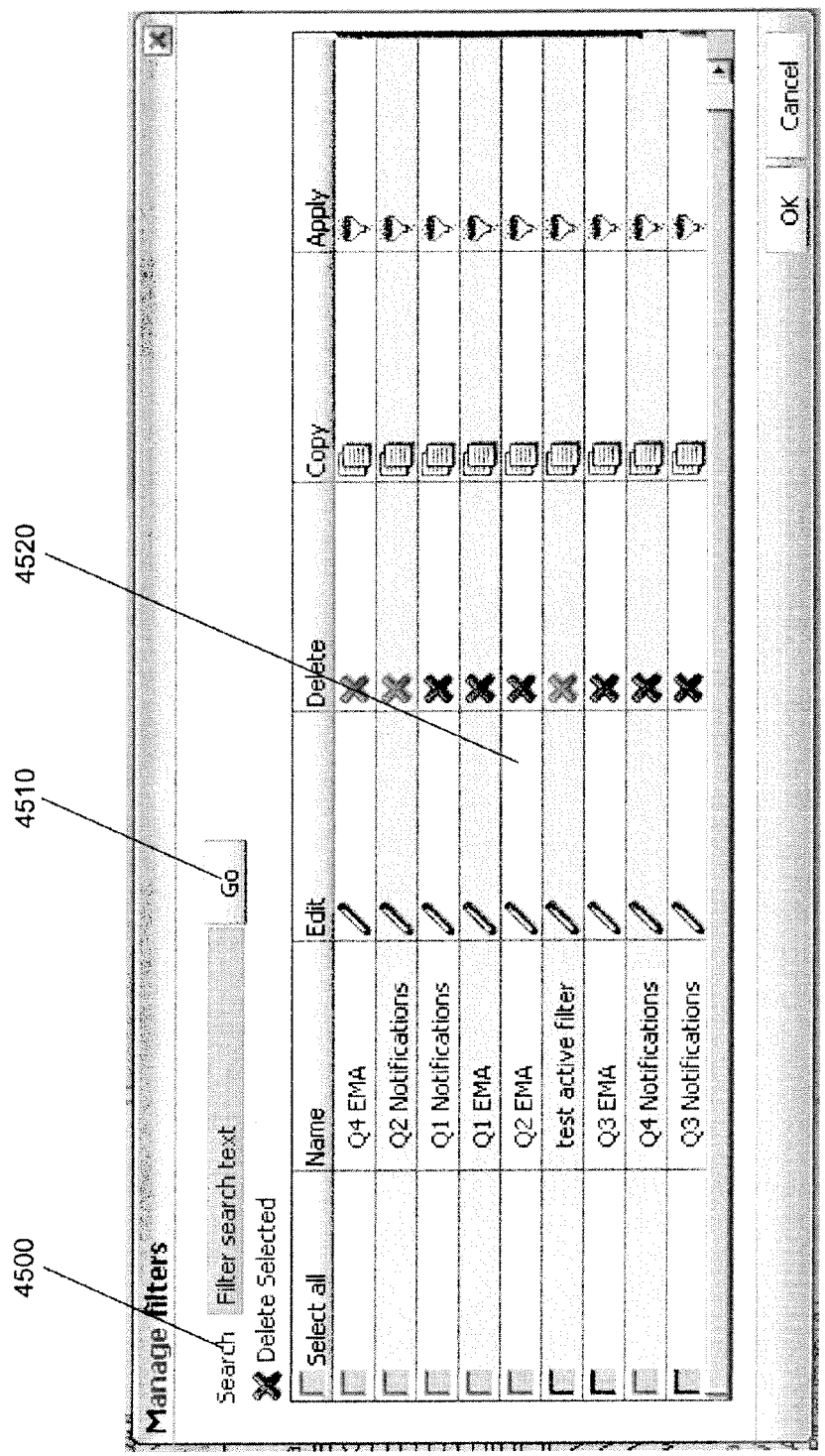
FIG. 45 illustrates an example of a user interface configured to manage filters according to an embodiment of the invention.

FIG. 45 illustrates an example of a user interface configured to manage filters according to an embodiment of the invention. According to the embodiment, the user interface includes search 4500. Search 4500 is a field that allows a user to enter text. Upon entering text at search 4500 and selecting go button 4510, the user interface displays list 4520. List 4520 is a list of filters whose name matches the entered text. A user can then select a filter and either edit, delete, copy, or apply the selected filter.

Figure 46:
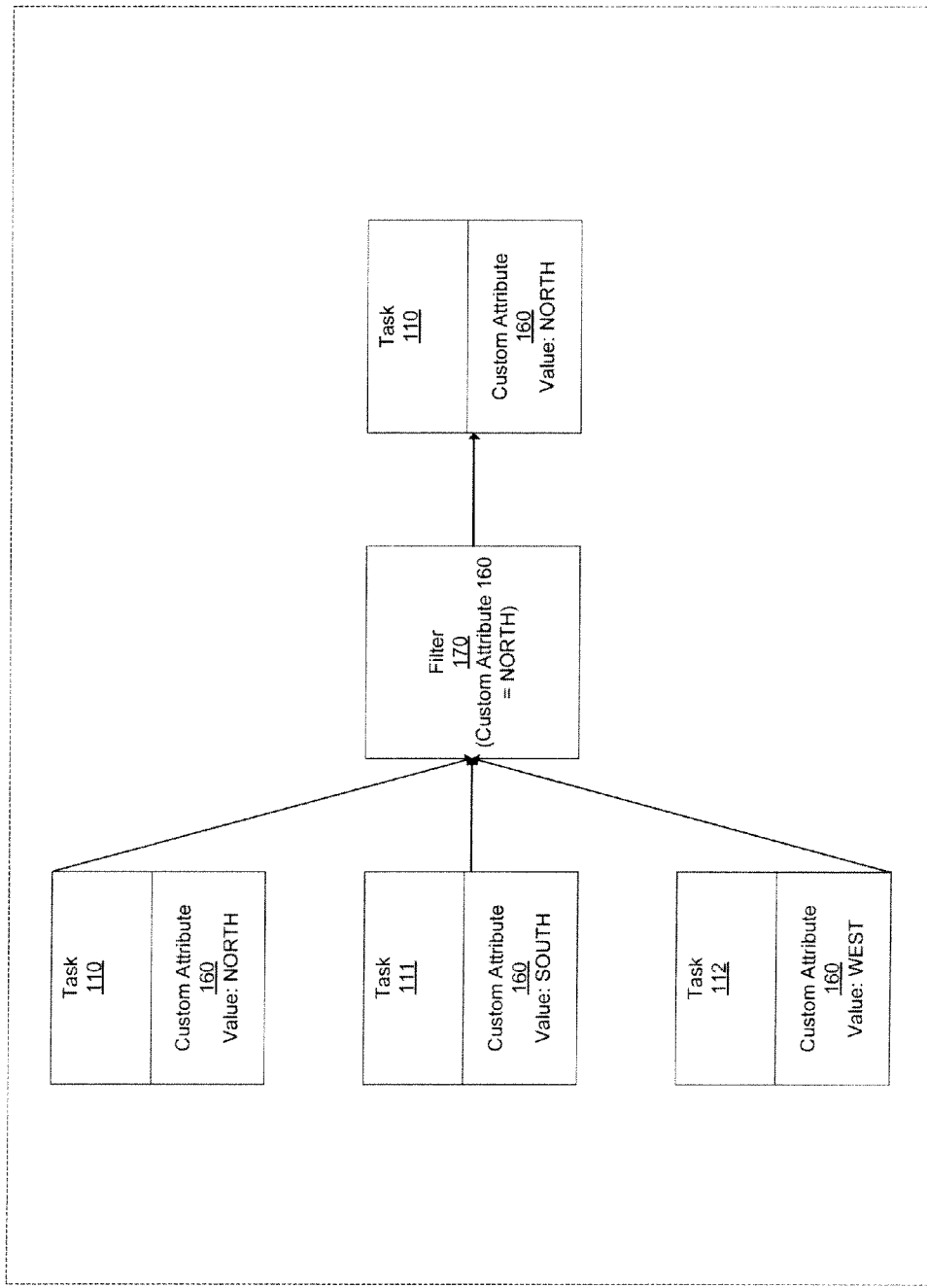
FIG. 46 illustrates a method of filtering on custom attributes according to an embodiment of the invention.

FIG. 46 illustrates a method of filtering on custom attributes according to an embodiment of the invention. In accordance with an embodiment, a filter can be configured to filter based on one or more custom attributes that are defined by a user and associated with at least one object. FIG. 46 illustrates a set of three objects (task 110, task 111, and task 112) and a filter 170. Task 110 is associated with custom attribute 160, which has a value of "NORTH," task 111 is associated with custom attribute 160, which has a value of "SOUTH," and task 112 is associated with custom attribute 160, which has a value of "WEST." The filtering criteria of filter 170 is defined so that filter 170 will only display an object associated with a custom attribute with a value of "NORTH." Thus, when filter 170 is applied to the set of three objects (task 110, task 111, and task 112), filter 170 only displays a subset of one object (task 110), as illustrated in FIG. 46, because task 110 is the only task type associated with a custom attribute with a value of "NORTH."

While the illustrated embodiment of FIG. 46 illustrates filtering of custom attributes, in an alternate embodiment, a filter can be configured to filter based on one or more attributes that are associated with at least one object. In this alternate embodiment, custom attribute 160 can be replaced with an attribute. As previously described, an attribute is a system-defined attribute, as opposed to a user-defined attribute. In this embodiment, the functionality of the filter is the same as the functionality of filter 170 illustrated in FIG. 46. Thus, according to the alternate embodiment, the only difference in functionality is that the attribute being filtered is an attribute rather than a custom attribute.

FIG. 47 illustrates a flow diagram of the functionality of a financial close management module according to another embodiment of the invention. At 4710, a custom attribute is defined. According to the embodiment, a custom attribute is an attribute defined by a user of a system, and the custom attribute includes a name, a value, and a value type. At 4720, the custom attribute is associated with an object in the system. At 4730, a filter is defined. According to the embodiment, a filter defines a subset of objects based on a filtering criteria, when applied to a set of objects in the system, and displays the subset of objects using a user interface of the system. At 4740, the set of objects is filtered using the filter, where the custom attribute is used as the filtering criteria. In one embodiment, the user interface comprises a business intelligence display.

Thus, according to an embodiment of the invention, a custom attribute can be associated with an object, and a set of objects can be filtered using a value of the custom attribute as filtering criteria. This allows a user to customize how a computer system filters its objects. According to an embodiment, the filtering can be dynamic filtering. This allows the system to automatically update its displayed filters based on the custom attributes current defined for each object.

The features, structures, or characteristics of the invention described throughout this specification may be combined in any suitable manner in one or more embodiments. For example, the usage of "an embodiment," "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "an embodiment," "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to filter objects based on a custom attribute, the filtering objects comprising:
  defining a custom attribute, wherein the custom attribute is an attribute defined by a user of a financial close management system, and comprises a name, a value, and a value type;
  associating the custom attribute with an object in the financial close management system;

defining a dynamic filter, wherein the dynamic filter defines a subset of objects based on a filtering criteria when applied to a set of objects in the financial close management system, wherein the set of objects comprises a task type, a task, a template, and a schedule, wherein the dynamic filter automatically updates the defined subset of objects based on one or more changes to the set of objects in the financial close management system, and wherein the one or more changes to the set of objects comprises at least one of: adding a new object to the set of objects, deleting an existing object from the set of objects, or modifying an existing object of the set of objects; and filtering the set of objects using the dynamic filter, wherein the custom attribute is used as the filtering criteria, wherein the dynamic filter displays the subset of objects within a user interface of the financial close management system, and wherein the dynamic filter automatically updates the display of the subset of objects in response to the one or more changes to the set of objects.

2. The non-transitory computer-readable medium of claim 1, the filtering further comprising:
determining attributes associated with each object of the set of objects in the financial close management system; and
providing an option to filter on an attribute associated with at least one object of the set of objects.

3. The non-transitory computer-readable medium of claim 1, the filtering further comprising:
defining one or more additional filters, wherein the one or more additional filters define a second subset of objects based on a second filtering criteria, when applied to the subset of objects displayed by the filter; and
filtering the subset of objects displayed by the filter using the one or more additional filters.

4. The non-transitory computer-readable medium of claim 3, the filtering further comprising:
removing one or more filters; and
re-filtering the set of objects into a new subset of objects based on the remaining filters.

5. The non-transitory computer-readable medium of claim 3, wherein the second filtering criteria is based on the subset of objects returned by the original filter.

6. The non-transitory computer-readable medium of claim 1, the filtering further comprising displaying a number of objects displayed by the filter.

7. The non-transitory computer-readable medium of claim 1,
wherein the value type of the custom attribute comprises a list value type; and
wherein the custom attribute further comprises a list of possible values that can be selected as the value of the custom attribute.

8. The non-transitory computer-readable medium of claim 1, wherein the user interface of the financial close management system comprises a business intelligence display.

9. The non-transitory computer-readable medium of claim 1, wherein the user interface of the financial close management system comprises a dashboard.

10. A computer-implemented method for filtering objects based on a custom attribute, the method comprising:
defining, by a processor, a custom attribute, wherein the custom attribute is an attribute defined by a user of a financial close management system, and comprises a name, a value, and a value type;
associating, by the processor, the custom attribute with an object in the financial close management system;
defining, by the processor, a dynamic filter, wherein the dynamic filter defines a subset of objects based on a filtering criteria when applied to a set of objects in the system, wherein the set of objects comprises a task type, a task, a template, and a schedule, wherein the dynamic filter automatically updates the defined subset of objects based on one or more changes to the set of objects in the financial close management system, and wherein the one or more changes to the set of objects comprises at least one of: adding a new object to the set of objects, deleting an existing object from the set of objects, or modifying an existing object of the set of objects; and filtering, by the processor, the set of objects using the dynamic filter, wherein the custom attribute is used as the filtering criteria, wherein the dynamic filter displays the subset of objects within a user interface of the financial close management system, and wherein the dynamic filter automatically updates the display of the subset of objects in response to the one or more changes to the set of objects.

11. The computer-implemented method of claim 10, further comprising:
determining attributes associated with each object of the set of objects in the financial close management system; and
providing an option to filter on an attribute associated with at least one object of the set of objects.

12. The computer-implemented method of claim 10, further comprising:
defining one or more additional filters, wherein the one or more additional filters define a second subset of objects based on a second filtering criteria, when applied to the subset of objects displayed by the filter; and
filtering the subset of objects displayed by the filter using the one or more additional filters.

13. The computer-implemented method of claim 12, further comprising:
removing one or more filters; and
re-filtering the set of objects into a new subset of objects based on the remaining filter.

14. The computer-implemented method of claim 10, further comprising displaying a number of objects displayed by the filter.

15. The computer-implemented method of claim 10,
wherein the value type of the custom attribute comprises a list value type; and
wherein the custom attribute further comprises a list of possible values that can be selected as the value of the custom attribute.

16. A financial close management system, comprising:
a memory configured to store instructions; and
a processor configured to execute the instructions stored on the memory;
wherein the processor is further configured, when executing the instructions stored on the memory, to:
define a custom attribute, wherein the custom attribute is defined by a user of the financial close management system, and comprises a name, a value, and a value type;
associate the custom attribute with an object in the financial close management system;
define a dynamic filter, wherein the dynamic filter defines a subset of objects based on a filtering criteria when applied to a set of objects in the financial close management system, wherein the set of objects comprises a task type, a task, a template, and a schedule, and the dynamic filter automatically updates the defined subset of objects based on one or more changes to the set of objects in the financial close management system, and wherein the one or more changes to the set of objects comprises at least one of: adding a new object to the set of objects, deleting an existing object from the set of objects, or modifying an existing object of the set of objects; and filter the set of objects using the dynamic filter, wherein the custom attribute is used as the filtering criteria, wherein the dynamic filter displays the subset of objects within a user interface of the financial close management system, and wherein the dynamic filter automatically updates the display of the subset of objects in response to the one or more changes to the set of objects.

17. The financial close management system of claim 16, wherein the processor is further configured, when executing the instructions stored on the memory, to:

determine attributes associated with each object of the set of objects in the system; and provide an option to filter on an attribute associated with at least one object of the set of objects.

18. The financial close management system of claim 16, wherein the processor is further configured, when executing the instructions stored on the memory, to:

define one or more additional filters, wherein the one or more additional filters define a second subset of objects based on a second filtering criteria, when applied to the subset of objects displayed by the filter; and filter the subset of objects displayed by the filter using the one or more additional filters.

19. The financial close management system of claim 18, wherein the processor is further configured, when executing the instructions stored on the memory, to:

remove one or more filters; and re-filter the set of objects into a new subset of objects based on the remaining filters.

20. The financial close management system of claim 16, wherein the processor is further configured, when executing the instructions stored on the memory, to display a number of objects displayed by the filter.

* * * * *

UNITED STATES PATENT AND TRADEMARK OFFICE
CERTIFICATE OF CORRECTION

| | | |
|---|---|---|
| PATENT NO. | : 8,725,747 B2 | Page 1 of 1 |
| APPLICATION NO. | : 12/912969 | |
| DATED | : May 13, 2014 | |
| INVENTOR(S) | : Clark, Jr. et al. | |

It is certified that error appears in the above-identified patent and that said Letters Patent is hereby corrected as shown below:

In the Specification

In column 16, line 31, delete "(WDSL)" and insert -- (WSDL) --, therefor.

In column 16, line 34, delete "WDSL." and insert -- WSDL. --, therefor.

In column 16, line 41, delete "(XLST)" and insert -- (XSLT) --, therefor.

In column 17, line 28, delete "{param1}$PARAM1" and insert -- {param1}=$PARAM1 --, therefor.

In column 17, line 47, delete "WDSL" and insert -- WSDL --, therefor.

In column 19, line 11, delete "XLST" and insert -- XSLT --, therefor.

In column 29, line 56, delete "user user" and insert -- user --, therefor.

Signed and Sealed this
Fourteenth Day of October, 2014

Michelle K. Lee
*Deputy Director of the United States Patent and Trademark Office*